US011279209B2

(12) United States Patent
Ishiguro et al.

(10) Patent No.: US 11,279,209 B2
(45) Date of Patent: Mar. 22, 2022

(54) VEHICLE DOOR GLASS ELEVATING/LOWERING DEVICE, DOOR FRAME ASSEMBLY, VEHICLE DOOR OPENING/CLOSING MEMBER DRIVING DEVICE, AND VEHICLE DOOR OPENING/CLOSING MEMBER DRIVING DEVICE ASSEMBLING METHOD

(71) Applicant: SHIROKI CORPORATION, Fujisawa (JP)

(72) Inventors: Yoshimasa Ishiguro, Fujisawa (JP); Katsuhisa Fukui, Fujisawa (JP); Tomoaki Fukatami, Fujisawa (JP); Kazuhito Nakajima, Fujisawa (JP); Masako Sekine, Fujisawa (JP); Natsuki Ito, Fujisawa (JP); Kimihiro Kinoshita, Fujisawa (JP)

(73) Assignee: SHIROKI CORPORATION, Fujisawa (JP)

(*) Notice: Subject to any disclaimer, the term of this patent is extended or adjusted under 35 U.S.C. 154(b) by 43 days.

(21) Appl. No.: 16/761,444

(22) PCT Filed: Nov. 9, 2018

(86) PCT No.: PCT/JP2018/041680
§ 371 (c)(1),
(2) Date: May 4, 2020

(87) PCT Pub. No.: WO2019/093483
PCT Pub. Date: May 16, 2019

(65) Prior Publication Data
US 2021/0206239 A1 Jul. 8, 2021

(30) Foreign Application Priority Data

Nov. 10, 2017 (JP) .............................. JP2017-217807
Mar. 29, 2018 (JP) .............................. JP2018-064243

(51) Int. Cl.
E06B 7/16 (2006.01)
B60J 1/17 (2006.01)
(Continued)

(52) U.S. Cl.
CPC .............. *B60J 1/17* (2013.01); *E05F 15/689* (2015.01); *B60J 5/0402* (2013.01); *E05F 11/486* (2013.01);
(Continued)

(58) Field of Classification Search
CPC ..... B60J 5/0402; B60J 5/04; B60J 1/17; B60J 10/76; E05F 15/689; E05Y 2201/684; E05Y 2900/531; E05Y 2900/55
(Continued)

(56) References Cited

U.S. PATENT DOCUMENTS 4,074,463 A * 2/1978 Colanzi ................. E05F 11/405
49/349
4,633,613 A 1/1987 Kobayashi et al.
(Continued)

FOREIGN PATENT DOCUMENTS

CN 105246723 A 1/2016
DE 34 45 000 A1 6/1985
(Continued)

OTHER PUBLICATIONS

International Search Report (PCT/ISA/210) dated Dec. 11, 2018, by the Japanese Patent Office as the International Searching Authority for International Application No. PCT/JP2018/041680.
(Continued)

Primary Examiner — Jerry E Redman
(74) Attorney, Agent, or Firm — Buchanan Ingersoll & Rooney PC

(57) ABSTRACT

A vehicle door glass elevating/lowering device performs elevating/lowering operation of window glass by a driving
(Continued)

force of a drive source along a sash member along one of front and rear edges of the window glass in a door sash forming a window opening. The glass elevating/lowering device includes: a guide rail on the sash member; a slider having a glass support secured to the glass and a sliding part guided movably in the elevating/lowering directions with respect to the guide rail; and a transmission member that transmits the driving force of the drive source, in which a first sliding part regulated in position by the guide rail in at least one direction of the vehicle front-rear directions and a second sliding part regulated in position by the guide rail in at least the other direction of the vehicle front-rear directions are provided at mutually different positions in the elevating/lowering directions.

8 Claims, 31 Drawing Sheets

(51) Int. Cl.
E05F 15/689 (2015.01)
B60J 5/04 (2006.01)
E05F 11/48 (2006.01)
(52) U.S. Cl.
CPC ... E05Y 2201/654 (2013.01); E05Y 2201/664 (2013.01); E05Y 2201/684 (2013.01); E05Y 2900/55 (2013.01)
(58) Field of Classification Search
USPC .......................................... 49/479.1
See application file for complete search history.

(56) References Cited

U.S. PATENT DOCUMENTS

| | | | | |
|---|---|---|---|---|
| 4,648,205 A | | 3/1987 | Ono | |
| 4,934,099 A | * | 6/1990 | Maekawa | E05F 11/426 49/352 |
| 5,035,083 A | * | 7/1991 | Kruzich | E05D 13/1276 49/352 |
| 5,469,668 A | * | 11/1995 | Heim | B60J 5/0402 49/349 |
| 5,639,533 A | * | 6/1997 | Yamashita | B60J 10/24 428/99 |
| 5,964,063 A | * | 10/1999 | Hisano | B60J 1/17 49/352 |
| 6,141,910 A | * | 11/2000 | Kobrehel | B60J 5/0402 49/348 |
| 7,306,839 B2 | * | 12/2007 | Kubo | B29C 45/14409 428/122 |
| 7,533,495 B2 | * | 5/2009 | Teramoto | B60J 10/30 49/441 |
| 8,458,959 B2 | * | 6/2013 | Ohtake | B60J 10/88 49/502 |
| 8,464,472 B2 | * | 6/2013 | Araki | F16J 15/061 49/492.1 |
| 8,572,897 B2 | * | 11/2013 | Dishman | B60J 10/86 49/490.1 |
| 8,646,213 B2 | * | 2/2014 | Suzuki | B60J 10/78 49/479.1 |
| 8,667,738 B2 | * | 3/2014 | Kondo | B60J 10/36 49/479.1 |
| 8,819,995 B2 | * | 9/2014 | Kinoshita | E05F 11/488 49/349 |
| 2001/0020347 A1 | * | 9/2001 | de Gaillard | B60J 1/1861 49/374 |
| 2002/0139054 A1 | * | 10/2002 | Schlachter | B60J 10/30 49/479.1 |
| 2003/0121210 A1 | * | 7/2003 | Fujimura | B60J 10/80 49/479.1 |
| 2004/0003544 A1 | * | 1/2004 | Berry | E05F 11/481 49/374 |
| 2004/0163321 A1 | * | 8/2004 | Yamaoka | B60J 10/25 49/479.1 |
| 2004/0177562 A1 | * | 9/2004 | Deguchi | B60J 10/21 49/479.1 |
| 2004/0194390 A1 | * | 10/2004 | Ishikawa | B60J 10/74 49/352 |
| 2004/0216384 A1 | * | 11/2004 | Teramoto | B60J 10/80 49/479.1 |
| 2004/0250474 A1 | * | 12/2004 | Kubo | B60J 10/30 49/479.1 |
| 2005/0072050 A1 | * | 4/2005 | Yamamoto | E05F 11/488 49/352 |
| 2009/0038227 A1 | * | 2/2009 | Costigan | E05F 11/483 49/352 |
| 2009/0224575 A1 | * | 9/2009 | Roder | B60J 7/0573 296/223 |
| 2010/0107501 A1 | | 5/2010 | Iimori et al. | |
| 2013/0318875 A1 | * | 12/2013 | Hansen | E05F 15/665 49/349 |
| 2014/0059940 A1 | * | 3/2014 | Eguchi | B60J 10/248 49/479.1 |
| 2014/0165471 A1 | * | 6/2014 | Chono | E05F 11/483 49/352 |
| 2014/0230331 A1 | * | 8/2014 | Kellum, III | E06B 3/4415 49/352 |
| 2016/0121701 A1 | | 5/2016 | Yoshida et al. | |

FOREIGN PATENT DOCUMENTS

| | | |
|---|---|---|
| EP | 0 985 795 A1 | 3/2000 |
| JP | 60166772 U | 11/1985 |
| JP | H0642256 A | 2/1994 |
| JP | H0820971 A | 1/1996 |
| JP | H09310555 A | 12/1997 |
| JP | H1035287 A | 2/1998 |
| JP | 2006-341693 A | 12/2006 |
| JP | 2017048527 A | 3/2017 |
| WO | 0145975 A1 | 6/2001 |

OTHER PUBLICATIONS

Written Opinion (PCT/ISA/237) dated Dec. 11, 2018, by the Japanese Patent Office as the International Searching Authority for International Application No. PCT/JP2018/041680.
Office Action (The First Office Action) dated May 7, 2021, by the State Intellectual Property Office of People's Republic of China in corresponding Chinese Patent Application No. 201880072690.8 and an English Translation of the Office Action. (21 pages).

* cited by examiner

VEHICLE DOOR GLASS ELEVATING/LOWERING DEVICE, DOOR FRAME ASSEMBLY, VEHICLE DOOR OPENING/CLOSING MEMBER DRIVING DEVICE, AND VEHICLE DOOR OPENING/CLOSING MEMBER DRIVING DEVICE ASSEMBLING METHOD

TECHNICAL FIELD

The present invention relates to a vehicle door glass elevating/lowering device, a door frame assembly, a vehicle door opening/closing member driving device, and a vehicle door opening/closing member driving device assembling method.

BACKGROUND ART

A vehicle door that uses window glass to open and close a window opening surrounded by a door sash (window frame) is equipped with a window glass elevating/lowering device (window regulator). In the case of a side door of a vehicle, it is necessary to stably elevate and lower the window glass while preventing tilting or falling in the front-rear directions or a vehicle interior and exterior directions. For example, Patent Literature 1 describes a glass elevating/lowering device including two guide rails provided at different positions in the front-rear directions and in which a front carrier plate supporting the vicinity of the front end of the window glass and a rear carrier plate supporting the vicinity of the rear end of the window glass are slidably assembled to each of the guide rails. With this configuration, the stability of the window glass can be improved, and in particular, the inclination of the window glass in the front-rear directions can be effectively suppressed.

CITATION LIST

Patent Literature

Patent Literature 1: Japanese Patent Application Laid-Open Publication No. 2017-48527

SUMMARY OF INVENTION

Technical Problem

However, the presence of the glass elevating/lowering device provided in front and rear positions would cause problems such as an increase in manufacturing cost and an increase in weight due to an increase in the number of parts, a reduction in the degree of freedom in design due to reduced space in the door panel, or the like.

Furthermore, a vehicle door opening/closing member driving device that perform open/close drive of an opening/closing member such as a window glass is required to have a capability of assembling the components of the opening/closing member driving device with high degree of freedom and high workability.

The present invention has been made on the basis of the above awareness of the problems, and aims to obtain a vehicle door glass elevating/lowering device capable of improving the stability of the window glass with a low-cost and space-saving configuration.

The present invention also aims to provide a door frame assembly, a vehicle door opening/closing member driving device, and a vehicle door opening/closing member driving device assembling method capable of assembling components with a high degree of freedom with high workability.

Solution to Problem

The present invention is a vehicle door glass elevating/lowering device that performs elevating/lowering operation of window glass by a driving force of a drive source along a sash member along one of front and rear edges of the window glass in a door sash forming a window opening, the glass elevating/lowering device includes: a guide rail provided on the sash member and extending in elevating/lowering directions of the window glass; a slider having a glass support secured to the window glass and a sliding part guided movably in the elevating/lowering directions with respect to the guide rail; and a transmission member that transmits the driving force of the drive source. The sash member includes a facing part located on the vehicle interior side with respect to the window glass and facing the interior-side of the window glass, the slider, the guide rail and the transmission member are located between the facing part of the sash member and the window glass in vehicle interior and exterior directions as viewed from along the elevating/lowering directions of the window glass. Where the window glass is positioned in the window opening, the transmission member is located between the window glass and the facing part that is positioned within a range where the sash member forms the window opening in vehicle interior and exterior directions. The sliding part includes: first and second sliding parts disposed at different positions in the elevating/lowering directions, the first sliding part regulated in position by the guide rail in at least one direction of the vehicle front-rear directions, and the second sliding part regulated in position by the guide rail in at least the other direction of the vehicle front-rear directions.

In a case where a first glass support to which the first sliding part is connected and a second glass support to which the second sliding part is connected are separately provided, the transmission member is preferably connected to the glass support at an upper position in the elevating/lowering directions out of the first glass support and the second glass support.

It is also possible to adopt a configuration in which the first sliding part and the second sliding part are connected to the glass support used in common.

It is preferable that the guide rail has a section surrounded by walls located in the vehicle front-rear directions and the vehicle interior and exterior directions and that the first sliding part and the second sliding part are inserted into the section. In this case, it is preferable that each of the first sliding part and the second sliding part includes a sliding base whose outer surface is in sliding contact with each of the walls surrounding the section and in which each of the first sliding part and the second sliding part further includes at least one of: a deflection suppression part that is biased in the vehicle interior and exterior directions to come in contact with the wall within the section so as to suppress deflection of each of the sliding parts in the vehicle interior and exterior directions; or a deflection suppression part that is biased in the vehicle front-rear directions to come in contact with the wall within the section so as to suppress deflection of each of the sliding parts in the vehicle front-rear directions.

It is preferable that the first sliding part is located at an upper position in the elevating/lowering directions, the second sliding part is located at a lower position in the elevating/lowering directions, the deflection suppression part that suppresses deflection of the first sliding part in the vehicle front-rear directions protrudes from the sliding base to the outer peripheral side of the window opening to bias the sliding base toward the inner peripheral side of the window opening, and the deflection suppression part that suppresses deflection of the second sliding part in the vehicle front-rear directions protrudes from the sliding base to the inner peripheral side of the window opening to bias the sliding base toward the outer peripheral side of the window opening.

It is preferable that a transmission receiving part of the glass support to which the transmission member is connected, and the first sliding part and the second sliding part, are arranged at different positions in the vehicle front-rear directions.

With a configuration including a passage part provided in the middle of the guide rail in the elevating/lowering directions and that allows at least one of the first sliding part or the second sliding part to be inserted to and removed from the inside of the guide rail in a direction intersecting the elevating/lowering directions and in which a distance between the first sliding part and the second sliding part in the elevating/lowering directions is set to be longer than a length from the passage part to one end of the guide rail in the elevating/lowering directions, it is possible to improve workability in assembling the first sliding part and the second sliding part onto the guide rail. A glass elevating/lowering device including a guide rail having such a passage part may be provided on a sash member to provide a door frame assembly including at least a door sash, window glass, and a glass elevating/lowering device.

The present invention provides a vehicle door opening/closing member driving device that moves an opening/closing member along an upright pillar sash forming a window opening and that opens and closes the window opening by the opening/closing member, the vehicle door opening/closing member driving device including: a guide rail provided at the upright pillar sash to extend in opening/closing directions of the opening/closing member; a first sliding part and a second sliding part that are provided on the opening/closing member at different positions in the opening/closing directions and configured to be inserted inside the guide rail and movably guided in the opening and closing directions; and a passage part that is provided in the middle of the guide rail in the opening and closing directions and that allows at least one of the first sliding part or the second sliding part to be inserted into and removed from the inside of the guide rail in a direction intersecting the opening and closing directions, in which a distance between the first sliding part and the second sliding part in the opening and closing directions is longer than a length from the passage part to one end of the guide rail in the opening and closing directions.

A vehicle door opening/closing member driving device assembling method according to the present invention is characterized in that the opening/closing member driving device includes: a guide rail disposed along an upright pillar sash forming a window opening; a guided member attached to an opening/closing member that opens and closes the window opening and guided by the guide rail; a driven member attached to the opening/closing member and to which a driving force is applied from a drive unit; and a transmission member that transmits the driving force of the drive unit to the driven member; wherein a frame structure constituting the upright pillar sash includes a facing part located on vehicle interior side with respect to the opening/closing member and facing to the opening/closing member, the guided member, the driven member, the guide rail and the transmission member are located between the facing part of the frame structure and the opening/closing member in vehicle interior and exterior directions as viewed along the opening/closing directions of the opening/closing member. When the opening/closing member is positioned in the window opening, the transmission member is located between the opening/closing member and the facing part that is positioned within a range where the frame structure forms the window opening in vehicle interior and exterior directions. The opening/closing member driving device which includes the guide rail, the guided member and the driven member is assembled to the frame structure.

More specifically, the opening/closing member driving device is assembled to the frame structure in a state where the opening/closing member attached with the guided member and the driven member, the transmission member, the guide rail, and the drive unit are assembled with each other.

Advantageous Effects of Invention

According to the present invention, it is possible to obtain a vehicle door glass elevating/lowering device capable of improving the stability of the window glass with a low-cost and space-saving configuration.

Furthermore, according to the present invention, it is possible to obtain a door frame assembly, a vehicle door opening/closing member driving device, and a vehicle door opening/closing member driving device assembling method capable of assembling components with a high degree of freedom with high workability.

DESCRIPTION OF EMBODIMENTS

Figure 1:
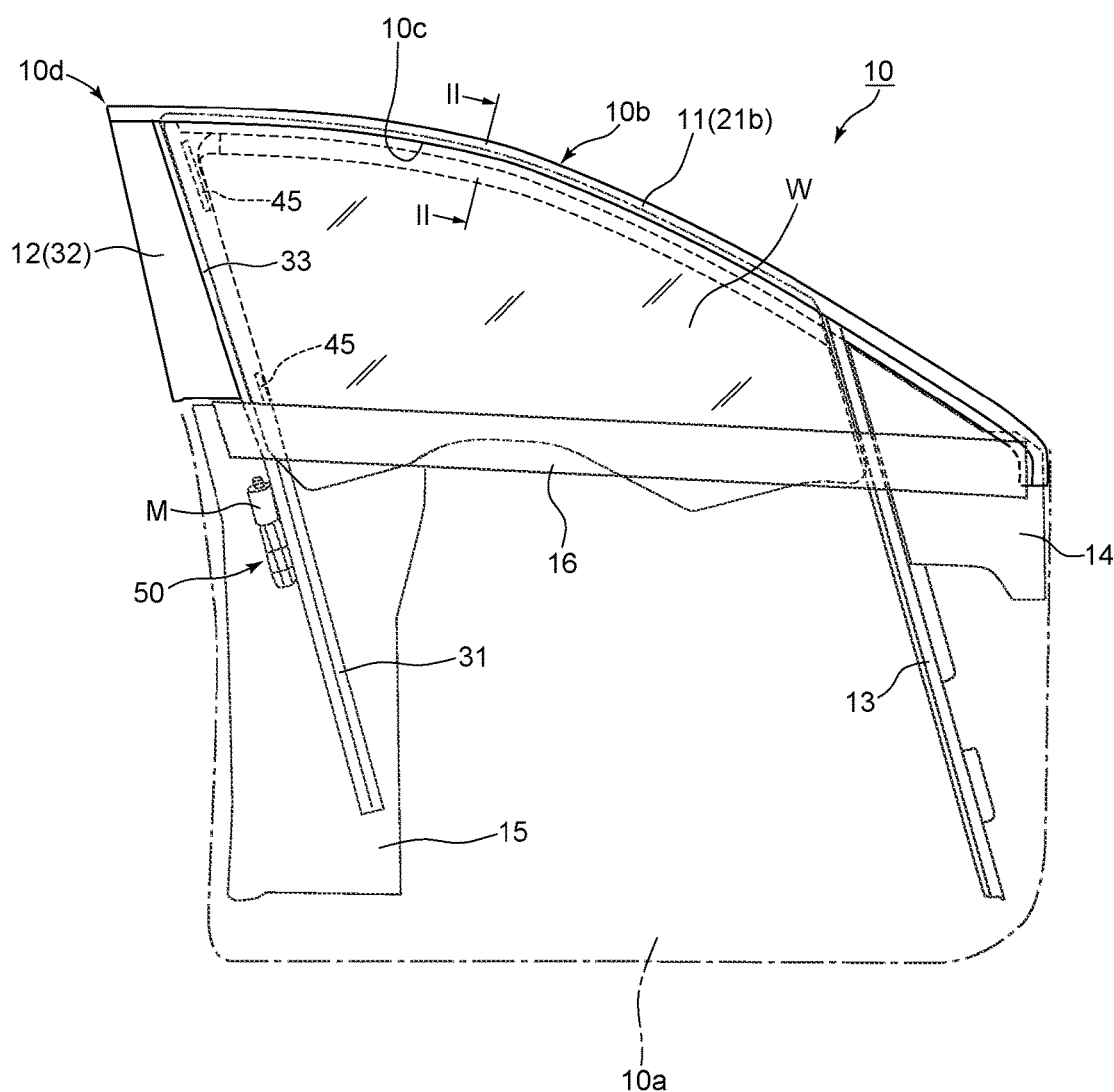
FIG. 1 is a view of a vehicle door when viewed from a vehicle exterior side.

Hereinafter, embodiments of the present invention will be described with reference to the drawings. A door 10 illustrated in FIG. 1 is a side door attached to a side of a right front seat of a vehicle body (not illustrated), and the vehicle body has a door opening (not illustrated) opened and closed by the door 10. The door 10 includes a door panel 10a (virtually illustrated with a one-dot chain line) and a door sash 10b. There is provided a window opening 10c surrounded by the upper edge of the door panel 10a and the door sash 10b.

In the following description, the vehicle interior side and the vehicle exterior side correspond to the inside and outside of the vehicle body in a state where the door 10 is closed, and a direction connecting the vehicle interior side and the vehicle exterior side (a thickness direction of the door 10) will be referred to as vehicle interior and exterior directions. On the door sash 10b, the side facing the window opening 10c is defined as an inner peripheral side, the opposite side of the window opening 10c (the side facing an inner edge of a body opening in a state where the door 10 is closed) is defined as an outer peripheral side, and a direction connecting the inner peripheral side and the outer peripheral side is referred to as inner and outer peripheral directions.

Although not illustrated, the door panel 10a is a combination of an inner panel located on the vehicle interior side and an outer panel located on the vehicle exterior side. A door panel inner space (not illustrated) is formed between the inner panel and the outer panel, and an upper edge of the door panel inner space opens toward the window opening 10c.

The door sash 10b includes an upper sash 11 located at an upper edge of the door 10, an upright pillar sash 12 and a front sash 13 extending substantially vertically from the upper sash 11 toward the door panel 10a. The upright pillar sash 12 is located at the rearmost portion of the door sash 10b, and the upper corner at the rear of the door 10 is a door corner part 10d where the rear end of the upper sash 11 and the upper end of the upright pillar sash 12 meet. The upright pillar sash 12 and the front sash 13 extend substantially in parallel. The upright pillar sash 12 forms a rear edge of the window opening 10c while the front sash 13 forms a front edge of the window opening 10c. Further, the upper sash 11 forms the upper edge of the window opening 10c.

The upright pillar sash 12 extends downward (diagonally downward) from the door corner part 10d and is inserted into the door panel inner space. The upper sash 11 extends forward from the door corner part 10d and curves downward in the middle of running forward. The front end of the upper sash 11 is inserted into the door panel inner space of the door panel 10a. The front sash 13 extends downward (diagonally downward) from an intermediate position of the upper sash 11 so as to be inserted into the door panel inner space. The upper sash 11, the upright pillar sash 12, and the front sash 13 are each secured to the door panel 10a inside the door panel inner space.

In the door panel inner space, a mirror bracket 14 is provided at a front portion, and a lock bracket 15 is provided at a rear portion. The mirror bracket 14 and the lock bracket 15 are each secured to the door panel 10a, the front sash 13 is secured to the mirror bracket 14, and the upright pillar sash 12 is secured to the lock bracket 15. A part of the mirror bracket 14 has a shape that protrudes upward from the door panel 10a and fits in a triangular space between the upper sash 11 and the front sash 13. A door mirror (not illustrated) or the like is attached to the protruded portion on the mirror bracket 14. A door lock mechanism (not illustrated) or the like is attached to the lock bracket 15.

A belt line reinforcement 16 extending in front-rear directions is arranged near the upper edge of the door panel inner space. The belt line reinforcement 16 includes at least an outer reinforcement located on the vehicle exterior side. The front part of the outer reinforcement is secured to the mirror bracket 14 and the rear part thereof is secured to the lock bracket 15. The belt line reinforcement 16 may include an inner reinforcement located on the vehicle interior side in addition to the outer reinforcement.

There is provided window glass W, being an opening/closing member, to be elevated and lowered along the upright pillar sash 12 and the front sash 13 to open and close the window opening 10c. The window glass W is a plate-shaped glass member having a vehicle exterior side surface W1 facing the vehicle exterior side, a vehicle interior side surface W2 facing the vehicle interior side, and an edge surface W3 facing the outer peripheral side (refer to FIG. 19). The window glass W is elevated and lowered between a fully closed position (a position shown in FIG. 1 and a position shown in FIG. 20 by solid line) and a fully open position (a position shown in FIG. 20 by two-dot chain line) by a window regulator 40 described below. The upper edge of the window glass W reaches the upper sash 11 at the fully closed position. The window glass W lowered from the fully closed position to the fully open position is housed in the door panel inner space.

Figure 2:
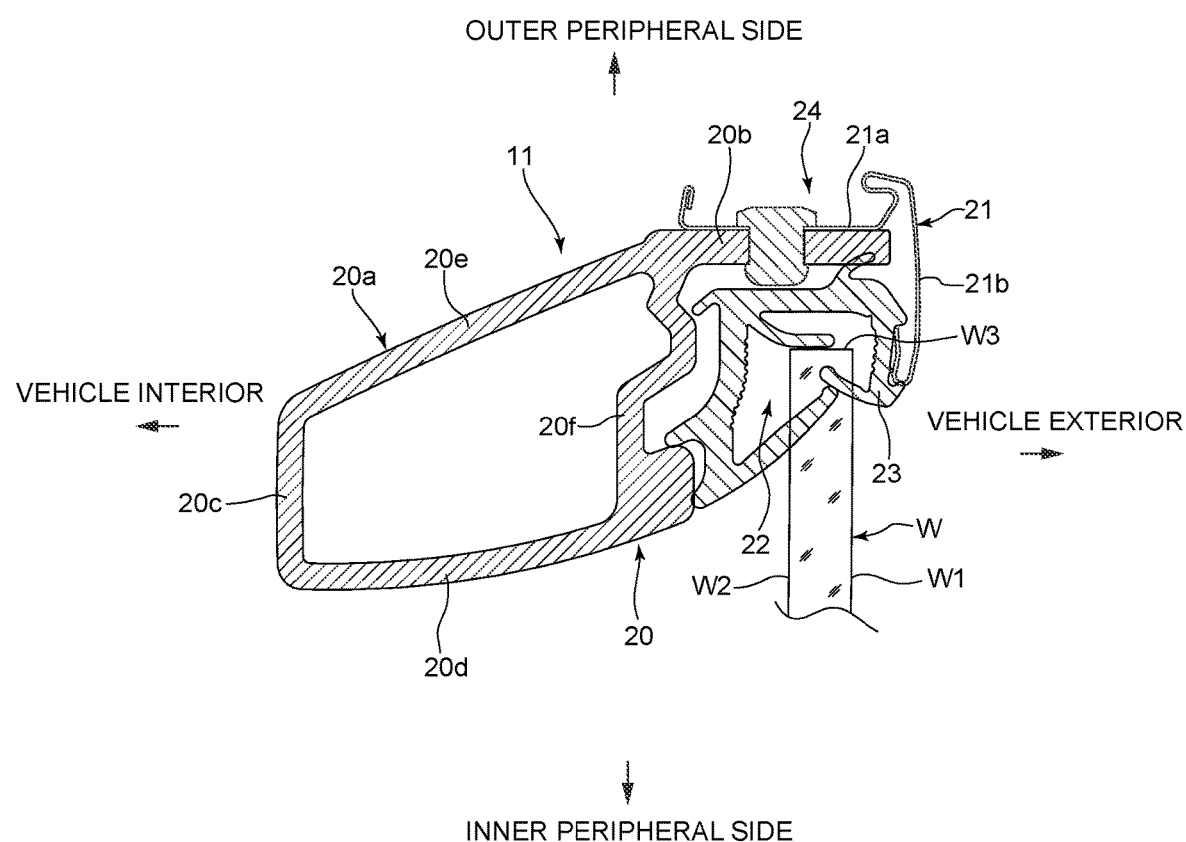
FIG. 2 is a cross-sectional view of an upper sash along line II-II in FIG. 1.

As illustrated in FIG. 2, the upper sash 11 includes a combination of a sash body 20 located on the vehicle interior side and a sash molding 21 located on the vehicle exterior side.

The sash body 20 is a thick metal long member that makes the upper sash 11 a rigid body. The sash body 20 includes: a frame part 20a having a hollow cross-sectional shape located on the vehicle interior side; and a plate part 20b protruding from the frame part 20a toward the vehicle exterior side. The frame part 20a includes a vehicle interior side wall 20c located on the vehicle interior side; an inner peripheral side wall 20d extending from an inner peripheral side end of the vehicle interior side wall 20c toward the vehicle exterior side; an outer peripheral side wall 20e extending from an outer peripheral side end of the vehicle interior side wall 20c toward the vehicle exterior side; and a vehicle exterior side wall 20f that connects vehicle exterior side ends of the inner peripheral side wall 20d and the outer peripheral side wall 20e. The plate part 20b protrudes from the vicinity of the boundary between the outer peripheral side wall 20e and the vehicle exterior side wall 20f toward the vehicle exterior side.

The sash molding 21 is a metal long member thinner than the sash body 20 and includes: a support 21a overlapping the outer peripheral side of the plate part 20b; and a design part 21b located on the vehicle exterior side of the support 21a. The plate part 20b and the support 21a are secured by rivets or the like. That is, the upper sash 11 has a configuration in which the frame part 20a located on the vehicle interior side and the design part 21b located on the vehicle exterior side are connected with each other by a connecting part including the plate part 20b and the support 21a.

The upper sash 11 includes a glass run storage 22 formed as a recess surrounded by the vehicle exterior side wall 20f of the frame part 20a, the plate part 20b, and the support 21a. The glass run storage 22 is open toward the inner peripheral side and houses a glass run 23 formed of an elastic body. The glass run storage 22 is provided with an uneven shape for preventing the glass run 23 from falling off to the inner peripheral side. The glass run 23 has a recessed cross-sectional shape along the inner surface of the glass run storage 22 and includes on its inner side a plurality of elastically deformable lip parts.

As illustrated in FIG. 2, the upper edge of the window glass W enters the glass run storage 22 at the fully closed position of the window glass W. The window glass W that has entered the glass run storage 22 presses the lip part of the glass run 23 to be elastically deformed. This allows the lip part of the glass run 23 to come into close contact with each of a vehicle exterior side surface W1, a vehicle interior side surface W2, and an edge surface W3 of the window glass W, forming a water-tight state that prevents entry of raindrops or the like to the vehicle interior side, as well as elastically holding the upper edge of the window glass W by the glass run 23.

The upper sash 11 is further equipped with a weather-strip holder 24 on the outer peripheral side opposite to the glass run storage 22. The weather-strip holder 24 is a recess including the support 21a and bent portions formed on the vehicle interior and vehicle exterior sides of the support 21a toward the outer peripheral side. The weather-strip holder 24 is open toward the outer peripheral side and fittingly holds a leg of a weather-strip (not illustrated) formed of an elastic body. The weather-strip includes an elastic contact part protruding from the weather-strip holder 24 to the outer peripheral side. When the door 10 is closed, the elastic contact part of the weather-strip comes into contact with an inner edge of the door opening of a vehicle body and is elastically deformed. As will be described below, the weather-strip is also continuous to the part along the upright pillar sash 12. Accordingly, the space between the entire door sash 10b and the door opening comes into a water-tight sealed state by the weather-strip in a state where the door 10 is closed.

The upper sash 11 maintains the above-described general cross-sectional shape from the rear end position on the door corner part 10d side to a position connected to the upper end of the front sash 13 (referred to as a front corner part). Although not illustrated, the sash molding 21 is not provided in the portion of the upper sash 11 that is more frontward of the front corner part, with omission of the glass run storage 22. The front sash 13 is provided with a glass run storage (not illustrated) having a recessed cross-sectional shape that is continuous with the glass run storage 22 of the upper sash 11, and the glass run 23 is held inside the glass run storage of the front sash 13 so as to be disposed downward from the front corner part.

Figure 3:
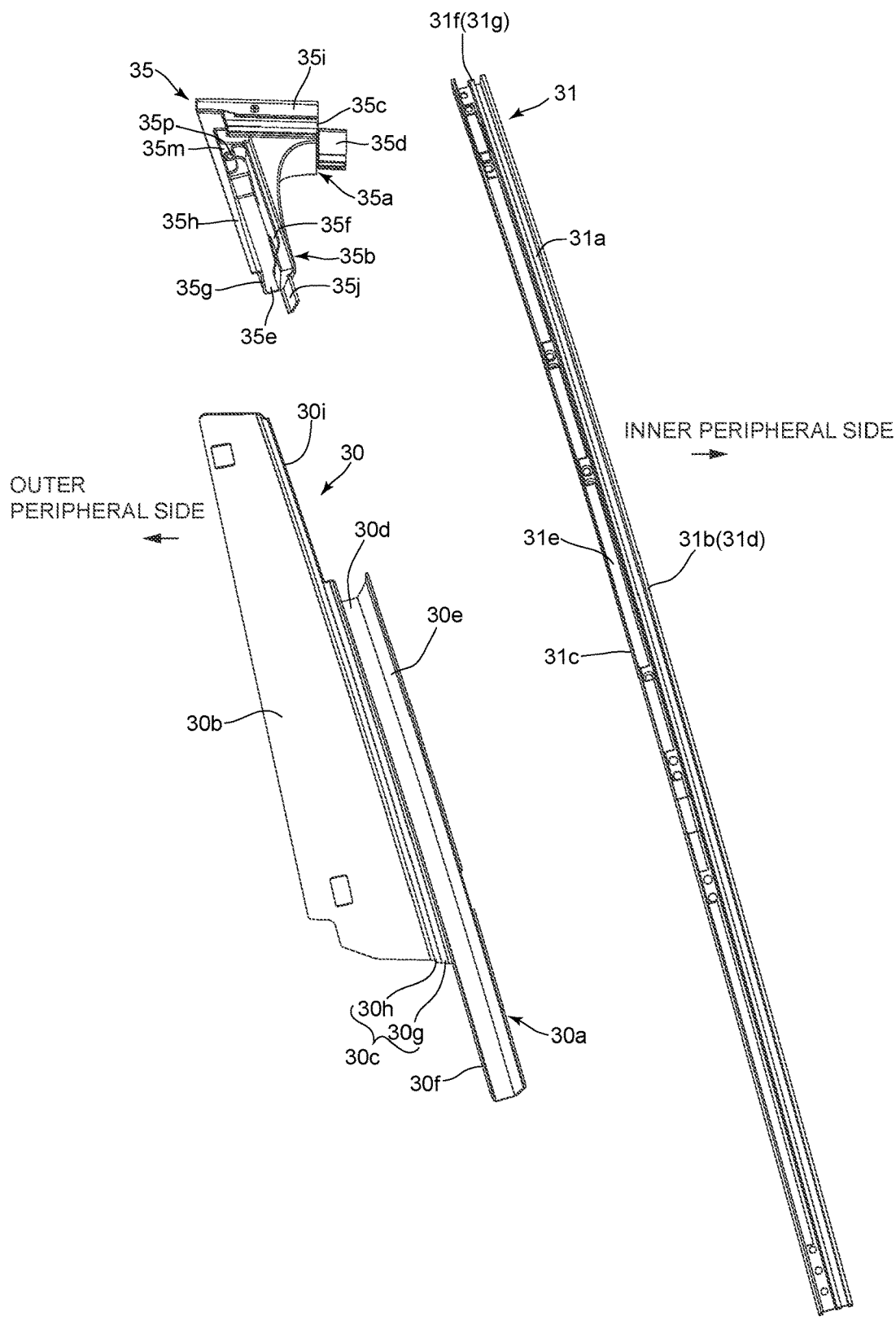
FIG. 3 is a view of a disassembled upright pillar sash when viewed from the vehicle exterior side.
Figure 4:
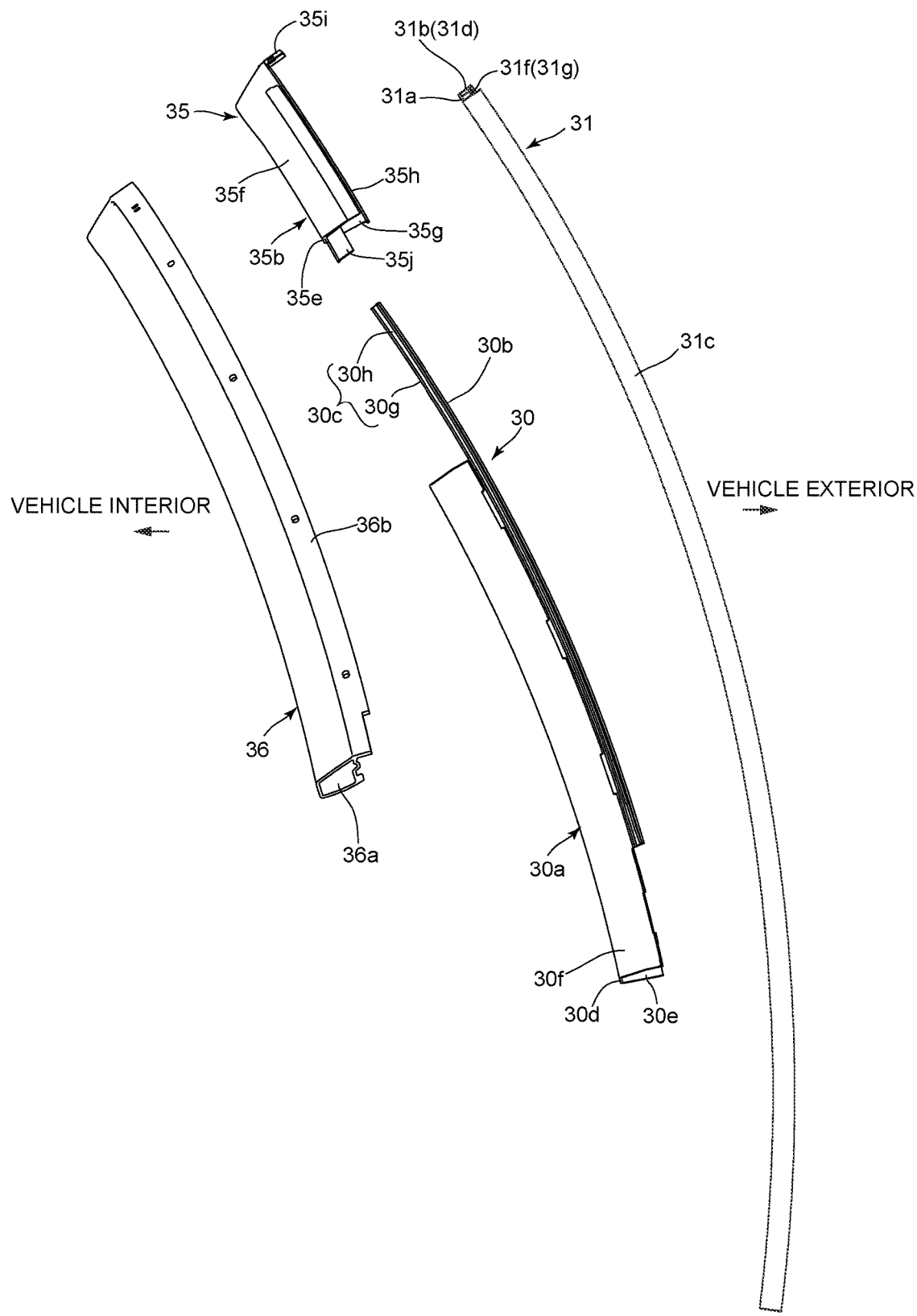
FIG. 4 is a rear view of the disassembled upright pillar sash.
Figure 9:
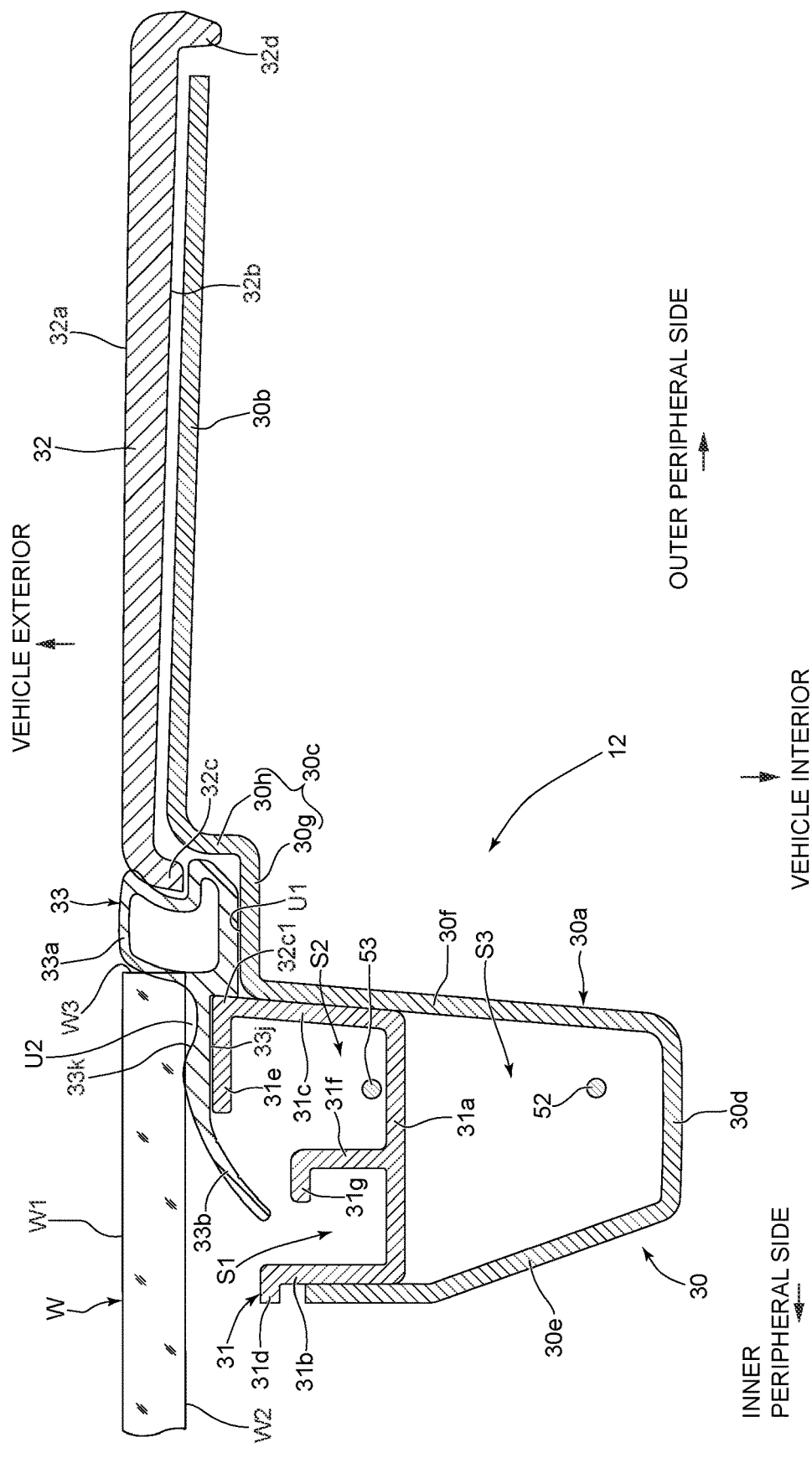
FIG. 9 is a cross-sectional view of an upright pillar sash at a position along line IX-IX in FIG. 23.

As illustrated in FIGS. 3 and 4, the upright pillar sash 12 has a configuration combining an inner sash 30 and a guide rail 31, each of which is a metal long member. Note that the inner sash 30 and the guide rail 31 can also be formed of a nonmetallic material such as a synthetic resin. As illustrated in FIG. 9, a garnish 32 and an elastic cover 33 are attached to the vehicle exterior side of the inner sash 30 and the guide rail 31.

The inner sash 30 includes: a frame part 30a located on the vehicle interior side; a design part 30b located on the vehicle exterior side; and a step part 30c connecting the frame part 30a and the design part 30b. The frame part 30a is a part corresponding to the frame part 20a in the upper sash 11. More specifically, as illustrated in FIG. 9, the frame part 30a includes: a vehicle interior side wall 30d located on the vehicle interior side; an inner peripheral side wall 30e extending from an inner peripheral side end of the vehicle interior side wall 30d toward the vehicle exterior side; and an outer peripheral side wall 30f extending from an outer peripheral side end of the vehicle interior side wall 30d to the vehicle exterior side. The outer peripheral side wall 30f extends substantially straight in the vehicle interior and exterior directions. The inner peripheral side wall 30e includes an inclined region increasing distance with respect to the outer peripheral side wall 30f (having a larger amount of protrusion toward the inner peripheral side) as being farther from the vehicle interior side wall 30d, while the vehicle exterior side of the inclined region is defined as a parallel region being substantially parallel with the inner peripheral side wall 30e.

Unlike the sash body 20 of the upper sash 11 in which the frame part 20a has a closed cross-sectional shape, the inner sash 30 of the upright pillar sash 12 has a bursiform cross-section that is open toward the vehicle exterior side without connecting the vehicle exterior side end of the inner peripheral side wall 30e and the vehicle exterior side end of the outer peripheral side wall 30f in the frame part 30a.

The step part 30c of the inner sash 30 includes: an outer peripheral extension 30g extending from the vehicle exterior side end of the outer peripheral side wall 30f toward the outer peripheral side; and a vehicle exterior extension 30h extending from the outer peripheral side end of the outer peripheral extension 30g toward the vehicle exterior side. The design part 30b extends from the vehicle exterior side end of the vehicle exterior extension 30h toward the outer peripheral side.

The guide rail 31 has a recessed cross-sectional shape that opens toward the vehicle exterior side and is disposed so as to fit inside the open portion of the inner sash 30 on the vehicle exterior side of the frame part 30a having a bursiform cross-sectional shape. More specifically, the guide rail 31 includes a vehicle interior side wall 31a located on the vehicle interior side; an inner peripheral side wall 31b extending from an inner peripheral side end of the vehicle interior side wall 31a toward the vehicle exterior side; and an outer peripheral side wall 31c extending from an outer peripheral side end of the vehicle interior side wall 31a to the vehicle exterior side. A bent part 31d and a cover wall 31e protruding toward the inner peripheral side are provided at the vehicle exterior side end of the inner peripheral side wall 31b and the vehicle exterior side end of the outer peripheral side wall 31c, respectively. The guide rail 31 further includes: a partition wall 31f protruding to the vehicle exterior side from an intermediate position of the vehicle interior side wall 31a in the inner and outer peripheral directions; and a holding wall 31g protruding to the inner peripheral side from the vehicle exterior side end of the partition wall 31f.

The three walls (the inner peripheral side wall 31b, the outer peripheral side wall 31c, and the partition wall 31f) and the vehicle interior side wall 31a connecting these three walls form a first section S1 and a second section S2 mutually adjacent in the inner and outer peripheral directions within the guide rail 31. The holding wall 31g partially closes the vehicle exterior side of the first section S1 while forming a gap with the inner peripheral side wall 31b. The cover wall 31e partially closes the vehicle exterior side of the second section S2 while forming a gap with the partition wall 31f.

The partition wall 31f is provided at a position closer to the inner peripheral side wall 31b than to the outer peripheral side wall 31c, so that the second section S2 is larger than the first section S1 in the inner and outer peripheral directions. The amount of protrusion to the vehicle exterior side with respect to the vehicle interior side wall 31a is the largest on the outer peripheral side wall 31c, the next largest on the inner peripheral side wall 31b, and the smallest on the partition wall 31f. Therefore, the second section S2 is wider in both the inner and outer peripheral directions and the vehicle interior and exterior directions than the first section S1. Furthermore, the cover wall 31e forming the vehicle exterior side surface of the second section S2 is longer in the inner and outer peripheral directions than the holding wall 31g forming the vehicle exterior side surface of the first section S1.

In a state where the guide rail 31 is combined with the inner sash 30, the guide rail 31 closes the opening on the vehicle exterior side of the frame part 30a. The end of the inner peripheral side wall 30e comes in contact with the bent part 31d, determining the relative positions of the inner sash 30 and the guide rail 31 in the vehicle interior and exterior directions (refer to FIG. 14). The inner peripheral side wall 31b and the outer peripheral side wall 31c are respectively in contact with the inner peripheral side wall 30e and the outer peripheral side wall 30f from the inside of the frame part 30a, and this contact achieves integration of the inner sash 30 and the guide rail 31 in the inner and outer peripheral directions. The vehicle interior side wall 31a of the guide rail 31 connects the inner peripheral side wall 30e and the outer peripheral side wall 30f of the inner sash 30 in the inner and outer peripheral directions. This leads to formation of a third section S3 surrounded by the vehicle interior side wall 30d, the inner peripheral side wall 30e, the outer peripheral side wall 30f, and the vehicle interior side wall 31a. The third section S3 is located adjacent to the first section S1 and the second section S2 on the vehicle interior side, being separated from the first section S1 and the second section S2 by the vehicle interior side wall 31a.

Figure 10:
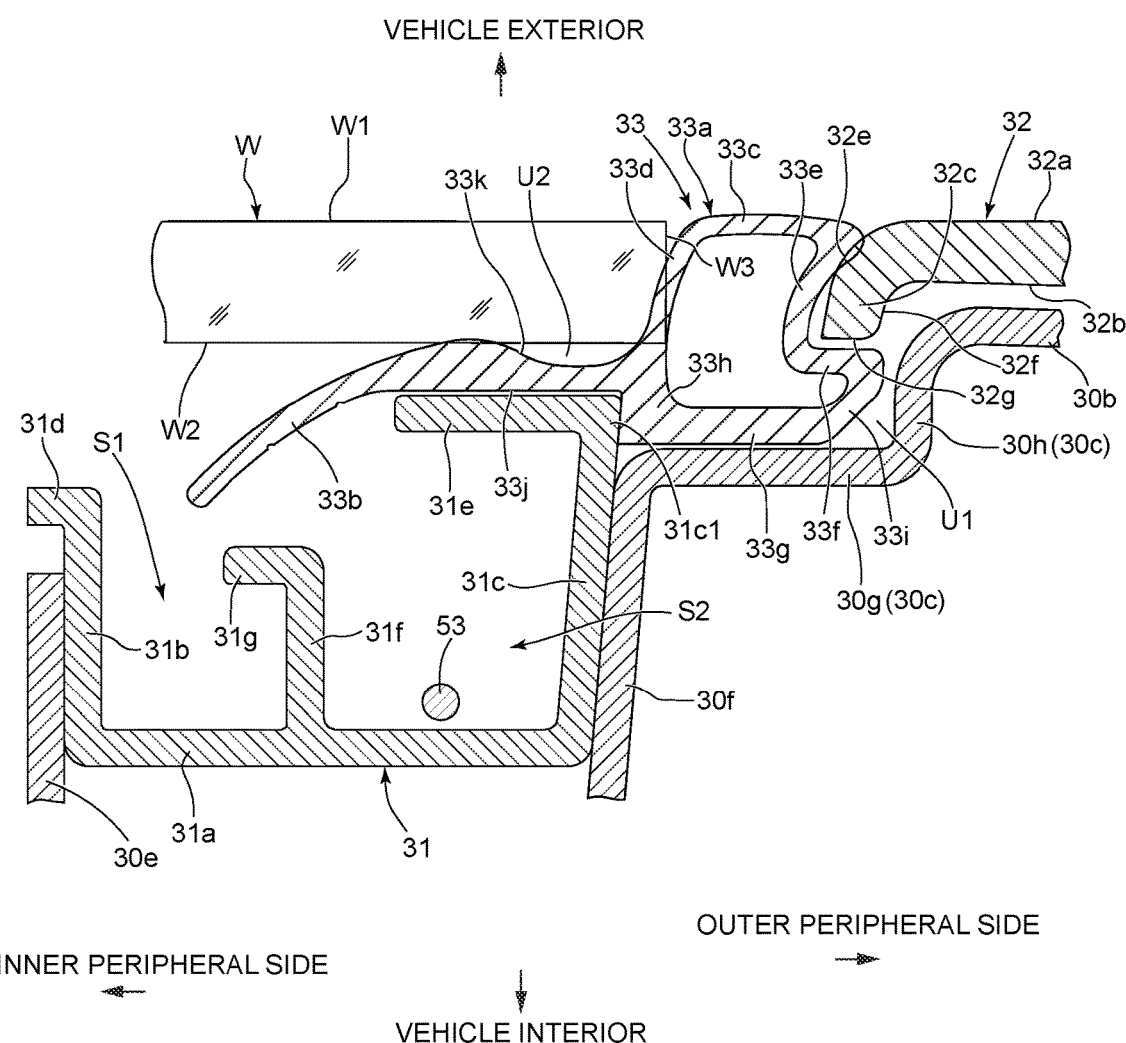
FIG. 10 is an enlarged cross-sectional view of a part of FIG. 9.
Figure 11:
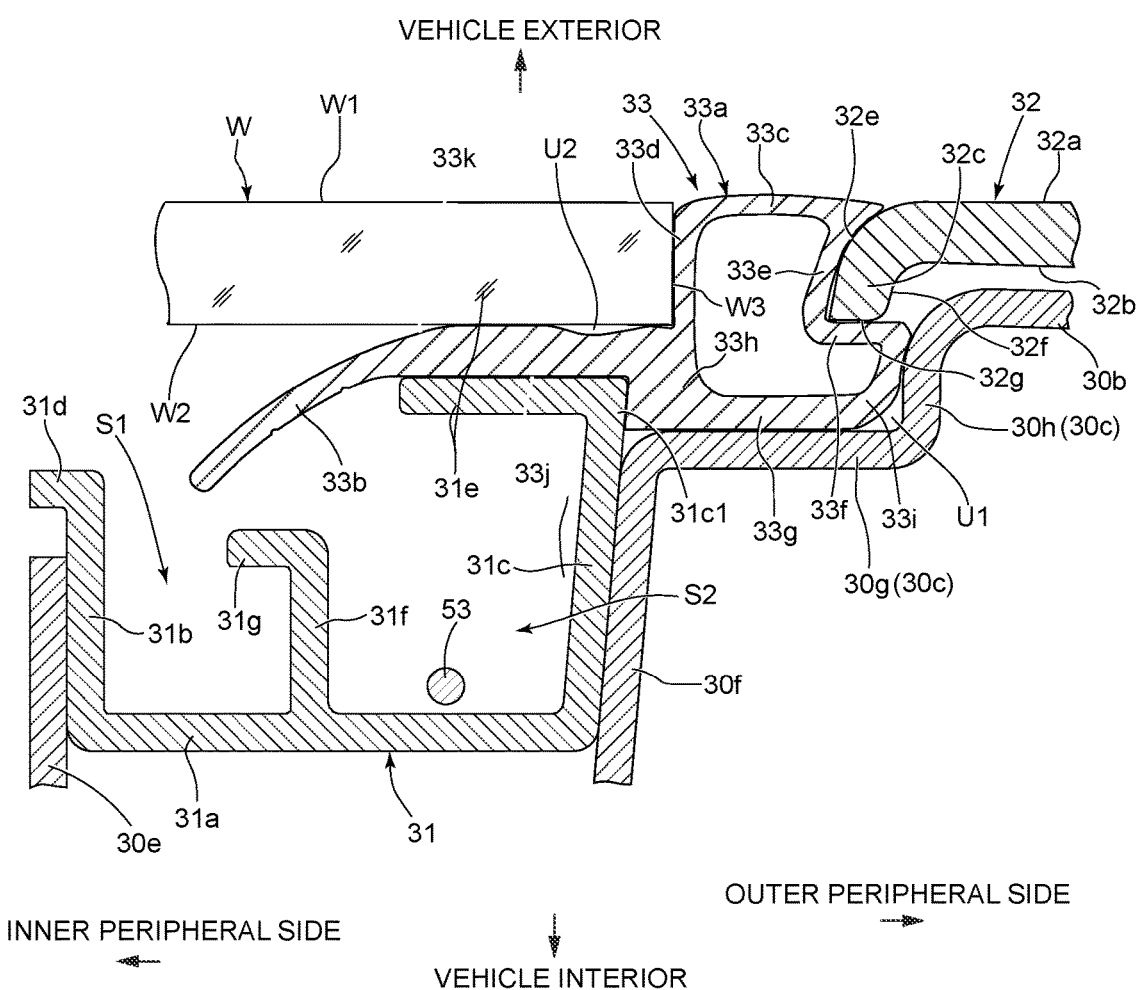
FIG. 11 is a cross-sectional view similar to FIG. 10, illustrating a state in which an elastic cover is elastically deformed.

In a state where the inner sash 30 and the guide rail 31 are combined, the outer peripheral side wall 31c of the guide rail 31 protrudes toward the vehicle exterior side from the outer peripheral extension 30g of the inner sash 30 so as to form a positioning part 31c1 located on the inner peripheral side of the step part 30c (refer to FIGS. 9 to 11). This leads to formation of a holding recess U1 that is open to the vehicle exterior side and having the outer peripheral extension 30g as a bottom with the vehicle exterior extension 30h and the positioning part 32c1 of the step part 30c as both side walls, on the outside (vehicle exterior side and outer peripheral side) of the frame part 30a (refer to FIGS. 9 to 11).

The cover wall 31e formed continuously with the outer peripheral side wall 31c on the guide rail 31 faces the window glass W so as to be separated on the vehicle interior side. The cover wall 31e is located on the vehicle exterior side with respect to the outer peripheral extension 30g, forming a gap U2 communicating with the holding recess U1 between the vehicle interior side surface W2 of the window glass W and the cover wall 31e (FIGS. 9 to 11).

The garnish 32 is a long member that extends in the longitudinal direction of the upright pillar sash 12 so as to cover the vehicle exterior side of the design part 30b. The garnish 32 includes: a vehicle exterior side surface 32a facing the vehicle exterior side; and a vehicle interior side surface 32b facing the vehicle interior side and that is arranged opposite the design part 30b. In the inner and outer peripheral directions, the garnish 32 has a width that covers the entire design part 30b. The inner peripheral side edge and the outer peripheral side edge of the garnish 32 are respectively provided with an inner peripheral edge 32c and an outer peripheral edge 32d curved (bent) toward the vehicle interior side and protruding toward the vehicle interior side with respect to the vehicle interior side surface 32b.

More specifically, as illustrated in FIGS. 10 and 11, the inner peripheral edge 32c of the garnish 32 includes an inner peripheral side surface 32e facing the inner peripheral side, an outer peripheral side surface 32f facing the outer peripheral side, and an end surface 32g facing the vehicle interior side. The inner peripheral side surface 32e is a surface that is continuous with the vehicle exterior side surface 32a, having an inclined shape protruding toward the inner peripheral side while proceeding toward the vehicle interior side, as well as having a curved shape protruding toward the inner peripheral side (especially, a predetermined region from a portion connected to the vehicle exterior side surface 32a is provided as a protruding curved surface). The outer peripheral side surface 32f is a surface that is continuous with the vehicle interior side surface 32b, having an inclined shape protruding toward the inner peripheral side while proceeding toward the vehicle interior side, as well as having a curved shape recessed toward the inner peripheral side (especially, a predetermined region from a portion connected to the vehicle interior side surface 32b is provided as a recessed curved surface). The end surface 32g connects a vehicle interior side end of each of the inner peripheral side surface 32e and the outer peripheral side surface 32f, having a planar shape facing the vehicle interior side.

The boundary portion on the inner sash 30 between the design part 30b and the vehicle exterior extension 30h has a curved shape, and the curved shape of the inner peripheral side surface 32e and the outer peripheral side surface 32f on the inner peripheral edge 32c follows the curved shape of the inner sash 30. Additionally, a part of the tip side of the inner peripheral edge 32c including the end surface 32g is located on the inner peripheral side of the vehicle exterior extension 30h so as to enter the inside of the holding recess U1. The vehicle exterior side surface 32a of the garnish 32 is located at substantially the same position as the vehicle exterior side surface W1 of the window glass W in the vehicle interior and exterior directions, while the end surface 32g is located at a position close to the vehicle interior side surface W2 of the window glass W in the vehicle interior and exterior directions.

Figure 13:
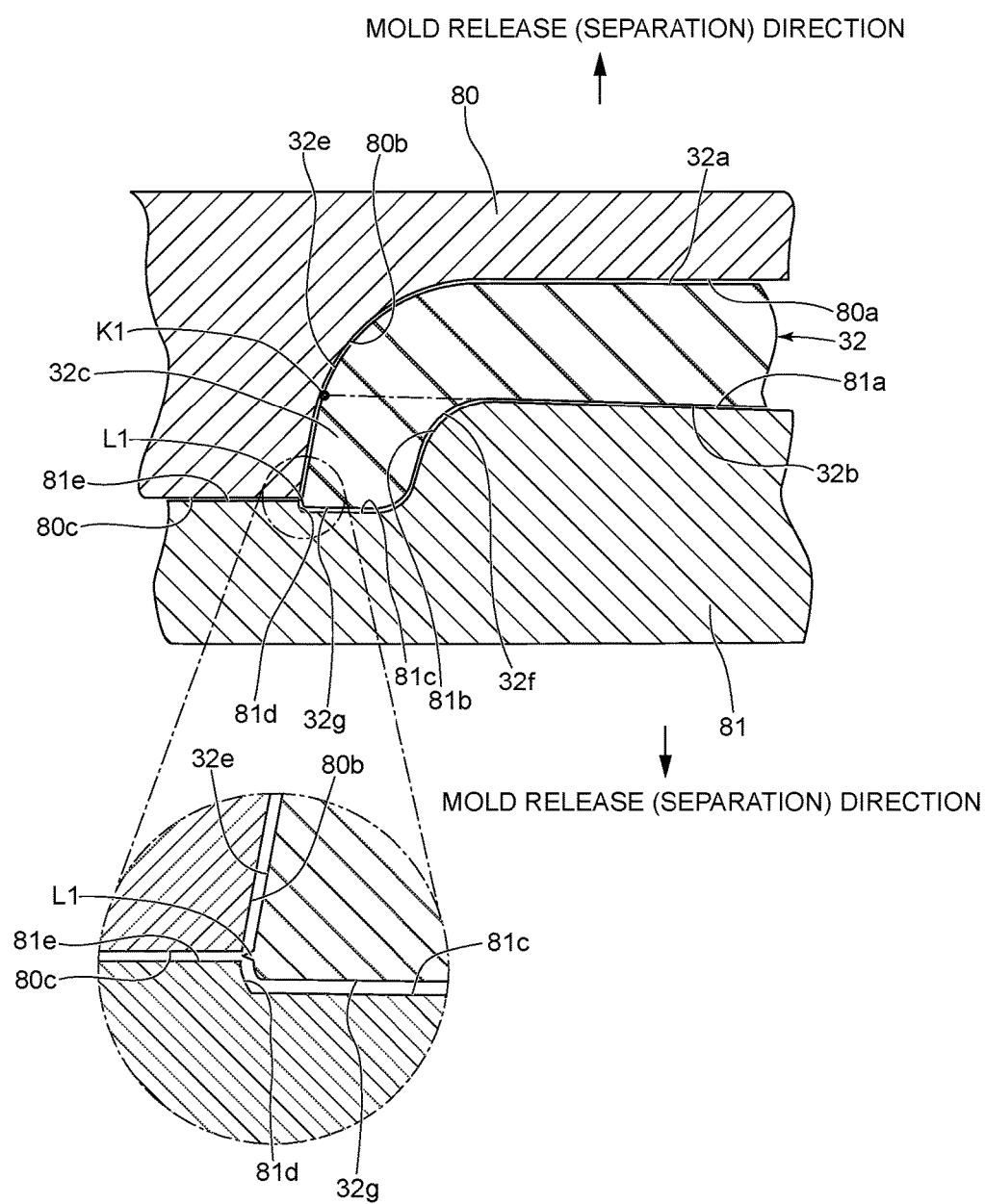
FIG. 13 is a cross-sectional view illustrating a state in which a garnish constituting the upright pillar sash is being molded.

The garnish 32, being a molded product formed of a material such as a synthetic resin, is molded using a molding die illustrated in FIG. 13. This molding die includes an upper die 80 and a lower die 81 relatively movable in the front and back directions of the garnish 32 (corresponding to the vehicle interior and exterior directions when the garnish 32 is assembled to the upright pillar sash 12) when the vehicle exterior side surface 32a and the vehicle interior side surface 32b are respectively defined as front and back.

The upper die 80 includes: a planar first formation region 80a to form the vehicle exterior side surface 32a of the garnish 32; and a second formation region 80b to form a part of the inner peripheral side surface 32e while extending in a curved recessed shape following the first formation region 80a. The lower die 81 includes: a planar first formation region 81a to form the vehicle interior side surface 32b of the garnish 32; a second surface formation region 81b to form the outer peripheral side surface 32f while extending in a curved protruding shape following the first formation region 81a; a third formation region 81c that is continuous from the second surface formation region 81b to form the end surface 32g; and a fourth formation region 81d that is continuous from the third formation region 81c to form a part of the inner peripheral side surface 32e. The upper die 80 includes a mating surface 80c following the second formation region 80b while the lower die 81 includes a mating surface 81e following the fourth formation region 81d. The mating surface 80c and the mating surface 81e are planar surfaces that face each other in contact and approach directions of the upper die 80 and the lower die 81.

As illustrated in FIG. 13, the second formation region 80b and the fourth formation region 81d are aligned so as to be continuous with each other, the upper die 80 and the lower die 81 are brought closer to each other until the mating surface 80c and the mating surface 81e come into contact with each other. Then the garnish 32 is formed by the inner surfaces of the upper die 80 and the lower die 81 (each of formation regions 80a, 80b, 81a, 81b, 81c, and 81d). Although not illustrated, inner surfaces of the upper die 80 and the lower die 81 also include a region for forming the outer peripheral edge 32d, meaning not only the inner peripheral edge 32c but also the outer peripheral edge 32d are formed by the upper die 80 and the lower die 81.

When the upper die 80 and the lower die 81 are separated from each other in the front and back directions of the garnish 32 after molding, a parting line L1 (refer to FIG. 13) will be formed in the inner peripheral edge 32c of the garnish 32 at a position corresponding to the boundary between the mating surface 80c and the mating surface 81e. The parting line L1 is located on the vehicle interior side of an intersection K1 (refer to FIG. 13) at which a virtual line (virtual plane) extending from the vehicle interior side surface 32b of the garnish 32 intersects the inner peripheral side surface 32e.

The garnish 32 can be formed of metal (for example, a steel plate rolled product, an aluminum alloy die-cast product) other than the synthetic resin.

The elastic cover 33, a long member formed of an elastic body, extends in the longitudinal direction of the upright pillar sash 12 so as to be adjacent to the inner peripheral side of the garnish 32. The elastic cover 33 includes: a hollow part 33a having a hollow cross-sectional shape; and a cantilevered lip part 33b protruding toward the inner peripheral side from the hollow part 33a.

FIG. 10 illustrates the shape of the elastic cover 33 in an initial state (free state) under no pressure of the window glass W or the garnish 32. Each parts of the elastic cover 33 in the initial state have the following shapes and structures.

The hollow part 33a of the elastic cover 33 has an internal space having a closed cross-sectional structure surrounded by a vehicle exterior side wall 33c, an inner peripheral side wall 33d, an outer peripheral side wall 33e, an outer peripheral protruding wall 33f, a vehicle interior side wall 33g, an inner peripheral side base wall 33h, and an outer peripheral side base wall 33i.

The vehicle exterior side wall 33c, located on the vehicle exterior side, has a positional relationship to be located side by side with the vehicle exterior side surface W1 of the window glass W and the vehicle exterior side surface 32a of the garnish 32 in the inner and outer peripheral directions. The inner peripheral side wall 33d extends from the inner peripheral side end of the vehicle exterior side wall 33c to the lip part 33b, so as to be located at a position facing the edge surface W3 of the window glass W in the inner and outer peripheral directions. The outer peripheral side wall 33e and the outer peripheral protruding wall 33f form an L shape along the inner peripheral edge 32c of the garnish 32, in which the outer peripheral side wall 33e faces the inner peripheral side surface 32e while the outer peripheral protruding wall 33f faces the end surface 32g.

The vehicle interior side wall 33g comes in contact with the outer peripheral extension 30g of the inner sash 30. The position of the elastic cover 33 (the hollow part 33a in particular) in the vehicle interior and exterior directions is determined by the contact of the vehicle interior side wall 33g with the outer peripheral extension 30g. The vehicle interior side wall 33g also comes in contact with the bent part 35h of the connecting member 35 (refer to FIGS. 16 to 18) at the door corner part 10d where the connecting member 35 is provided.

The inner peripheral side base wall 33h is formed at a corner between the inner peripheral side end of the vehicle interior side wall 33g and the lip part 33b, and comes into contact with the positioning part 31c1 of the guide rail 31. The outer peripheral side base wall 33i connects the outer peripheral side end of each of the outer peripheral protruding wall 33f and the vehicle interior side wall 33g and has an inclined shape protruding toward the outer peripheral side while proceeding from the vehicle interior side (the vehicle interior side wall 33g) to the vehicle exterior side (the outer peripheral protruding wall 33f). The shape and size of the hollow part 33a in the initial state are set such that the outer peripheral side base wall 33i is separated from the step part 30c (a triangular space is formed between the outer peripheral side base wall 33i, the outer peripheral extension 30g, and the vehicle exterior extension 30h) in a state where the inner peripheral side base wall 33h is in contact with the positioning part 31c1 (refer to FIG. 10). That is, the position of the elastic cover 33 in the inner and outer peripheral directions is determined by the contact of the inner peripheral side base wall 33h with the positioning part 31c1.

In the hollow part 33a, the vehicle interior side wall 33g and the inner peripheral side base wall 33h are thick, while the vehicle exterior side wall 33c, the inner peripheral side wall 33d, the outer peripheral side wall 33e, and the outer peripheral protruding wall 33f are thin. In other words, the hollow part 33a is thick and is excellent in stability in a portion that is held (positioned) in contact with the inner sash 30 and the guide rail 31 in the holding recess U1, while the portion sandwiched between the window glass W and the garnish 32 is thin and is highly elastically deformable.

The lip part 33b of the elastic cover 33 extends from the hollow part 33a between the inner peripheral side wall 33d and the inner peripheral side base wall 33h toward the inner peripheral side. A predetermined range on the base end side of the lip part 33b connected to the hollow part 33a is inserted into the gap U2 between the window glass W and the cover wall 31e, while the tip end of the lip part 33b protrudes toward the inner peripheral side from the gap U2.

As illustrated in FIG. 10, the lip part 33b in the initial state (free state) has a planar shape in which a vehicle interior side surface 33j facing the cover wall 31e runs along the cover wall 31e, and the vehicle exterior side surface 33k facing the vehicle interior side surface W2 of the window glass W has an uneven shape. More specifically, the base end portion of the vehicle exterior side surface 33k close to the hollow part 33a (the inner peripheral side wall 33d) is a recessed shape that is recessed toward the vehicle interior side, and the inner peripheral side of the recessed portion has a protruding shape bulging toward the vehicle exterior side. The thickness of the protruding portion of the lip part 33b in the vehicle interior and exterior directions is greater than the width of the gap U2.

A portion of the lip part 33b protruding from the gap U2 toward the inner peripheral side is elastically deformable. The protruding portion of the lip part 33b has a curved shape so as to protrude toward the vehicle interior side while proceeding to the inner peripheral side, and the tip of the lip part 33b is located in the vicinity of the tip of the holding wall 31g of the guide rail 31.

As illustrated in FIG. 10, the elastic cover 33 in the initial state (free state) has a relationship in which a part of the inner peripheral side wall 33d (a region close to the lip part 33b) of the hollow part 33a and a protruding shape of the vehicle exterior side surface 33k of the lip part 33b overlap the window glass W. There is also a relationship in which a part of the outer peripheral side wall 33e (a region close to the vehicle exterior side wall 33c) of the hollow part 33a overlaps the garnish 32. These overlapping portions are pressed by the window glass W and the garnish 32 so as to elastically deform the elastic cover 33, leading to the holding state illustrated in FIG. 11.

In the holding state of FIG. 11, the inner peripheral side wall 33d of the hollow part 33a of the elastic cover 33 is pressed by the window glass W while being shaped to run along the edge surface W3. The pressing force from the window glass W acts toward the outer peripheral side so as to press the hollow part 33a against the garnish 32, and the outer peripheral side wall 33e increases the degree of adhesion with the inner peripheral side surface 32e of the garnish 32. Furthermore, a pressing force acts on the hollow part 33a in the inner peripheral direction also from the garnish 32, and the inner peripheral side wall 33d comes into close contact with the edge surface W3 of the window glass W. Therefore, the hollow part 33a of the elastic cover 33 adheres to both the window glass W and the garnish 32 while elastically deforming in the inner and outer peripheral directions, so as to close the gap between the window glass W and the garnish 32 with high water-tightness. The vehicle exterior side wall 33c of the hollow part 33a is substantially flush with the vehicle exterior side surface W1 of the window glass W and the vehicle exterior side surface 32a of the garnish 32.

When the inner peripheral side wall 33d of the hollow part 33a is pressed against the edge surface W3 of the window glass W due to the inclined shape in the initial state (refer to FIG. 10), the wall 33d also receives the pressing force toward the vehicle interior side in addition to the pressing force toward the outer peripheral side. That is, the hollow part 33a is pressed by the component force from the window glass W toward the outer peripheral side and the component force toward the vehicle interior side. This makes the vehicle interior side wall 33g to be pressed against the outer peripheral extension 30g. This pressing causes a force to push and spread the vehicle interior side wall 33g in the inner and outer peripheral directions. Since the inner peripheral side base wall 33h is in a shape that comes into contact with the positioning part 32c1 in the initial state (FIG. 10), the inner peripheral side base wall 33h maintains the close contact with the positioning part 32c1 and determines the position of the hollow part 33a in the inner and outer peripheral directions. Meanwhile, there is room in the initial state (FIG. 10) between the outer peripheral side base wall 33i and the step part 30c, and thus, the hollow part 33a presses the portion from the outer peripheral side base wall 33i to the outer peripheral protruding wall 33f against the vehicle exterior extension 30h while reducing the space between the step part 30c and the outer peripheral side base wall 33i.

In the holding state of the elastic cover 33 illustrated in FIG. 11, the protruding portion of the vehicle exterior side surface 33k in the lip part 33b is pressed by the vehicle interior side surface W2 of the window glass W, and the lip part 33b is compressed and deformed in the vehicle interior and exterior directions to achieve water-tight sealing of the inside of the gap U2. Performing the sealing by the lip part 33b at the vehicle interior side surface W2 of the window glass W in addition to the sealing by the hollow part 33a at the edge surface W3 of the window glass W will further enhance the water-tightness between the window glass W and the upright pillar sash 12.

In the door 10 of the present embodiment in particular, the components of the window regulator 40 are incorporated in the upright pillar sash 12 as described below. Therefore, using the elastic cover 33 to seal the portion between the window glass W and the upright pillar sash 12 with high water-tightness will be highly effective.

With the configuration of the elastic cover 33 in which the portion held by the holding recess U1 and sandwiched between the window glass W and the garnish 32 is formed as the hollow part 33a, it is possible to achieve a seal member having excellent stability in cross-sectional structure compared to the case of a partially open cross section or a cantilevered form. As a result, the hollow part 33a can be reliably brought into contact with the window glass W and each of portions of the upright pillar sash 12 (the step part 30c, the positioning part 31c1, and the inner peripheral edge 32c of the garnish 32) with an appropriate contact pressure while absorbing variations in component accuracy and assembly accuracy of the elastic cover 33 and its peripheral members (the inner sash 30, the guide rail 31, the garnish 32), leading to achievement of high water-tightness.

Furthermore, even when the gap between the window glass W and the garnish 32 has variations in the inner and outer peripheral directions, the hollow part 33a can maintain a stable external width in the inner and outer peripheral directions.

Furthermore, with the configuration in which the outer peripheral side base wall 33i has a predetermined space between the step part 30c in the hollow part 33a in the initial state (FIG. 10), and the elastic cover 33 is elastically deformed in a direction to reduce the space when forming the holding state (FIG. 11), it is possible to enhance the performance of absorbing variations in accuracy.

In the hollow part 33a in the holding state of FIG. 11, using a configuration in which the substantially L-shaped outer peripheral side wall 33e and the outer peripheral protruding wall 33f are fitted to the inner peripheral edge 32c of the garnish 32 would achieve higher stability. As described above, the hollow part 33a receives the pressing force from the window glass W to the outer peripheral side and the vehicle interior side due to the inclined shape of the inner peripheral side wall 33d in the initial state (FIG. 10), and the vehicle interior side wall 33g comes in contact with the outer peripheral extension 30g of the inner sash 30, thereby regulating the movement toward the vehicle interior side. Furthermore, the outer peripheral protruding wall 33f faces the end surface 32g of the inner peripheral edge 32c of the garnish 32, thereby regulating the movement (falling off) of the hollow part 33a to the vehicle exterior side. This makes it possible to stably hold the hollow part 33a in the vehicle interior and exterior directions.

Although details will be described below, the first section S1 of the guide rail 31 is a portion that slidably supports shoes 43 and 44 of the sliders 45 and 46 that support the window glass W. That is, the position of the window glass W in the inner and outer peripheral directions is determined by the inner peripheral side wall 31b and the partition wall 31f constituting the first section S1 of the guide rail 31, and the position of the window glass W in the vehicle interior and exterior directions is determined by the vehicle interior side wall 31a and the holding wall 31g. The positioning part 31c1 for positioning the elastic cover 33 in the inner and outer peripheral directions is a part of the guide rail 31. That is, both the window glass W and the elastic cover 33 are positioned with reference to the guide rail 31. This makes it possible to achieve a stable positional relationship (suppressing positional variation) between the window glass W and the elastic cover 33. Since the elastic cover 33 functions as a sealing member by being pressed by the window glass W in the holding state (FIG. 11). Therefore, when the positional relationship between the window glass W and the elastic cover 33 is stable, the degree of adhesion of the elastic cover 33 to the window glass W and each of components of the upright pillar sash 12 will be stabilized, leading to achievement of high water-tightness by the elastic cover 33. Furthermore, as described below, since the elastic cover 33 allows the lip part 33b to come in contact with the sliders 45 and 46. Therefore, when the positional relationship between the window glass W and the elastic cover 33 is stable, it is possible to suppress a change in the load on the sliders 45 and 46, leading to achievement of enhanced sliding performance of the sliders 45 and 46 with respect to the guide rail 31.

The garnish 32 and the elastic cover 33 are parts that form the appearance of the upright pillar sash 12 when the door 10 is viewed from the vehicle exterior side. The upright pillar sash 12 has a flash surface structure in which the garnish 32 is arranged in a positional relationship substantially flush with the vehicle exterior side surface W1 of the window glass W. The elastic cover 33 is held in a highly accurate and stable state in which the hollow part 33a is unlikely to bulge toward the vehicle exterior side as described above. Accordingly, it is possible to have an appearance having aesthetic excellence in the flash surface structure as well as in the window glass W and the garnish 32 while achieving excellent water-tightness.

In addition, the garnish 32 sets the position of the parting line L1 generated by the molding to the vehicle interior side of the intersection K1 (the position where the vehicle interior side surface 32b is extended) on the inner peripheral side surface 32e of the inner peripheral edge 32c (refer to FIG. 13). This configuration makes it possible to reliably cover the parting line L1 with the elastic cover 33 even when there is some variation in accuracy. Since the parting line L1 is not visible in the appearance, the garnish 32 has good appearance, contributing to the aesthetic improvement in the upright pillar sash 12.

The elastic cover 33 includes the lip part 33b located on the vehicle interior side of the window glass W and covers most of the guide rail 31 from the vehicle exterior side, in addition to the hollow part 33a which is visible directly in the appearance of the upright pillar sash 12 between the window glass W and the garnish 32. With this configuration, the internal structure of the upright pillar sash 12 is covered on the inner peripheral side of the garnish 32 with substantially no visibility in the appearance, leading to achievement of an excellent aesthetic appearance even in a region where the window glass W and the upright pillar sash 12 overlap in the vehicle interior and exterior directions.

Figure 12:
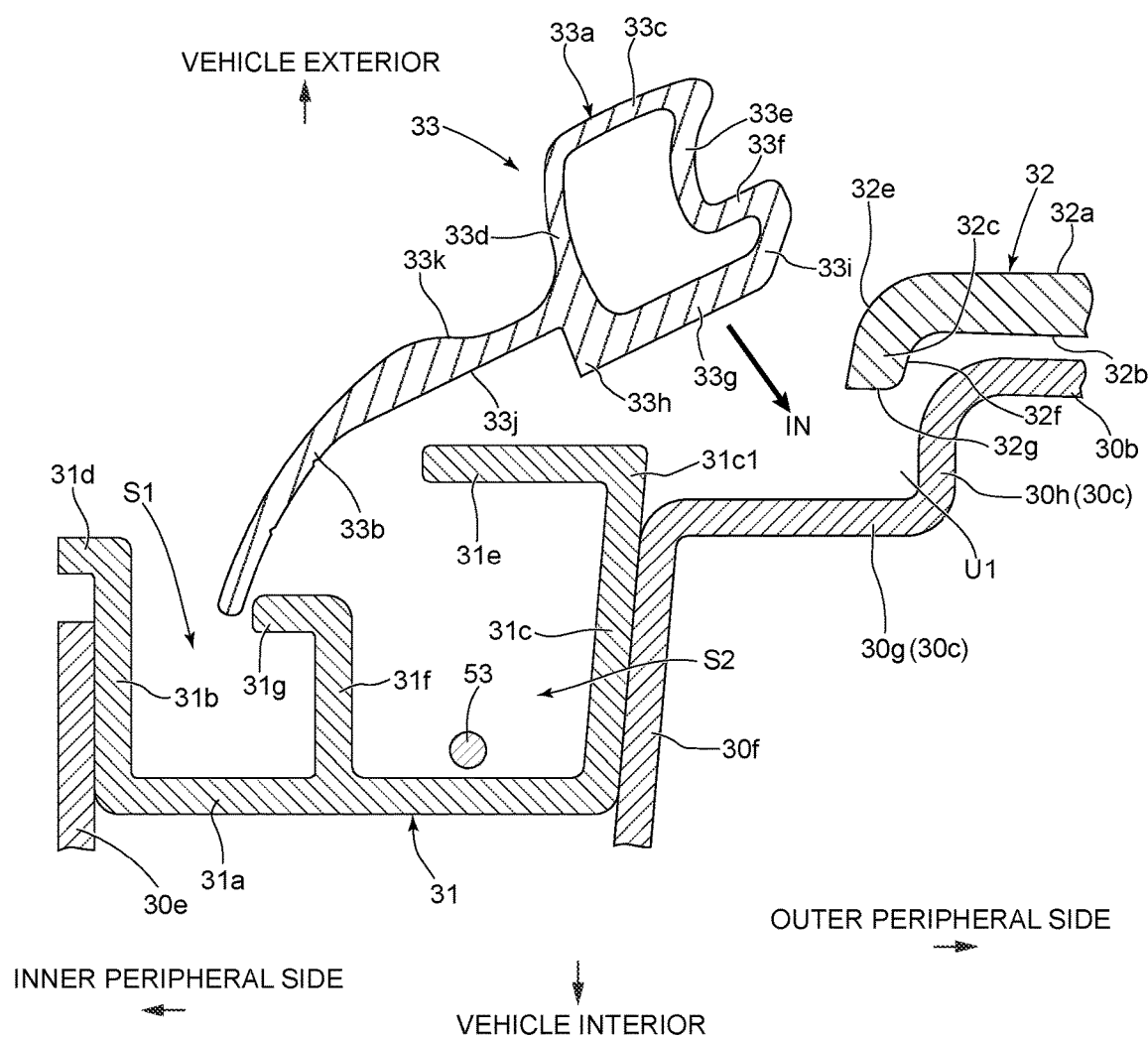
FIG. 12 is a cross-sectional view illustrating a state in which the elastic cover is being assembled to the upright pillar sash.

As illustrated in FIG. 12, the state in which the window glass W does not exist at the cross-sectional position of the upright pillar sash 12 to be attached is produced when the elastic cover 33 is to be attached to the upright pillar sash 12. Specifically, the window glass W is lowered to the fully open position (refer to FIG. 20). In this state, the elastic cover 33 is inclined as illustrated in FIG. 12, and the hollow part 33a is inserted in the direction of an arrow IN. The hollow part 33a enters the holding recess U1 after passing between the positioning part 31c1 of the guide rail 31 and the inner peripheral edge 32c of the garnish 32. At this time, the outer peripheral side base wall 33i of the elastic cover 33 and the inner peripheral side surface 32e of the garnish 32 come in contact with each other. The outer peripheral side base wall 33i and the inner peripheral side surface 32e form an inclined shape so as to push the hollow part 33a toward the inner peripheral side as proceeding in an insertion direction (arrow IN). Therefore, the hollow part 33a is inserted into the holding recess U1 through the space with the positioning part 31c1 while being compressed and contracted in the inner and outer peripheral directions. Since the outer peripheral side base wall 33i and the inner peripheral side surface 32e have mutually smooth inclined shapes, the hollow part 33a can be smoothly inserted into the holding recess U1.

After the hollow part 33a is inserted into the holding recess U1 along the arrow IN in FIG. 12, the elastic cover 33 is rotated clockwise in FIG. 12. This movement allows the outer peripheral side wall 33e and the outer peripheral protruding wall 33f of the elastic cover 33 to be fitted to the inner peripheral edge 32c of the garnish 32, leading to the stable holding state of the elastic cover 33 illustrated in FIG. 10. At this time, falling off of the hollow part 33a of the elastic cover 33 from the holding recess U1 to the inner peripheral side or the vehicle exterior side is restricted by the positioning part 31c1 and the inner peripheral edge 32c. That is, the position of the hollow part 33a of the elastic cover 33 is determined in both the vehicle interior and exterior directions and the inner and outer peripheral directions with respect to the holding recess U1. Accordingly, even in a state where the window glass W is opened (the state where the window glass W is omitted from FIG. 10), the elastic cover 33 after attachment is stably held by the upright pillar sash 12.

As described above, the upper sash 11 and the upright pillar sash 12 have partially different cross-sectional structures. The upper sash 11 and the upright pillar sash 12 having different cross-sectional structures are connected with each other via the connecting member 35 at the door corner part 10d. The connecting member 35 is manufactured by die-casting a metal such as aluminum. The connecting member 35 includes: a first frame part 35a located on an extension of the upper sash 11; and a second frame part 35b located on an extension of the upright pillar sash 12.

The front end of the first frame part 35a of the connecting member 35 is a contact end surface 35c facing the rear end of the sash body 20 of the upper sash 11. The contact end surface 35c has a shape including the frame part 20a and the plate part 20b in the sash body 20, and a region corresponding to a hollow part of the frame part 20a is closed in the contact end surface 35c. This makes it possible to reliably bring the rear end surface of the sash body 20 into contact with the contact end surface 35c.

Figure 6:
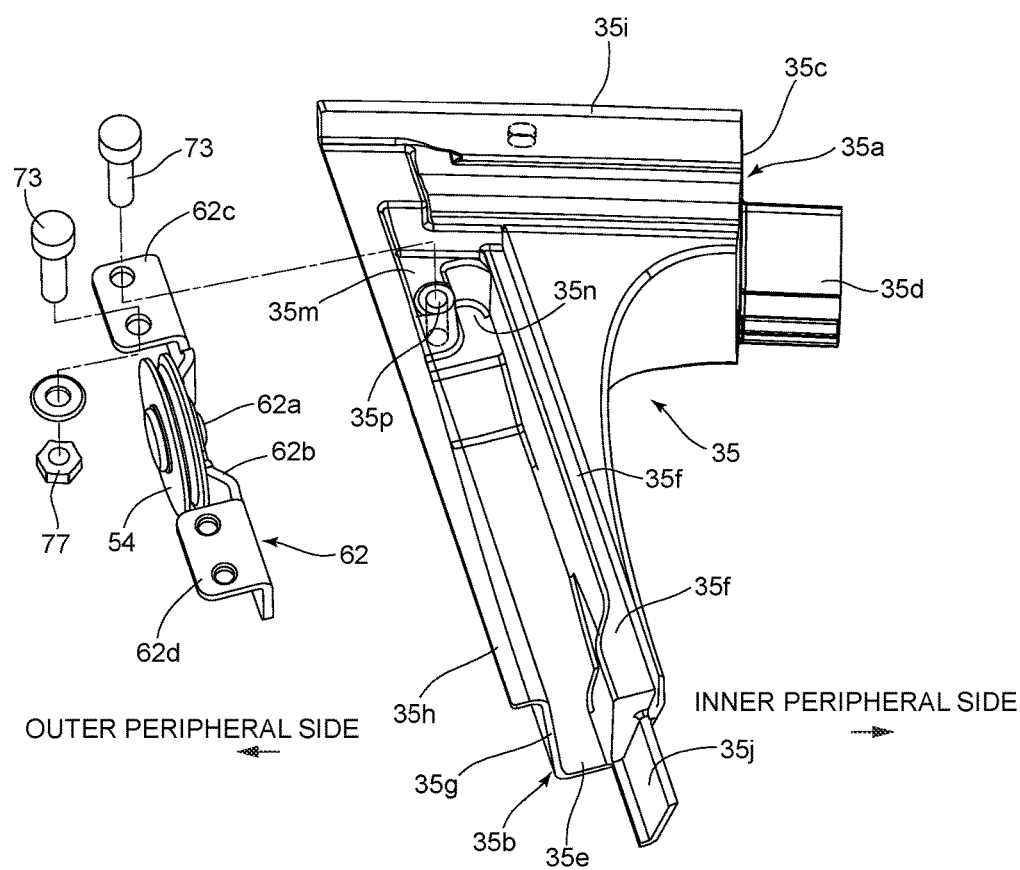
FIG. 6 is a perspective view of a connecting member constituting the door corner part when viewed from the vehicle exterior side.
Figure 7:
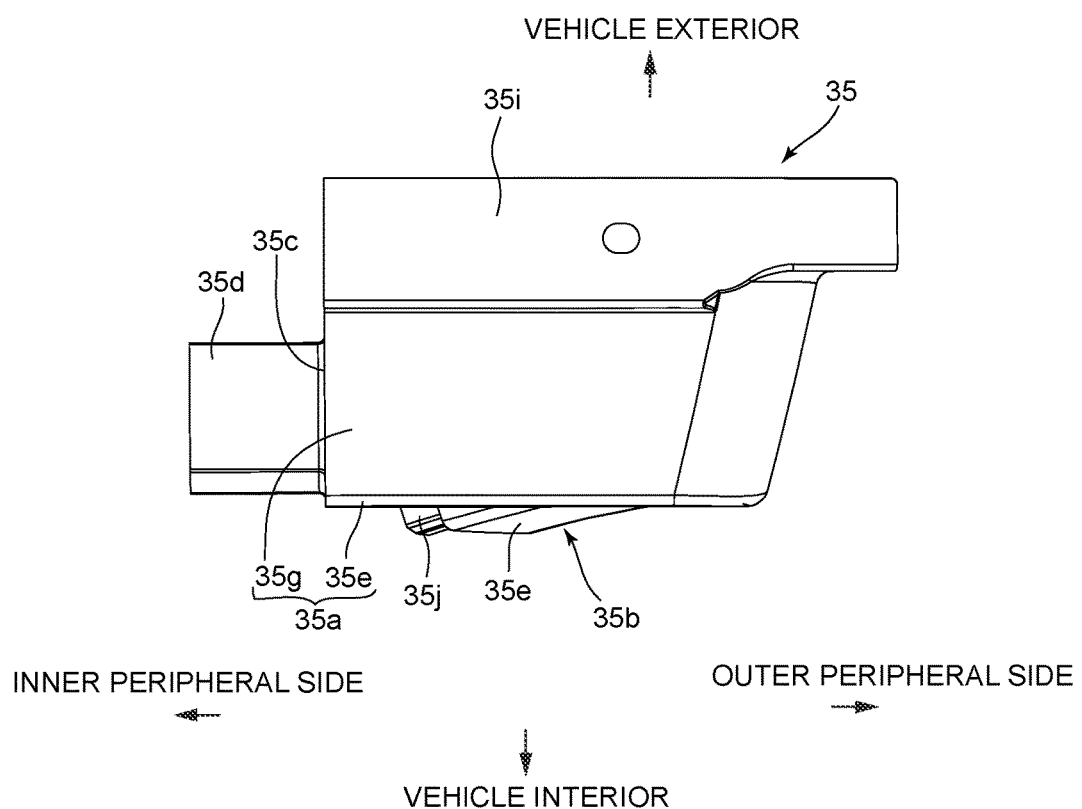
FIG. 7 is a top view of the connecting member.

An insertion projection 35d is provided to project forward from the contact end surface 35c (refer to FIGS. 6 and 7). The insertion projection 35d has a shape to run along the inner surface of the hollow frame part 20a. The insertion projection 35d is inserted into the frame part 20a in a state where the rear end surface of the sash body 20 is in contact with the contact end surface 35c. In this state, the connecting member 35 and the sash body 20 are joined by means such as welding.

At an upper end of the connecting member 35, there is provided a plate part 35i which is continuous with the plate part 20b of the upper sash 11 in a state where the upper sash 11 and the first frame part 35a are joined with each other. A weather-strip (not illustrated) held by the weather-strip holder 24 of the upper sash 11 extends to above the connecting member 35 and is continuously held by the plate part 35i.

The lower end of the second frame part 35b of the connecting member 35 has a shape corresponding to a portion of the inner sash 30 of the upright pillar sash 12 excluding the design part 30b. More specifically, the connecting member 35 includes: a vehicle interior side wall 35e continuous with the vehicle interior side wall 30d; an inner peripheral side wall 35f continuous with the inner peripheral side wall 30e; and an outer peripheral side wall 35g continuous with the outer peripheral side wall 30f. Furthermore, a bent part 35h continuous with a part of the outer peripheral extension 30g on the inner peripheral side is provided at the vehicle exterior side end of the outer peripheral side wall 35g.

The inner peripheral side wall 35f of the second frame part 35b have partially different thicknesses in the inner and outer peripheral directions. The inner peripheral side wall 35f is thick near the lower end of the second frame part 35b, and an insertion projection 35j is provided to project downward from the lower end surface of the inner peripheral side wall 35f (refer to FIGS. 6 and 7). The insertion projection 35j has a shape to run along the inner surface of the frame part 30a of the inner sash 30, and the insertion projection 35j is inserted into the frame part 30a in a state where the upper end surface of the inner sash 30 is in contact with the lower end surface of the second frame part 35b. In this state, the connecting member 35 and the inner sash 30 are joined by means such as welding.

The design part 30b and the step part 30c of the inner sash 30 (the whole of the vehicle exterior extension 30h and a part of the outer peripheral side of the outer peripheral extension 30g) extend to the upper end of the upright pillar sash 12. At a position above the joint between the lower end surface of the second frame part 35b and the upper end surface of the inner sash 30, the edge of the bent part 35h on the connecting member 35 comes in contact with a vertically extending side contact surface 30i formed on the step part 30c (refer to FIGS. 16 to 18).

Figure 16:
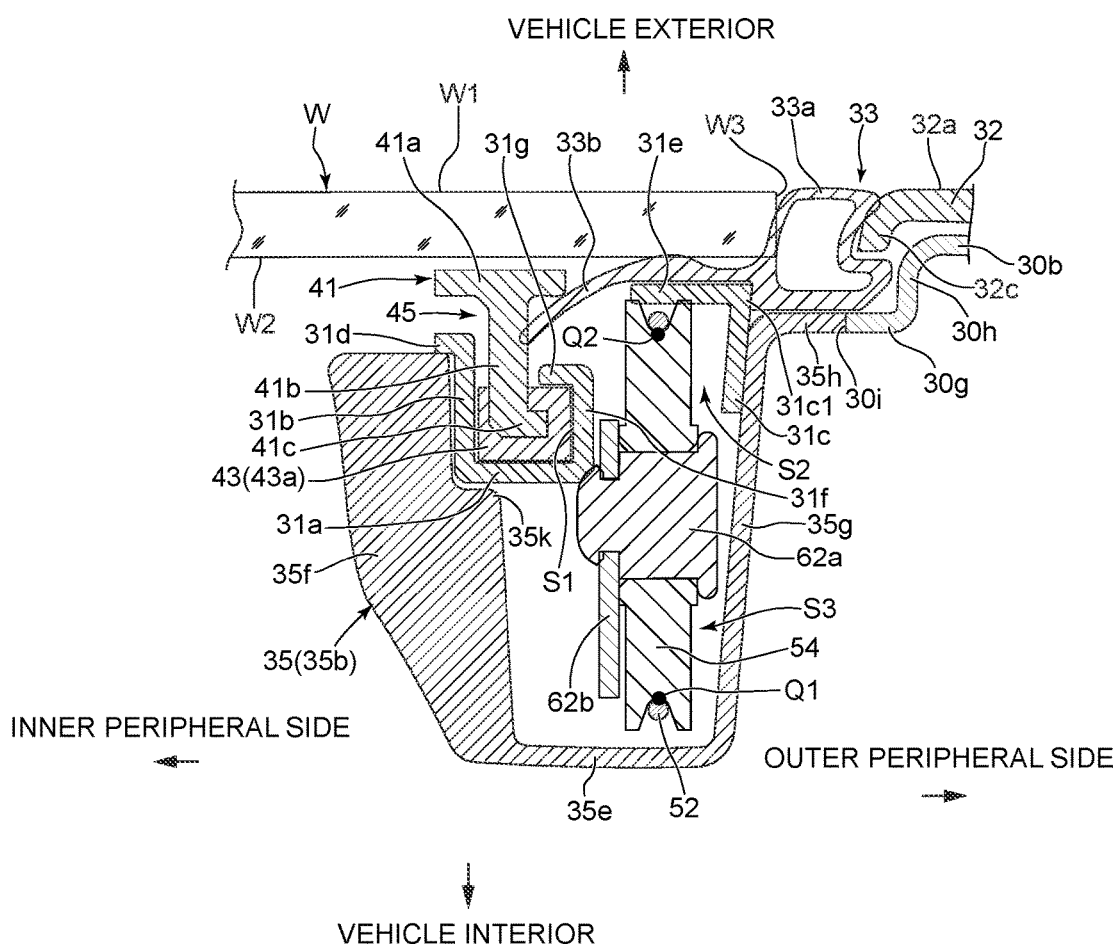
FIG. 16 is a cross-sectional view of the upright pillar sash at a position along line XVI-XVI in FIG. 23.
Figure 17:
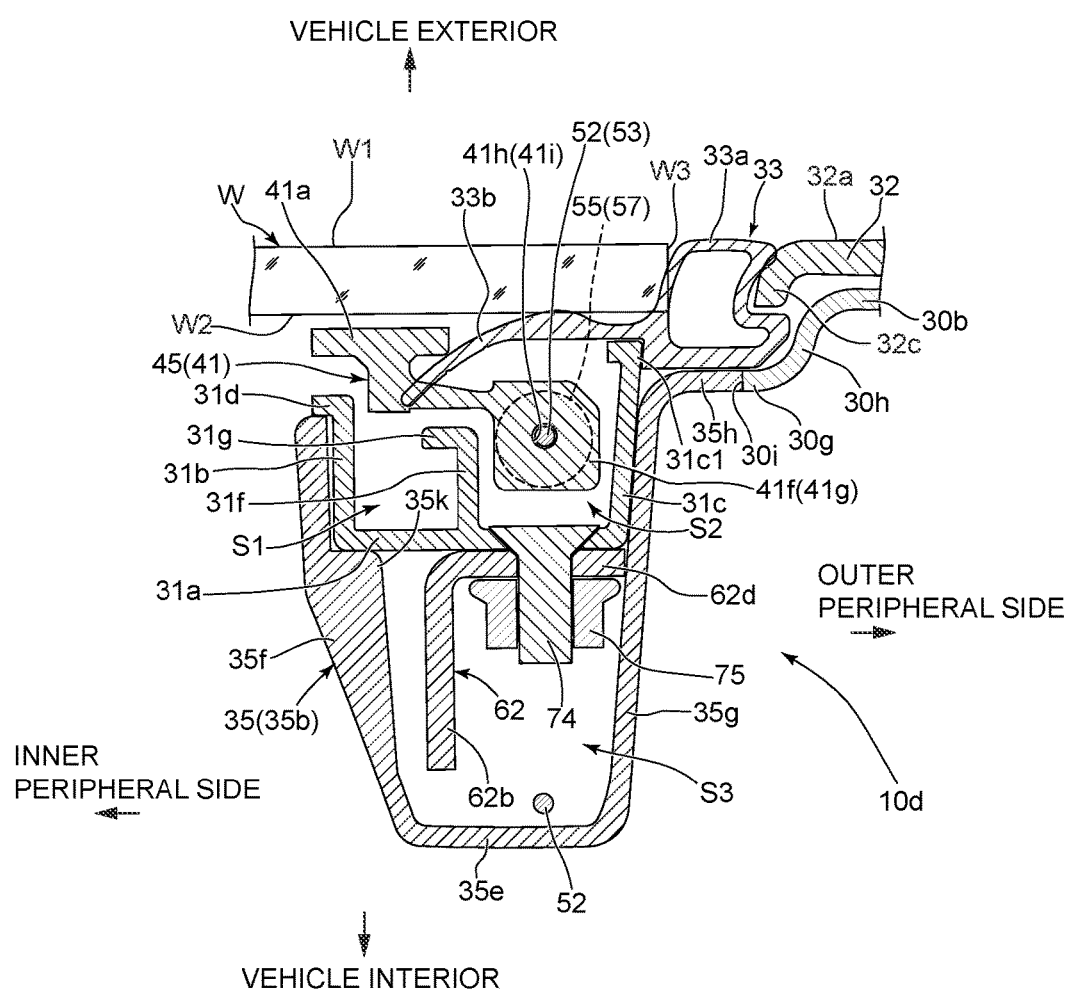
FIG. 17 is a cross-sectional view of the upright pillar sash at a position along line XVII-XVII in FIG. 23.

As illustrated in FIGS. 16 and 17, the vehicle exterior side end of the inner peripheral side wall 35f comes in contact with the bent part 31d of the guide rail 31, thereby determining the position of the connecting member 35 with respect to the inner sash 30 in the vehicle interior and exterior directions. In addition, similar to the general cross-section (FIG. 9) of the upright pillar sash 12, a third section S3 is formed, inside the second frame part 35b joined to the upright pillar sash 12, so as to be surrounded by the vehicle interior side wall 35e, the inner peripheral side wall 35f, the outer peripheral side wall 35g, and the vehicle interior side wall 31a of the guide rail 31.

By joining the first frame part 35a and the second frame part 35b respectively to the sash body 20 and the inner sash 30 as described above, the upper sash 11 and the upright pillar sash 12 are connected via the connecting member 35, thereby forming the door corner part 10d.

Figure 5:
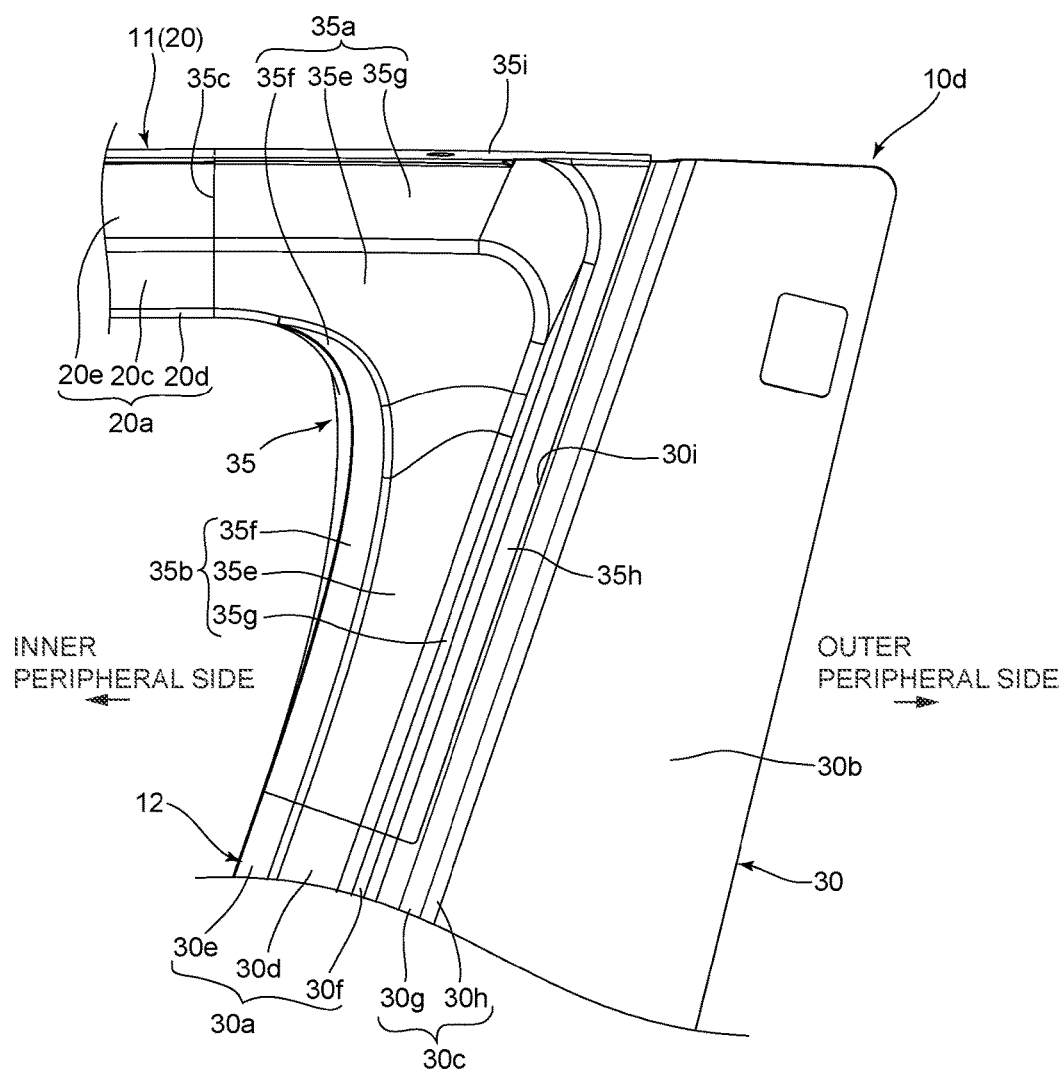
FIG. 5 is a view of a door corner part of a door sash viewed from the vehicle interior side.

The vehicle interior side wall 35e of the connecting member 35 has an L-shape extending forward and downward from the position near the upper end of the upright pillar sash 12 when viewed from the vehicle interior side as illustrated in FIG. 5. The vehicle interior side wall 35e is substantially flush with each of the vehicle interior side wall 20c of the upper sash 11 and the vehicle interior side wall 30d of the upright pillar sash 12. The inner peripheral side wall 35f of the connecting member 35 extends forward and downward while bending, and is substantially flush with each of the inner peripheral side wall 20d of the upper sash 11 and the inner peripheral side wall 30e of the upright pillar sash 12. Similarly, the outer peripheral side wall 35g of the connecting member 35 extends forward and downward while bending, and is substantially flush with each of the outer peripheral side wall 20e of the upper sash 11 and the outer peripheral side wall 30f of the upright pillar sash 12. That is, the frame part 20a of the upper sash 11 (excluding the vehicle exterior side wall 20f) and the frame part 30a of the upright pillar sash 12 are smoothly connected with each other by the first frame part 35a and the second frame part 35b of the connecting member 35.

The connecting member 35 changes the internal shape of the second frame part 35b in accordance with the difference in the position in the vertical direction. As illustrated in FIG. 16 and FIG. 17, unlike the inner peripheral side wall 30e of the inner sash 30 in the general cross section (refer to FIG. 9), the inner peripheral side wall 35f in the second frame part 35b gradually increases its thickness from the portion connected to the vehicle interior side wall 35e toward the vehicle exterior side. Consequently, the inner peripheral side wall 35f overlaps a part of the guide rail 31 in the inner and outer peripheral directions, thereby forming a step part 35k shaped to fit into a corner at the boundary between the vehicle interior side wall 31a and the inner peripheral side wall 31b, on the inner peripheral side wall 35f (refer to FIGS. 16 and 17). Further above the second frame part 35b, the inner peripheral side wall 35f extends forward to be continuous to the first frame part 35a as illustrated in FIG. 18.

Furthermore, the second frame part 35b also has partially different thicknesses in the vehicle interior and exterior directions with respect to the vehicle interior side wall 35e. The thickness of the vehicle interior side wall 35e is substantially the same as the thickness of the vehicle interior side wall 30d of the inner sash 30 near the lower end of the second frame part 35b. As illustrated in FIGS. 6, 16, and 17, the vehicle interior side wall 35e extends upward while substantially maintaining this thickness, and the third section S3 ensures a sufficient width in the vehicle interior and exterior directions up to a position near the upper end of the upright pillar sash 12.

Figure 18:
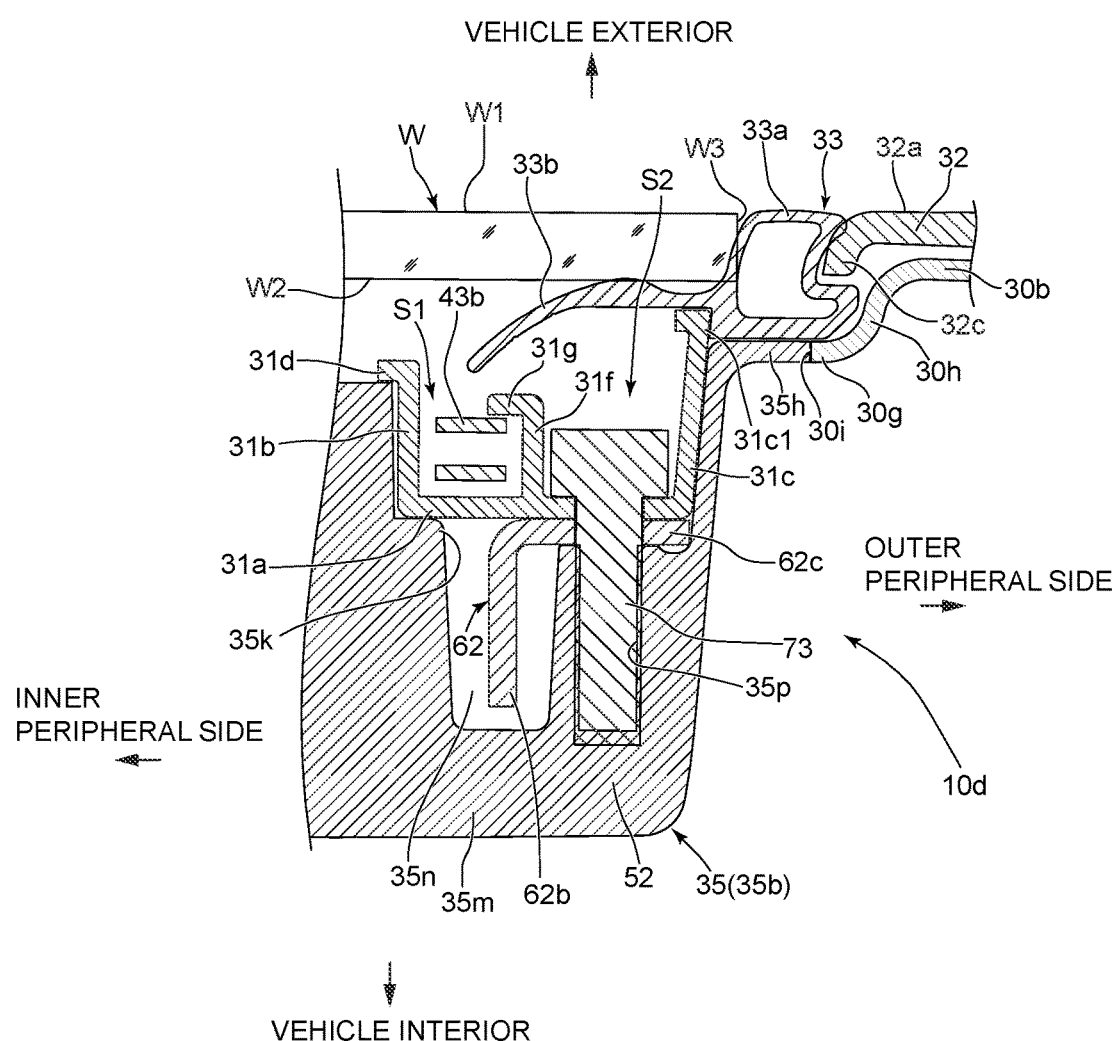
FIG. 18 is a cross-sectional view of the upright pillar sash at a position along line XVIII-XVIII in FIG. 23.

As illustrated in FIG. 6 and FIG. 18, at a position above the second frame part 35b (at a position on the rear extension of the first frame part 35a), the region continuing upward to the above-described vehicle interior side wall 35e is defined as a thick part 35m whose thickness is partially increased up to a position in the proximity of the vehicle interior side wall 31a of the guide rail 31. The thick part 35m forms a seat surface facing the vehicle exterior side. There are provided an escape recess 35n as a part of the third section S3 and a screw hole 35p communicating with the escape recess 35n, formed to be recessed from the seat surface to the vehicle interior side. The escape recess 35n is a space having an L-shaped cross-sectional shape including: a first region located on the vehicle interior side of the first section S1 and the second section S2 along the vehicle interior side wall 31a; and a second region obtained by extending a portion of the first region corresponding to the first section S1 toward the vehicle interior side. The screw hole 35p is a cylindrical hole that extends a portion of the first region of the escape recess 35n corresponding to the second section S2 toward the vehicle interior side, having a female screw formed on its inner peripheral surface. Each of the escape recess 35n and the screw hole 35p is a bottomed recess or hole recessed from the vehicle exterior side toward the vehicle interior side and do not penetrate (open) onto the vehicle interior side surface of the second frame part 35b.

As described above, the connecting member 35 having a complicated structure having a different cross-sectional shape and thickness depending on the difference in the position of the door sash 10b in the longitudinal direction can be manufactured with high precision by die casting. Moreover, since the connecting member 35 as a die-cast product can internally form the bottomed screw hole 35p or the thick part 35m or the like with high precision without forming a mold release hole or the like on the outer surface, it is possible to achieve both high internal functionality and excellent appearance.

As illustrated in FIG. 4, the upright pillar sash 12 further includes an inner cover 36 that covers the inner sash 30 and the connecting member 35 from the vehicle interior side. Note that the cross-sectional views of the upright pillar sash 12 (FIGS. 9 to 11 and FIGS. 14 to 18) omit illustration of the inner cover 36. The inner cover 36 includes: a frame part 36a having a cross-sectional shape substantially corresponding to the cross-sectional shape of the frame part 30a of the inner sash 30 and the second frame part 35b of the connecting member 35; and a plate part 36b protruding from the frame part 36a toward the vehicle exterior side.

The plate part 36b of the inner cover 36 has a shape that is continuous with the plate part 35i of the connecting member 35. A weather-strip holder (not illustrated) formed of another component is attached from the plate part 35i to the plate part 36b. The weather-strip is continuously held by the portions from the weather-strip holder 24 (refer to FIG. 2) of the upper sash 11 to the weather-strip holder on the plate part 35i and the plate part 36b, and is arranged over the entire outer peripheral portions of the door sash 10b including the door corner part 10d.

The door 10 includes a window regulator 40 (refer to FIGS. 8, 22 to 24) for performing elevating and lowering drive of the window glass W. The window regulator 40 is incorporated in the upright pillar sash 12.

Figure 8:
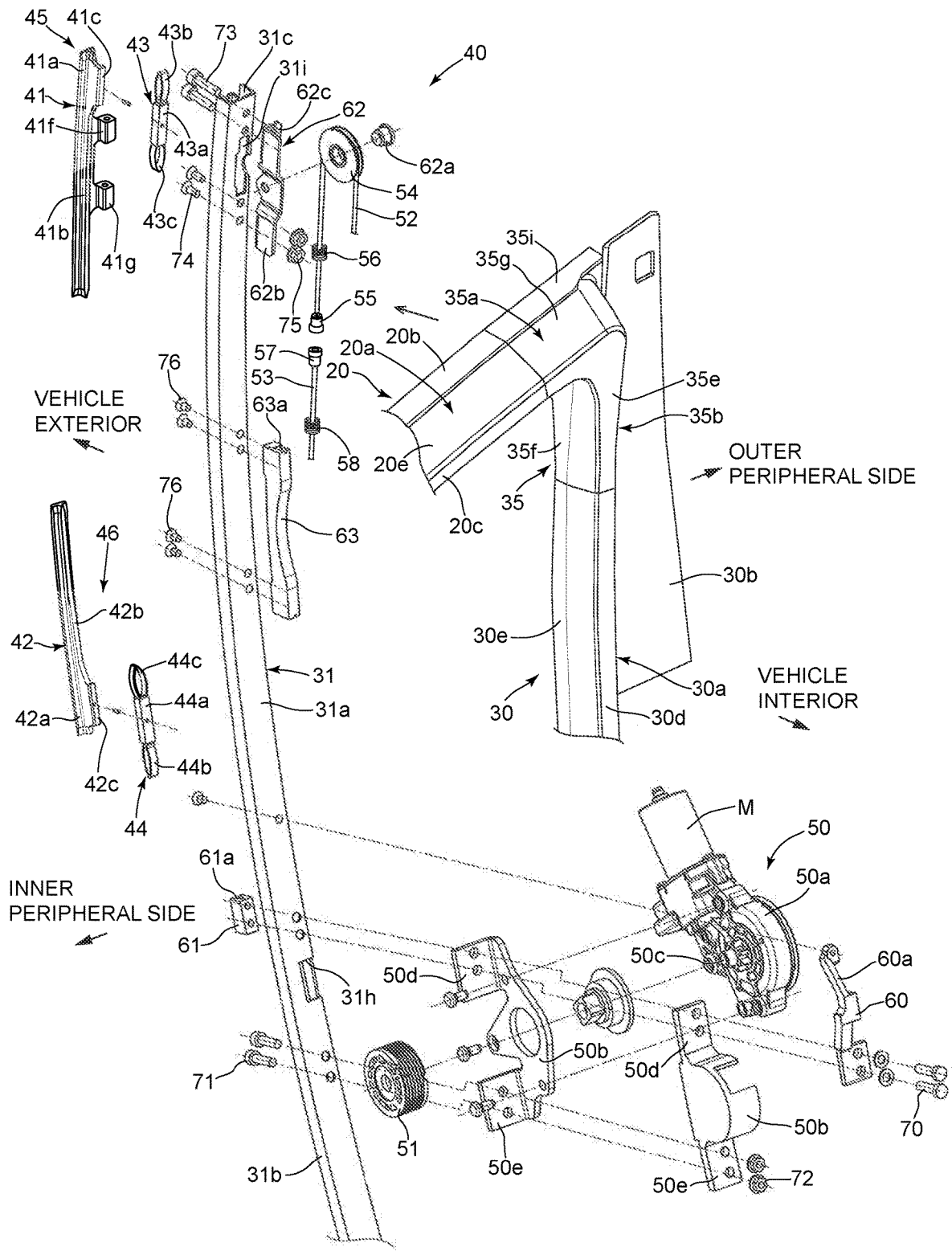
FIG. 8 is an exploded perspective view of a window regulator.
Figure 21:
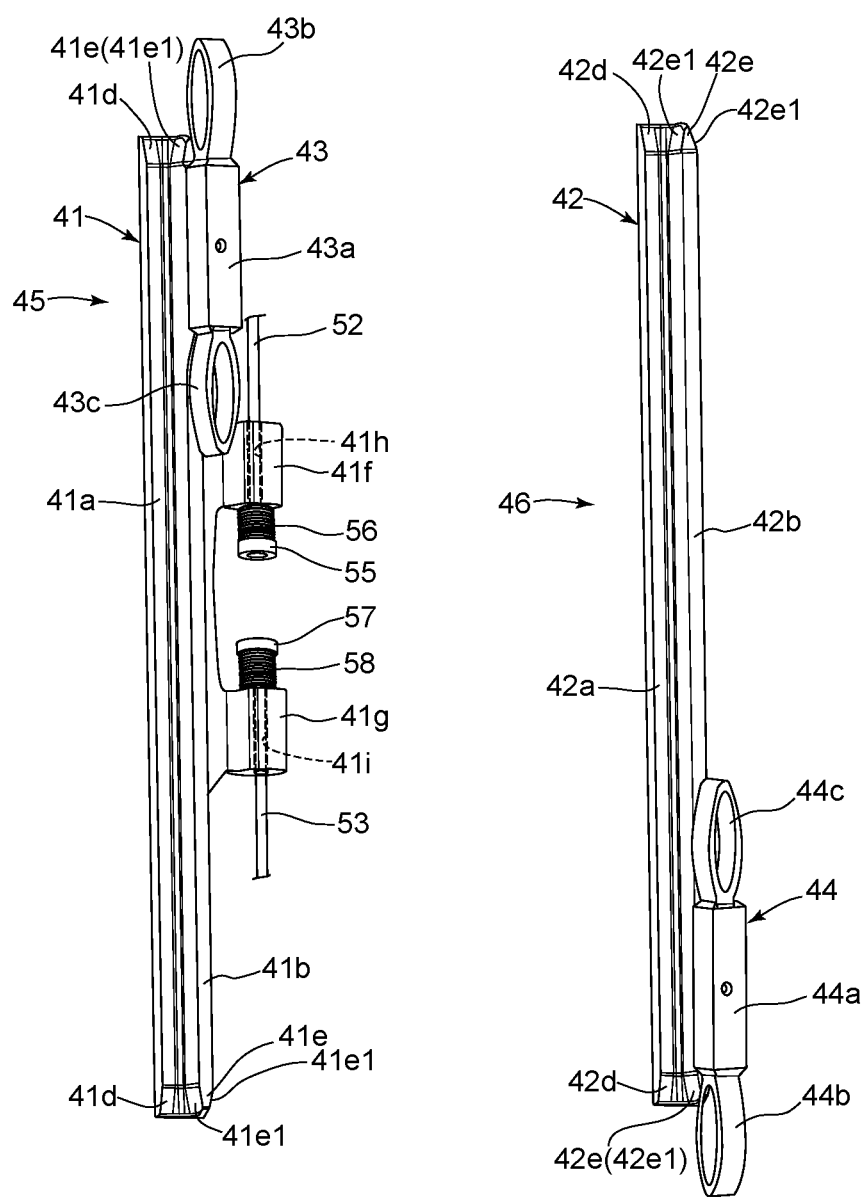
FIG. 21 is a perspective view of two sliders.

The window regulator 40 includes: two shoe bases, namely, upper and lower shoe bases 41 and 42 secured to the window glass W; and two shoes, namely, upper and lower shoes 43 and 44, which is mounted on each of the shoe bases 41 and 42 and supported to be vertically slidable with respect to the guide rail 31. As illustrated in FIGS. 8 and 21, the shoe 43 is attached to the shoe base 41 to form the upper slider 45 while the shoe 44 is attached to the shoe base 42 to form the lower slider 46. The guide rail 31 that forms the upright pillar sash 12 in cooperation with the inner sash 30 also functions as a vertical movement guide part for the sliders 45 and 46 in the window regulator 40.

The guide rail 31 extends downward below the inner sash 30 and the inner cover 36 (refer to FIGS. 3 and 4). The guide rail 31 is exposed, not surrounded by the inner sash 30 or the inner cover 36 in the internal space of the door panel 10a. A motor unit 50 including a motor M as a drive source of the window regulator 40 is attached to an exposed portion of the guide rail 31 in the internal space of the door panel 10a (refer to FIGS. 1, 8, and 19).

One end of each of a first wire 52 and a second wire 53 is connected to a winding drum 51 (refer to FIGS. 8, 22 to 24) built in the motor unit 50. The first wire 52 extends upward from the winding drum 51 so as to be wound around a guide pulley 54 rotatably supported near the upper end of the guide rail 31 (door corner part 10d), and then turns downward, with the other end connected to the shoe base 41 of the slider 45 from above. The second wire 53 extends upward from the winding drum 51, having the other end connected to the shoe base 41 of the slider 45 from below.

Rotating the winding drum 51 by driving the motor M of the motor unit 50 relatively changes the winding amount of the first wire 52 and the second wire 53 with respect to a spiral groove formed on a peripheral surface of the winding drum 51. Rotating the winding drum 51 in the first direction to increase the winding amount of the first wire 52 will pull the slider 45 (shoe base 41) upward by the first wire 52, so as to move the slider 45 upward while allowing the sliding movement of the shoe 43 along the guide rail 31. Rotating the winding drum 51 in the second direction to increase the winding amount of the second wire 53 will pull the slider 45 (shoe base 41) downward by the second wire 53, so as to move the slider 45 downward while allowing the sliding movement of the shoe 43 along the guide rail 31. The wires 52 and 53 opposite to the side on which the winding amount increases are unwound (loosened) from the winding drum 51 so as to follow the movement of the slider 45. Vertical movement of the slider 45 causes the window glass W secured to the shoe base 41 to perform vertical operation. The slider 46 secured to the window glass W via the shoe base 42 moves together with the window glass W while allowing sliding movement of the shoe 44 along the guide rail 31 so as to stabilize the posture of the window glass W. The detailed structure of the window regulator 40 that operates as described above will be described.

Out of the elements included in the slider 45 and the slider 46, the shoe base 41 and the shoe base 42 secured to the window glass W are rigid bodies formed of metal or the like. Each of the shoe 43 and the shoe 44 moving along the guide rail 31 is formed of a material such as synthetic resin having a lower hardness than the metal or the like forming the guide rail 31 in order to achieve smooth movement while preventing abnormal noise and vibration.

Figure 15:
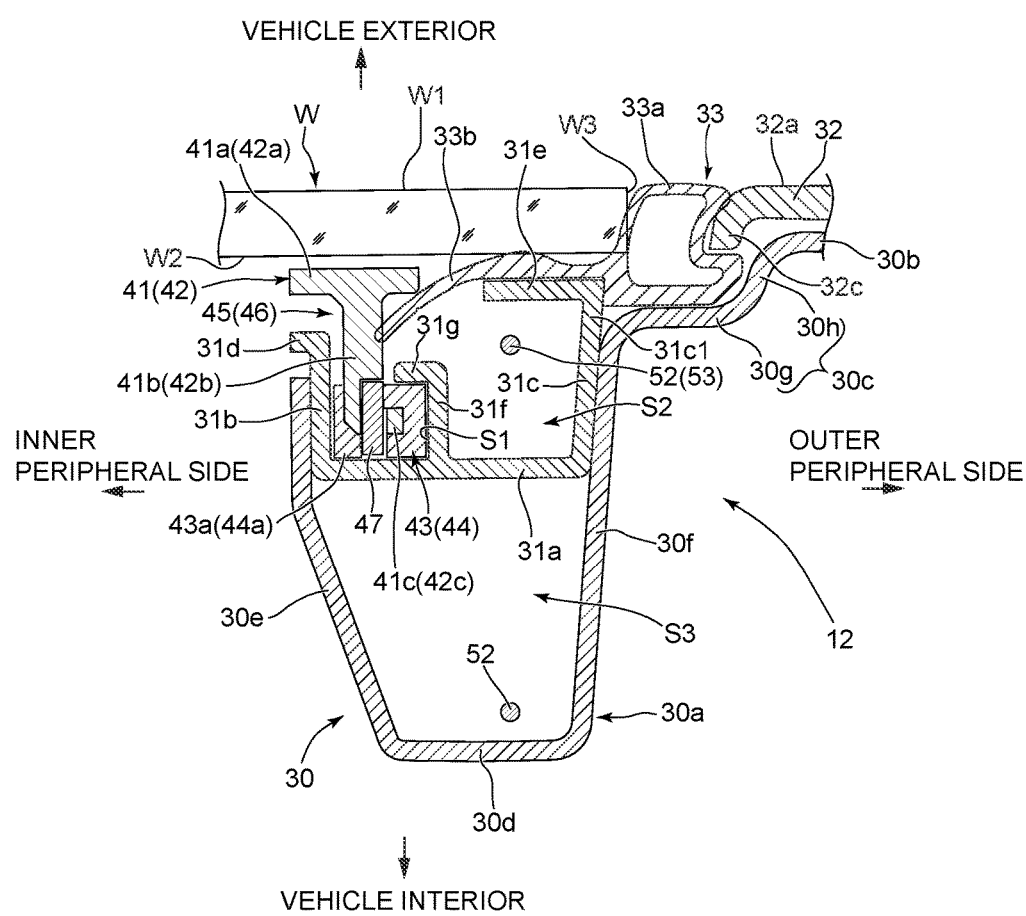
FIG. 15 is a cross-sectional view of the upright pillar sash at a position along line XV-XV in FIG. 24.

As illustrated in FIGS. 8 and 21, the shoe base 41 has a vertically long shape, and includes: a glass support 41a located on the vehicle exterior side; a connection part 41b protruding toward the vehicle interior side from the glass support 41a; and a shoe support 41c provided at the vehicle interior side end of the connection part 41b. As illustrated in FIGS. 15 and 16, the glass support 41a is a plate part whose front and back surfaces (side surfaces) facing the vehicle interior and exterior directions, with the vehicle exterior side surface of the glass support 41a arranged opposite the vehicle interior side surface W2 of the window glass W. The connection part 41b is a plate part that protrudes from the vehicle interior side surface of the glass support 41a, having both side surfaces facing the inner and outer peripheral directions. That is, the glass support 41a and the connection part 41b of the shoe base 41 have a substantially T-shaped cross section perpendicular to the longitudinal direction (refer to FIG. 25(A)).

Figure 25:
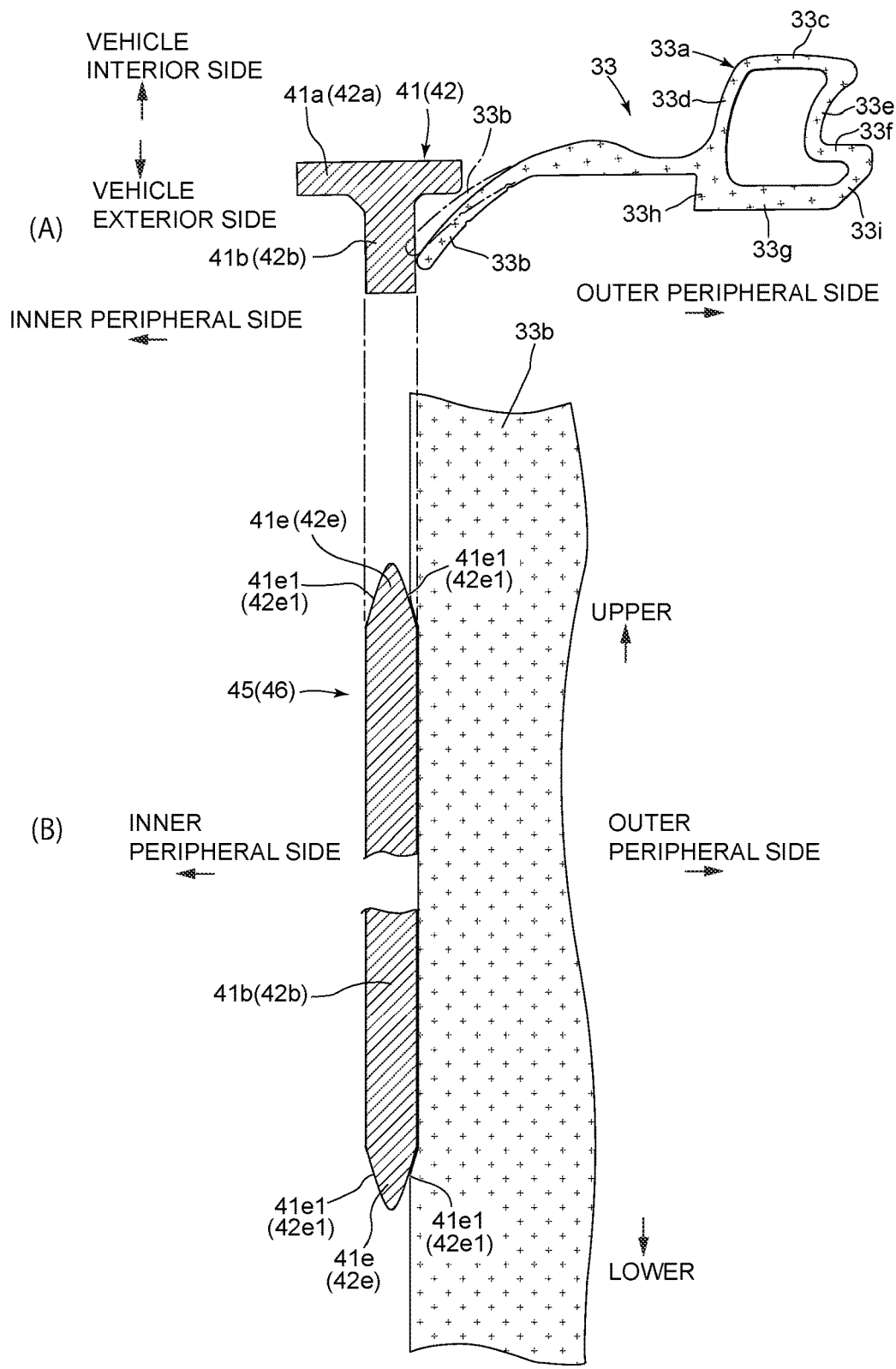
FIG. 25 is a cross-sectional view illustrating a contact relationship between a shoe base of the slider and a lip part of the elastic cover.

The glass support 41a and the connection part 41b each have a load reduction part 41d and a load reduction part 41e at both ends in the longitudinal direction. The surface of the glass support 41a facing the vehicle interior side is a tapered surface that is inclined toward the vehicle exterior side while approaching the tip near the end in the longitudinal direction. A tapered portion (having a shape that gradually reduces the cross-sectional area) formed by this tapered surface is the load reduction part 41d. As illustrated in FIG. 25(B), a side surface facing the inner peripheral side and a side surface facing the outer peripheral side individually form tapered surfaces 41e1 that reduce the distance between each other while proceeding to the tip at a portion near the end of the connection part 41b in the longitudinal direction. A tapered portion (having a shape that gradually reduces the cross-sectional area) formed by these tapered surfaces 41e1 is the load reduction part 41e.

The surface of the glass support 41a facing the vehicle exterior side is secured to the vehicle interior side surface W2 of the window glass W by bonding or the like. A portion of the connection part 41b on the upper end side increases the amount of protrusion toward the vehicle interior side and passes through the space between the inner peripheral side wall 31b and the holding wall 31g of the guide rail 31, and then enters the first section S1 (refer to FIGS. 15 and 16). The shoe support 41c is provided in the protruding portion of the connection part 41b inserted into the first section S1. The shoe support 41c has an L-shaped cross-sectional shape in which the vehicle interior side end of the connection part 41b is bent toward the outer peripheral side. The shoe 43 is to be attached to the shoe support 41c (refer to FIGS. 15 and 16).

As illustrated in FIG. 8 and FIG. 21, the shoe 43 has a vertically long shape and includes: a sliding base 43a located in the middle in the longitudinal direction; and a first elastic contact part 43b and a second elastic contact part 43c respectively protruding from the upper and lower ends of the sliding base 43a. The sliding base 43a is a solid structure having a substantially rectangular cross section perpendicular to the longitudinal direction of the shoe 43. The shoe support 41c is inserted into the sliding base 43a. The sliding base 43a is secured to the shoe support 41c via a connection pin 47 (refer to FIG. 15).

The first elastic contact part 43b is an elongated ring-shaped body protruding from the upper end surface of the sliding base 43a, having a shape in which a pair of curved parts protruding toward vehicle interior and exterior directions is connected at upper and lower ends, with a hollow part between the pair of curved parts penetrating in the inner and outer peripheral directions. With this shape, the first elastic contact part 43b is easily elastically deformed in the vehicle interior and exterior directions.

The second elastic contact part 43c is an elongated ring-shaped part protruding from the lower end surface of the sliding base 43a, having a shape in which a pair of curved parts protruding toward the inner and outer peripheral directions is connected at upper and lower ends, with a hollow part between the pair of curved parts penetrating in the vehicle interior and exterior directions. With this shape, the second elastic contact part 43c is easily elastically deformed in the inner and outer peripheral directions.

The shoe 43 is inserted into the first section S1 of the guide rail 31 (refer to FIGS. 15 and 16). In the shoe base 41, the connection part 41b connecting the glass support 41a and the shoe support 41c passes between the inner peripheral side wall 31b and the holding wall 31g without interfering with the guide rail 31. Four outer surfaces of the sliding base 43a having a rectangular cross section slidably and opposedly come in contact with the vehicle interior side wall 31a, the inner peripheral side wall 31b, the partition wall 31f, and the holding wall 31g of the guide rail 31 surrounding the first section S1. With this configuration, the shoe 43 is supported so as to be slidable in the vertical direction within the first section S1 while being regulated in the movement with respect to the guide rail 31 in the vehicle interior and exterior directions and the inner and outer peripheral directions.

The first elastic contact part 43b of the shoe 43 faces the vehicle interior side wall 31a and the holding wall 31g arranged opposite each other in the vehicle interior and exterior directions within the first section S1 (refer to FIG. 18). The first elastic contact part 43b is biased in either vehicle interior side or the vehicle interior side so as to maintain a state of contact with either the holding wall 31g or the vehicle interior side wall 31a. This suppresses backlash of the shoe 43 in the vehicle interior and exterior directions. In the present embodiment, the first elastic contact part 43b is biased in a direction (vehicle exterior side) to come in contact with the holding wall 31g (refer to FIG. 18).

The second elastic contact part 43c of the shoe 43 faces the inner peripheral side wall 31b and the partition wall 31f arranged opposite the inner and outer peripheral directions within the first section S1. The second elastic contact part 43c is biased in a direction that is either the inner peripheral side and the outer peripheral side so as to maintain a state of contact with either the inner peripheral side wall 31b or the partition wall 31f. This suppresses backlash of the shoe 43 in the inner and outer peripheral directions.

Compared with the first elastic contact part 43b and the second elastic contact part 43c, which are thin and hollow and thus easily elastically deformed, the sliding base 43a has a thicker solid structure and a higher hardness. This configuration enables the shoe 43 to slide with high positioning accuracy with respect to the guide rail 31 in both the vehicle interior and exterior directions and the inner and outer peripheral directions.

The lip part 33b of the elastic cover 33 is in a free state (state where the base portion of the lip part 33b is merely held between the vehicle interior side surface W2 of the window glass W and the cover wall 31e of the guide rail 31 as illustrated in FIG. 9), with the portion near the tip located on the movement trajectory of the shoe base 41. Therefore, the vertical movement of the slider 45 in a state of being supported on the guide rail 31 via the shoe 43 will allow the lip part 33b to come in contact with the shoe base 41 and receive a pressing force so as to be elastically deformed.

More specifically, FIGS. 9 to 11 and FIGS. 14 to 18 illustrate the shape of the lip part 33*b* in the free state. FIGS. 25(A) and 25(B) illustrate the shape of the lip part 33*b* in contact with the shoe base 41. FIG. 25(A) illustrates a cross section perpendicular to the longitudinal direction of the shoe base 41. FIG. 25(B) illustrates a cross section in the longitudinal direction of the shoe base 41. As illustrated in FIG. 25(A), the lip part 33*b* allows its intermediate portion to pass through a position near the corner of the glass support 41*a* on the outer peripheral side and on the vehicle interior side and allows its tip portion to come in contact with the outer peripheral side surface of the connection part 41*b*. The tip portion of the lip part 33*b* is pressed by the shoe base 41, whereby the lip part 33*b* is elastically deformed toward the vehicle interior side and the outer peripheral side with the part sandwiched between the vehicle interior side surface W2 of the window glass W and the cover wall 31*e* as a fulcrum. The shape of the lip part 33*b* before elastic deformation is illustrated by a one-dot chain line in FIG. 25(A). Since the lip part 33*b* originally has a curved shape that is easily elastically deformed in the direction and thus can be smoothly deformed without applying an excessive load to the shoe base 41.

Furthermore, the load reduction part 41*e* is formed at both ends of the connection part 41*b* where the tip portion of the lip part 33*b* is first pressed by the vertically moving shoe base 41. As illustrated in FIG. 25(B), the load reduction part 41*e* has a tapered shape whereby the tapered surface 41*e*1 provided on both sides in the inner and outer peripheral directions reduces the cross-sectional area toward the end (traveling direction) of the shoe base 41 and reduces the contact pressure onto the lip part 33*b*. Therefore, the moving shoe base 41 always starts to press the lip part 33*b* smoothly with a small load by the load reduction part 41*e*.

Similar to the load reduction part 41*e* of the connection part 41*b*, the load reduction parts 41*d* provided at both ends of the glass support 41*a* have an effect of reducing the load when the glass support 41*a* comes into contact with the lip part 33*b*. As illustrated by a one-dot chain line in FIG. 25(A), the lip part 33*b* is designed so as to be in proximity to the glass support 41*a* without coming into contact with the glass support 41*a* in a free state not to be pressed by the connection part 41*b*. This allows the load reduction part 41*d* to have an auxiliary role that functions only when the lip part 33*b* approaches exceeding the designed position to come into contact with the glass support 41*a* due to variations in accuracy or the like.

As described above, with the presence of the load reduction part 41*e* and the load reduction part 41*d* provided on the shoe base 41, the smooth elastic deformation of the lip part 33*b* and the smooth movement of the shoe base 41 can be achieved without causing an obstruction between the shoe base 41 and the lip part 33*b*. Furthermore, it is possible to obtain an effect of suppressing an abnormal sound (such as chattering sound of the lip part 33*b*) generated between the shoe base 41 and the lip part 33*b*. The load reduction part 41*e* and the load reduction part 41*d* on the upper end side contribute to improving the smoothness of operation when the shoe base 41 moves upward, while the load reduction part 41*e* and the load reduction part 41*d* on the lower end side contribute to improving the smoothness of operation when the shoe base 41 moves downward.

Note that the connection part 41*b* of the shoe base 41 may also employ an asymmetric structure having the tapered surface 41*e*1 only on the outer peripheral side with which the tip portion of the lip part 33*b* comes in contact instead of a configuration having a tapered surface 41*e*1 on both the inner peripheral side and the outer peripheral side like the above-described load reduction part 41*e*.

Similar to the shoe base 41, the shoe base 42 has a vertically long shape, and includes: a glass support 42*a* located on the vehicle exterior side; a connection part 42*b* protruding toward the vehicle interior side from the glass support 42*a*; and a shoe support 42*c* provided at the vehicle interior side end of the connection part 42*b*. (refer to FIGS. 8 and 21).

The shoe base 42 has substantially the same structure as the shoe base 41 described above (structure in which the glass support 41*a*, the connection part 41*b*, and the shoe support 41*c* are turned upside down) and arrangements and the roles with respect to the guide rail 31 in individual portions are similar to those of the shoe base 41, and thus, detailed description is omitted. The load reduction part 41*d* and the load reduction part 42*e* (tapered surfaces 41*e*2) formed at the upper and lower ends of the glass support 42*a* also function similar to the load reduction part 41*d* and the load reduction part 41*e* of the shoe base 41. In FIGS. 25(A) and 25(B), reference numerals in parentheses indicate portions of the shoe base 42 corresponding to the shoe base 41.

The shoe 44 includes a sliding base 44*a* having a solid structure, and a first elastic contact part 44*b* and a second elastic contact part 44*c* respectively protruding from the lower end and the upper end of the slide base 44*a*. The sliding base 44*a*, the first elastic contact part 44*b*, and the second elastic contact part 44*c* have substantially the same structure as the sliding base 43*a*, the first elastic contact part 43*b*, and the second elastic contact part 43*c* of the shoe 43 described above, respectively (structure in which the first elastic contact part 43*b* and the second elastic contact part 43*c* are exchanged upside down) in which arrangements and roles of individual portions with respect to the guide rail 31 are similar to the shoe 43 side, and thus, detailed description is omitted.

As described above, the lower slider 46 has the basic structure similar to the upper slider 45. FIG. 15 illustrates a cross-sectional position passing through the slider 45 and also illustrates signs indicating the components of the slider 46 in parentheses in order to indicate that the slider 46 is also guided by the guide rail 31 in a similar manner.

Figure 20:
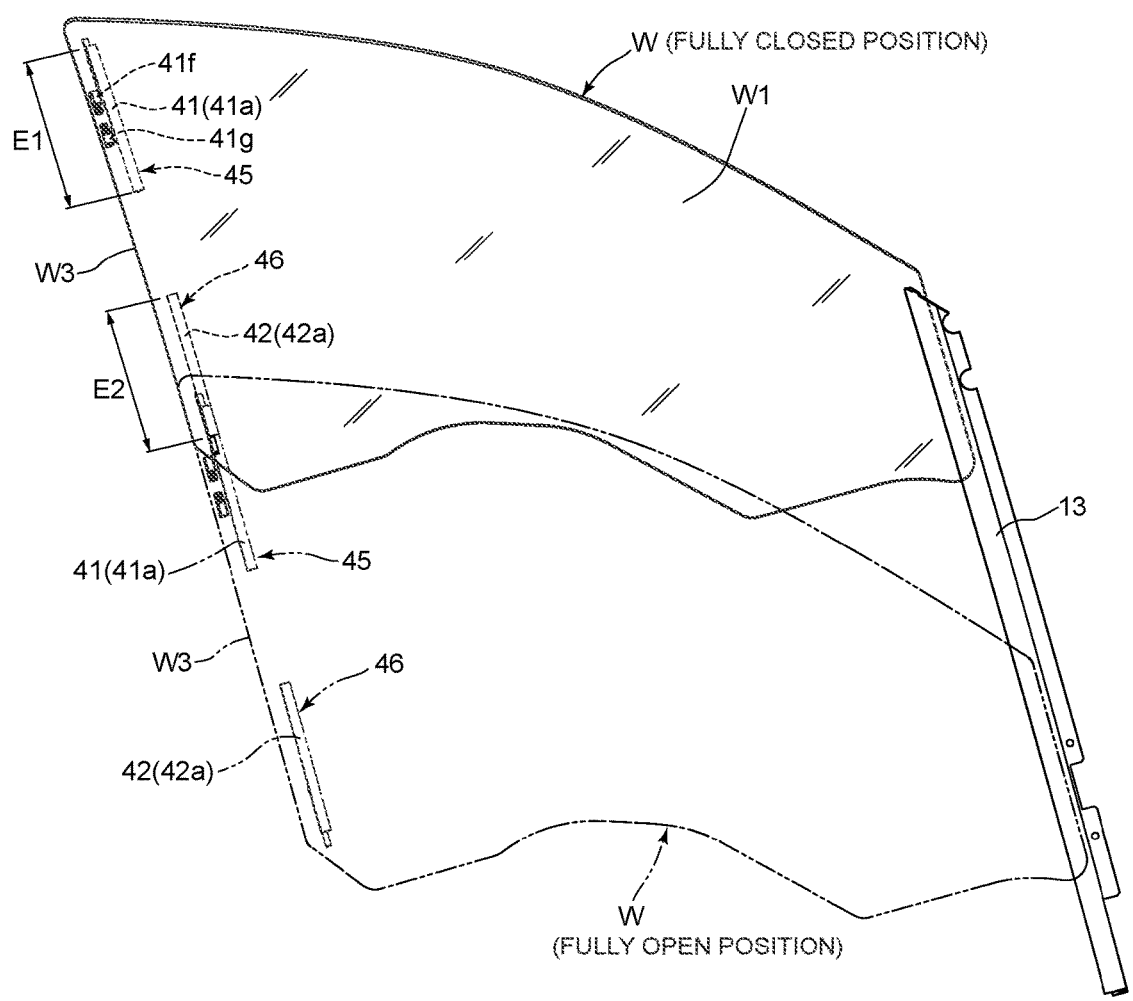
FIG. 20 is a side view illustrating a positional relationship between window glass and a slider.

As illustrated in FIG. 20, the shoe base 41 of the slider 45 and the shoe base 42 of the slider 46 individually support the rear edge side along the upright pillar sash 12 in the window glass W. The glass support 41*a* of the shoe base 41 located above is secured to the window glass W over a range E1 (FIG. 20) in the vertical direction from the vicinity of the upper end of the rear edge of the window glass W downward. The glass support 42*a* of the shoe base 42 located below is secured to the window glass W over a range E2 (FIG. 20) in the vertical direction from the vicinity of the lower end of the rear edge of the window glass W upward.

In this manner, since the slider 45 and the slider 46 constituting the window regulator 40 support the window glass W at positions largely separated in the vertical direction, the position accuracy and stability of the window glass W are extremely high in the portion along the upright pillar sash 12. In particular, as illustrated in FIG. 20, the window glass W has a configuration in which the rear edge along the upright pillar sash 12 is vertically longer than the front edge along the front sash 13. By arranging the slider 45 and the slider 46 at positions spaced from each other near the upper end and the lower end of the rear edge of the window glass W, it is possible to dramatically increase the effective support length with respect to the window glass W in the vertical direction, enabling acquisition of sufficient stability and support strength even in a structure in which a single-side edge in the front-rear directions supports the window glass W.

In the upper slider 45, a shoe 43 is provided near the upper end of the shoe base 41, while in the lower slider 46, a shoe 44 is provided near the lower end of the shoe base 42 (refer to FIGS. 8, 21, 23, and 24). This arrangement makes it possible to obtain the largest shoe pitch (the interval in the vertical direction between the two shoes 43 and 44) within a range in the vertical direction where the shoe bases 41 and 42 are provided. The greater the shoe pitch, the higher the easiness in suppressing the inclination of the window glass W with respect to the guide rail 31 (inclination in the inner and outer peripheral directions in particular), leading to highly accurate support and higher stability of the window glass W.

The upright pillar sash 12 supporting the window glass W with such excellent accuracy and stability includes no elastic member such as the glass run 23 of the upper sash 11 for holding the window glass W in the vehicle interior and exterior directions. The elastic cover 33 coming in contact with the rear edge of the window glass W ensures waterproofness between the window glass W and the upright pillar sash 12 (garnish 32) and functions as an external component of the upright pillar sash 12, making it possible to have a cross-sectional shape more compact and simple compared to the glass run 23.

As illustrated in FIGS. 8 and 21, the shoe base 41 constituting the upper slider 45 further includes a portion for connecting the first wire 52 and the second wire 53. A pair of upper and lower arms protruding sideways from the connection part 41*b* is provided below the shoe support 41*c* (refer to FIG. 8), and a wire end support 41*f* and a wire end support 41*g* are provided at the tip of individual arms. The wire end supports 41*f* and 41*g* are individually formed integrally with the main body of the shoe base 41.

With the shoe 43 inserted into the first section S1 of the guide rail 31, the wire end support 41*f* and the wire end support 41*g* individually enter the second section S2 (refer to FIG. 17). Each of the wire end supports 41*f* and 41*g* has a wire insertion hole 41*h* and a wire insertion hole 41*i* respectively penetrating in the vertical direction. Each of the wire insertion hole 41*h* and the wire insertion hole 41*i* is a hole having a closed cross-sectional shape that is open only at both ends in the vertical direction and not having an opening on the sides (vehicle interior and exterior directions or inner and outer peripheral directions).

The first wire 52 is inserted into the wire insertion hole 41*h* of the wire end support 41*f*, and a wire end 55 to which the end of the first wire 52 is connected is located below the wire end support 41*f*. The first wire 52 extends upward from the wire insertion hole 41*h* through the inside of the second section S2. The upper end surface of the wire end 55 (an end surface on the side to which the first wire 52 is connected) comes in contact with the lower end surface of the wire end support 41*f*, thereby regulating the upward movement of the wire end 55 with respect to the shoe base 41 (force generated by pulling the wire end 55 upward will be transmitted to the shoe base 41).

The wire end 55 has a large diameter flange near the lower end, and a compression spring 56 is inserted between the flange and the wire end support 41*f*. The wire end 55 is biased downward with respect to the shoe base 41 by the compression spring 56, and the slack of the first wire 52 is removed by the biasing force.

The second wire 53 is inserted into the wire insertion hole 41*i* of the wire end support 41*g*, and a wire end 57 to which the end of the second wire 53 is connected is located above the wire end support 41*g*. The second wire 53 extends downward from the wire insertion hole 41*i* through the second section S2. The lower end surface of the wire end 57 (an end surface on the side to which the second wire 53 is connected) comes in contact with the upper end surface of the wire end support 41*g*, thereby regulating the downward movement of the wire end 57 with respect to the shoe base 42 (force generated by pulling the wire end 57 downward will be transmitted to the shoe base 41).

The wire end 57 has a large diameter flange near the upper end, and a compression spring 58 is inserted between the flange and the wire end support 41*g*. The wire end 57 is biased upward with respect to the shoe base 41 by the compression spring 58, and the slack of the second wire 53 is removed by the biasing force.

The first section S1 in which the shoes 43 and 44 are inserted, and the second section S2 in which the wire end supports 41*f* and 41*g* of the shoe bases 41 and 42 are disposed, are located on the vehicle exterior side with respect to the vehicle interior side wall 31*a* of the guide rail 31. Meanwhile, the motor unit 50 is attached to the vehicle interior side surface of the vehicle interior side wall 31*a* of the guide rail 31 in the door panel inner space below the belt line reinforcement 16.

As illustrated in FIG. 8, the motor unit 50 includes: a drive unit 50*a* equipped with a motor M, a reduction gear mechanism, or the like; and a drum housing 50*b* that rotatably houses the winding drum 51. The peripheral surface of the drum housing 50*b* has a notch to allow passage of the first wire 52 and the second wire 53 extending from the winding drum 51. When the drive unit 50*a* and the drum housing 50*b* are combined, a drive shaft 50*c* provided on the drive unit 50*a* is linked to a shaft hole of the winding drum 51, allowing the driving force of the motor M to be transmitted to the winding drum 51.

The motor unit 50 is secured to the guide rail 31 by bringing upper and lower brackets 50*d* and 50*e* provided on the drum housing 50*b* into contact with the vehicle interior side surface of the vehicle interior side wall 31*a* and then bolting the contact portion. When the motor unit 50 is secured, the center of rotation of the winding drum 51 (axis of the drive shaft 50*c*) faces the inner and outer peripheral directions.

Figure 22:
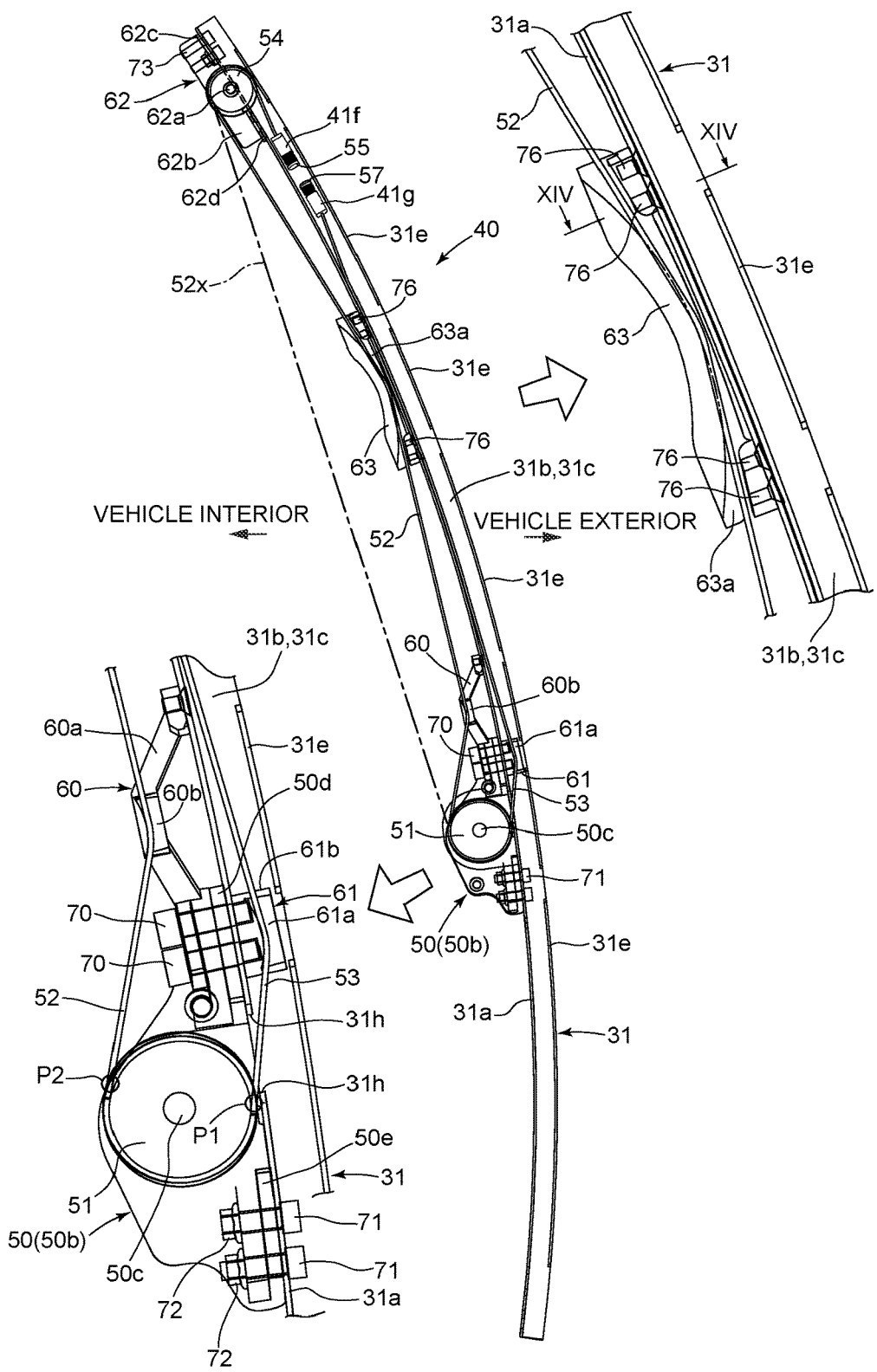
FIG. 22 is a partial see-through rear view of the window regulator.

The vehicle interior side wall 31*a* of the guide rail 31 is provided with a through hole 31*h* formed between the fastening positions of the bracket 50*d* and the bracket 50*e* in the vertical direction (refer to FIGS. 8 and 22). The through hole 31*h* is provided in a region of the vehicle interior side wall 31*a* that forms the second section S2 (a region closer to the outer peripheral side in the inner and outer peripheral directions).

At a position slightly above the through hole 31*h*, a wire guide member 60 and a wire guide member 61 are attached to the vehicle interior side wall 31*a* of the guide rail 31. The wire guide member 60 and the wire guide member 61 are secured to the vehicle interior side wall 31*a* together with the bracket 50*d* of the drum housing 50*b* using bolts 70.

The wire guide member 60 is secured so as to overlap the vehicle interior side of the bracket 50*d*, having a through hole for insertion of the bolt 70 formed on each of the wire guide member 60 and the bracket 50*d*. The wire guide member 61 is located in the second section S2 of the guide rail 31, being in contact with and secured to the vehicle exterior side surface of the vehicle interior side wall 31*a*. The wire guide member 61 has a screw hole facing the vehicle interior side, and a through hole communicating with the screw hole is formed in the vehicle interior side wall 31a. The bolt 70 allows its threaded part to be inserted into the through hole on each of the wire guide member 60, the bracket 50d, and the vehicle interior side wall 31a from the vehicle interior side so as to screw the threaded part to the screw hole of the wire guide member 61. The tip of the threaded part of the bolt 70 in the fixed state is located in the screw hole of the wire guide member 61, not being exposed in the second section S2 of the guide rail 31 (refer to FIG. 22). That is, the bolt 70 would not interfere with the wire end supports 41f or 41g of the shoe base 41, or the wires 52 and 53 passing through the second section S2.

The wire guide member 60 is provided with an arm part 60a extending upward from a position where the wire guide member is fastened by the bolt 70. The upper end of the arm part 60a is secured to the guide rail 31 by a bolt different from the bolt 70. The arm part 60a is provided with a guide groove 60b extending in the vertical direction. The guide groove 60b is a bottomed groove that opens toward the vehicle exterior side, arranged to be opposite the vehicle interior side surface of the vehicle interior side wall 31a of the guide rail 31 at a predetermined interval (refer to FIG. 22).

As illustrated in FIG. 22, a guide groove 61a extending in the vertical direction is formed in the wire guide member 61. The guide groove 61a is a bottomed groove that opens toward the vehicle exterior side. A stopper surface 61b is formed on the upper end of the wire guide member 61. When the shoe base 41 moves downward in the second section S2 of the guide rail 31, the lower end surface of the lower wire end support 41g comes in contact with the stopper surface 61b so as to regulate further downward movement of the shoe base 41 (refer to FIG. 24). This contact will determine the downward moving end (bottom dead center) of the window glass W supported by the shoe base 41.

The lower bracket 50e of the drum housing 50b is secured to the guide rail 31 via a bolt 71 and a nut 72. The bolt 71 allows its threaded part to be inserted from the vehicle exterior side into a through hole formed in the bottom of the second section S2 of the vehicle interior side wall 31a and a through hole formed in the bracket 50d so as to be screwed to the nut 72. The head of the bolt 71 is located in the second section S2. The fastening position by the bolt 71 is below the winding drum 51 in the drum housing 50b. Therefore, the wire end supports 41f and 41g of the shoe base 41 and the wires 52 and 53 of the shoe base 41 passing through the second section S2 will not reach the position of the head of the bolt 71, with no concern of interference with the bolt 71 (refer to FIG. 22).

In the vicinity of the upper end of the guide rail 31, a pulley bracket 62 is secured to the vehicle interior side surface of the vehicle interior side wall 31a by bolting. The guide pulley 54 is rotatably supported by the pulley bracket 62 via a pulley pin 62a. The guide pulley 54 is a disc-shaped member including an annular wire guide groove formed on the outer periphery. The rotation center (axis of the pulley pin 62a) of the guide pulley 54 faces the inner and outer peripheral directions in a state where the pulley bracket 62 is secured to the guide rail 31.

As illustrated in FIG. 8, the guide rail 31 is provided with a through hole 31i penetrating through the vehicle interior side wall 31a, in the vicinity of the mounting position of the pulley bracket 62. The through hole 31i is provided in a region of the vehicle interior side wall 31a that forms the second section S2 (a region closer to the outer peripheral side in the inner and outer peripheral directions). The second section S2 and the third section S3 communicates with each other via the through hole 31i. As illustrated in FIG. 16, the pulley pin 62a is located in the third section S3, and the guide pulley 54 directs its radial direction orthogonal to the axis of the pulley pin 62a to the vehicle interior and exterior directions, so as to be arranged over the second section S2 and the third section S3 through the through hole 31i.

The guide rail 31 and the connecting member 35 are combined at the door corner part 10d to which the guide pulley 54 is attached. The guide pulley 54 and the pulley bracket 62 are disposed so as to fit in a space surrounded by the vehicle interior side wall 35e, the inner peripheral side wall 35f, and the outer peripheral side wall 35g in the second frame part 35b of the connecting member 35, not being exposed to the outside of the upright pillar sash 12.

More specifically, the pulley bracket 62 is long in the vertical direction (refer to FIGS. 6, 8, and 22 to 24), and has an L-shape including: a plate-shaped pulley support 62b extending in the vehicle interior and exterior directions; and a pair of upper and lower support seats 62c and 62d extending from the vehicle exterior side end of the pulley support 62b (refer to FIGS. 17 and 18) to the outer peripheral side in a top view (or in a cross-sectional view perpendicular to the longitudinal direction). The support seat 62c and the support seat 62d come in contact with the vehicle interior side surface of the vehicle interior side wall 31a of the guide rail 31. The support seat 62c and the support seat 62d are vertically separated from each other. The through hole 31i is formed in the vehicle interior side wall 31a between positions where the support seats 62c and the support seat 62d come in contact with each other. The pulley pin 62a is supported by the pulley support 62b at a vertical position between the support seat 62c and the support seat 62d (refer to FIG. 6).

At the cross-sectional position in FIG. 18 where the upper support seat 62c of the pulley bracket 62 is attached to the guide rail 31, the thick part 35m of the connecting member 35 is arranged on the vehicle interior side of the vehicle interior side wall 31a, and the escape recess 35n and the screw hole 35p are formed in the thick part 35m. The support seat 62c is located in the escape recess 35n, sandwiched between the vehicle interior side wall 31a and the thick part 35m, while a surface facing the vehicle interior side is brought in contact with the thick part 35m. Each of the support seat 62c and the vehicle interior side wall 31a is provided with a through hole communicating with the screw hole 35p. The threaded parts of the bolts 73 are inserted into these through holes from the vehicle exterior side to the vehicle interior side, so as to be screwed into the screw holes 35p. The bolt 73 having its head located in the second section S2 of the guide rail 31 is tightened until the head comes in contact with the vehicle exterior side surface of the vehicle interior side wall 31a with a predetermined pressure. With this configuration, the support seat 62c is secured being sandwiched between the vehicle interior side wall 31a and the thick part 35m.

That is, the thick part 35m provided inside the second frame part 35b (the third section S3) of the connecting member 35 is defined as a support seat surface, and the screw hole 35p is recessed on the support seat surface, thereby providing a mounting part for the support seat 62c of the pulley bracket 62. The mounting part has a structure in which the support seat 62c is supported by the thick part 35m having high rigidity, and the bolt 73 is screwed into the screw hole 35p formed in the thick part 35m, leading to excellent binding strength. In addition, since the bolt 73 is directly screwed into the connecting member 35, leading to excellent workability in assembling parts inside the door corner part 10d having a complicated shape.

Figure 23:
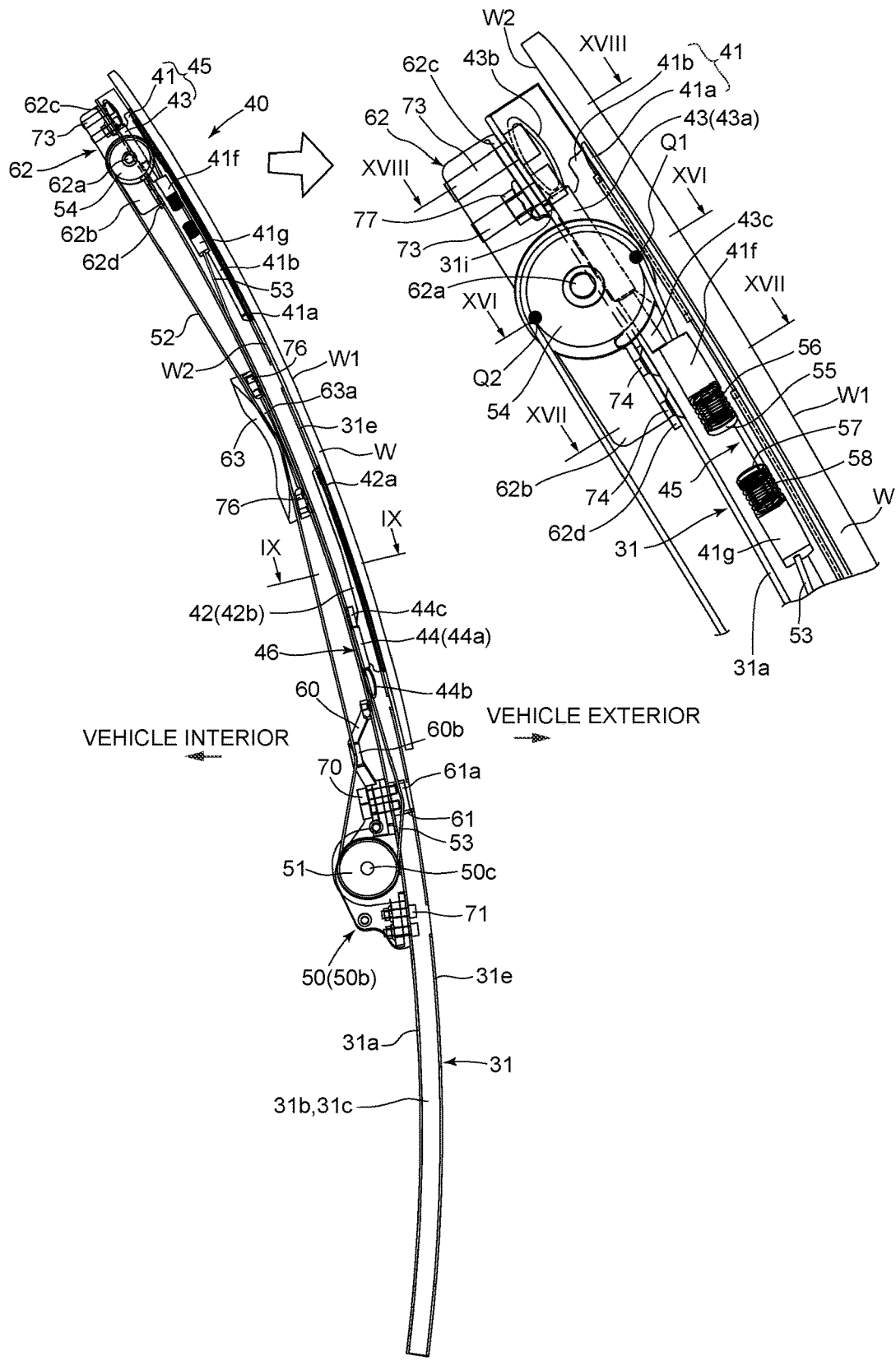
FIG. 23 is a partially see-through rear view of the window regulator in a fully closed state of window glass.

As illustrated in FIGS. 6 and 23, the support seat 62c is secured by using two bolts 73. The upper bolt 73 is screwed into the screw hole 35p of the connecting member 35 as described above. The threaded part of the lower bolt 73 is inserted into the space below the thick part 35m (internal space of the second frame part 35b of the connecting member 35) through each of the through holes of the support seat 62c and the vehicle interior side wall 31a so as to be screwed into the nut 77.

At the fastening position of the pulley bracket 62 by the upper bolt 73 (FIG. 18), the pulley support 62b and the support seat 62c are located in the escape recess 35n. Accordingly, the pulley bracket 62 will not interfere with the thick part 35m, and will not be exposed to affect the appearance of the upright pillar sash 12.

Moreover, the fastening position of the pulley bracket 62 by the bolts 73 is above the guide pulley 54. Therefore, the wire end supports 41f and 41g of the shoe base 41 and the wires 52 and 53 of the shoe base 41 passing through the second section S2 will not reach the position of the head of the bolts 73, with no concern of interference with the bolts 73.

At the cross-sectional position in FIG. 17 at which the lower support seat 62d of the pulley bracket 62 is attached to the guide rail 31, the connecting member 35 does not include the thick part 35m, allowing the third section S3 to have a wider area in the vehicle interior and exterior directions. A nut 75 separate from the connecting member 35 is arranged in the third section S3, and the support seat 62d and the guide rail 31 are fastened using a bolt 74 screwed to the nut 75. Through holes communicating with the screw holes of the nut 75 are individually formed in the support seat 62d and the vehicle interior side wall 31a. The threaded part of the bolt 74 is inserted into each of these through holes from the vehicle exterior side (the second section S2 side) toward the vehicle interior side so as to be screwed into the screw hole of the nut 75. The bolt 74 is tightened until the head comes in contact with the vehicle exterior side surface of the vehicle interior side wall 31a with a predetermined pressure.

At the fastening position of the pulley bracket 62 with the bolt 74, the pulley support 62b, the support seat 62d, and the nut 75 are housed in the third section S3, and thus, the pulley bracket 62 and the nut 75 are not exposed to the outside. Furthermore, since the bolt 74 is a flat head screw having substantially no head protrusion from the vehicle interior side wall 31a toward the vehicle exterior side, each of wire end supports 41f and 41g of the shoe base 41 and each of wires 52 and 53 passing through the second section S2 will not interfere with the head of the bolt 74.

As described above, by setting the direction of the axis of the pulley pin 62a serving as the rotation center in the inner and outer peripheral directions, the guide pulley 54 assembled to the guide rail 31 (and the connecting member 35) via the pulley bracket 62 is arranged over the second section S2 and the third section S3 via the through hole 31i (refer to FIG. 16). This makes it possible to guide the first wire 52 to the wire end support 41f of the shoe base 41 located in the second section S2 and to the winding drum 51 located below the third section S3 via the guide pulley 54.

The frame part 30a of the inner sash 30 and the second frame part 35b of the connecting member 35 in the upright pillar sash 12 have a depth in the vehicle interior and exterior directions greater than the width in the inner and outer peripheral directions (refer to FIGS. 9 and 14 to 17). The guide pulley 54 has a flat shape whose diameter is larger than the thickness in the axial direction. Accordingly, by arranging the guide pulley 54 with a diametric direction oriented in the vehicle interior and exterior directions across the second section S2 and the third section S3 in the second frame part 35b, it is possible to accommodate the guide pulley 54 inside the connecting member 35 with high space efficiency.

As illustrated in FIGS. 16 and 17, in the portion where the connecting member 35 is provided, the presence of the thick inner peripheral side wall 35f slightly decreases the region closer to the inner periphery of the third section S3 (the vehicle interior side region in the first section S1). However, the region of the third section S3 closer to the outer periphery (the region on the vehicle interior side of the second section S2) maintains an area substantially as large as the portion where the inner sash 30 is provided (refer to FIGS. 9, 14, and 15). Therefore, by arranging the guide pulley 54 at a position of a region close to the outer periphery in the third section S3, it is possible to accommodate the guide pulley 54 within the second frame part 35b while using the large-diameter guide pulley 54 having its outer periphery positioned in the vicinity of the vehicle interior side wall 35e. In other words, it is possible to use the guide pulley 54 maximum fittable in the second frame part 35b of the connecting member 35 while achieving the guide of the first wire 52 over the second section S2 and the third section S3 across the vehicle interior side wall 31a of the guide rail 31. The larger the diameter (radius of curvature) of the guide pulley 54, the gentler the curvature of the guided first wire 52 to be guided. Accordingly, this configuration is advantageous in reducing the resistance and achieving smoother operation at the time of driving the window regulator 40.

As illustrated in FIG. 8 and FIG. 22, the guide rail 31 is further equipped with a wire holding member 63 between a position where the motor unit 50 is mounted and a position where the guide pulley 54 (pulley bracket 62) is mounted in the vertical direction (at a substantially equal distance from the guide pulley 54 and the winding drum 51). The wire holding member 63 is provided at a general cross section in which the upright pillar sash 12 is formed by the inner sash 30 and the guide rail 31. The wire holding member 63 is housed inside the third section S3 (the vehicle interior side with respect to the second section S2) (refer to FIG. 14).

The wire holding member 63 is brought into contact with the vehicle interior side surface of the vehicle interior side wall 31a of the guide rail 31 and then bolted. A screw hole is formed in the wire holding member 63 toward the vehicle exterior side. A through hole communicating with the screw hole of the wire holding member 63 is formed in a region of the vehicle interior side wall 31a of the guide rail 31 where the second section S2 is formed. The threaded part of a bolt 76 is inserted into the through hole from the vehicle exterior side and screwed into the screw hole of the wire holding member 63, whereby the wire holding member 63 is secured to the guide rail 31 (refer to FIG. 23). Four bolts 76 are used at different positions in the vertical direction. Since the bolt 76 is a flat head screw having substantially no head protrusion from the vehicle interior side wall 31a toward the vehicle exterior side, each of wire end supports 41f and 41g of the shoe base 41 and each of wires 52 and 53 passing through the second section S2 will not interfere with the head of the bolt 76 (refer to FIG. 14).

The wire holding member 63 directs its longitudinal direction in the vertical direction and has a guide groove 63a extending in the vertical direction. As illustrated in FIG. 23, the guide groove 63*a* is a bottomed groove opening toward the vehicle exterior side, allowing a predetermined gap between the bottom surface of the guide groove 63*a* and the vehicle interior side wall 31*a* of the guide rail 31.

In the window regulator 40, the wires 52 and 53 are routed as follows. On the presumption that the door 10 has a curved outer surface shape protruding toward the vehicle exterior side, and correspondingly, the inner sash 30 and the guide rail 31 of the upright pillar sash 12 have curved shapes in which intermediate portions in the longitudinal direction (vertical direction) protrude toward the vehicle exterior side with respect to the upper and lower ends (refer to FIG. 4).

In the winding drum 51, the starting position of winding (pulling) of the second wire 53 into the spiral groove (illustrated as a winding start point P1 in FIG. 22) is set to the vehicle exterior side with respect to the drive shaft 50*c* that is the center of rotation. As illustrated in FIG. 22, the second wire 53 extends diagonally upward from the winding start point P1, so as to be guided into the second section S2 via the through hole 31*h* of the guide rail 31. The second wire 53 introduced to the second section S2 is inserted into the guide groove 61*a* of the wire guide member 61 located slightly above the through hole 31*h*. The deflection of the second wire 53 in the inner and outer peripheral directions is regulated by both side surfaces of the guide groove 61*a*.

The bottom surface of the guide groove 61*a* of the wire guide member 61 is a curved surface protruding toward the vehicle exterior side, having a curvature greater than in the vehicle interior side wall 31*a*. Guiding the second wire 53 passing through the through hole 31*h* of the guide rail 31 directly along the vehicle interior side wall 31*a* without using the wire guide member 61 would cause rubbing and damage in the second wire 53 with the edge portion (particularly the upper edge) of the through hole 31*h*. By guiding the second wire 53 at a position away from the vehicle interior side wall 31*a* to the position spaced away on the vehicle exterior side while supporting the second wire 53 on the bottom surface of the guide groove 61*a*, it is possible to prevent rubbing of the second wire 53 with the edge portion of the through hole 31*h*.

Lowering the position of the bottom surface of the guide groove 61*a* with respect to the vehicle interior side wall 31*a* (toward the vehicle interior) makes it possible to decrease the entry angle of the second wire 53 from the winding drum 51 side with respect to the through hole 31*h*, enabling the second wire 53 to be guided to the second section S2 with a smooth trajectory. On the other hand, the second wire 53 is easily rubbed against the edge portion of the through hole 31*h*. Setting the position of the bottom surface of the guide groove 61*a* with respect to the vehicle interior side wall 31*a* higher (toward the vehicle exterior side) would increase the entry angle of the second wire 53 from the winding drum 51 side to the through hole 31*h*, suppressing occurrence of contact of the second wire 53 against the edge portion of the through hole 31*h*. This causes, on the other hand, an increase in the degree of bending in the second wire 53 in the second section S2, which might lead to an increase in resistance during driving or the like. In consideration of these conditions, the bottom surface position of the guide groove 61*a* is set so that the second wire 53 will be smoothly guided from the winding start point P1 of the winding drum 51 to the second section S2, and that the height can be an optimal height that can suppress rubbing of the second wire 53 against the edge portion of the through hole 31*h*.

Above the wire guide member 61, the second wire 53 extends along the vehicle exterior side surface of the vehicle interior side wall 31*a* of the guide rail 31 (the bottom surface of the second section S2) (refer to FIGS. 9 and 22). Since the vehicle exterior side surface of the vehicle interior side wall 31*a* is a smooth surface protrudingly curved toward the vehicle exterior side, the second wire 53 is smoothly guided without being caught or the like.

Subsequently, the second wire 53 is inserted into the wire insertion hole 41*i* of the wire end support 41*g*, so as to be connected to the shoe base 41 via the wire end 57 (refer to FIG. 21). The wire insertion hole 41*i* of the wire end support 41*g* is a hole having a closed cross-sectional shape without a slit that opens to the side. Therefore, it is preferable, at the time of assembly, to first perform insertion of the second wire 53 into the wire insertion hole 41*i* (insertion of the end opposite to the wire end 57) and then perform winding of the second wire 53 onto the winding drum 51 and connection.

In the winding drum 51, the starting position of winding (pulling) of the first wire 52 into the spiral groove (illustrated as a winding start point P2 in FIG. 22) is set to the vehicle interior side with respect to the drive shaft 50*c* that is the center of rotation. As illustrated in FIG. 22, the first wire 52 extends upward from the winding start point P2. The first wire 52 arranged upward from the winding drum 51 is inserted into the guide groove 60*b* of the wire guide member 60. The deflection of the first wire 52 in the inner and outer peripheral directions is regulated by both side surfaces of the guide groove 60*b*.

The bottom surface of the guide groove 60*b* of the wire guide member 60 is a curved surface protruding toward the vehicle exterior side, having a curvature greater than in the vehicle interior side wall 31*a*. When not held by the wire guide member 60, the trajectory of the first wire 52 connects the winding drum 51 with the guide pulley 54 at the shortest distance on the recess side (on the vehicle interior side) of the guide rail 31 having a shape protruding toward the vehicle exterior side. This virtual wire trajectory is illustrated as a wire short-circuit trajectory 52*x* in FIG. 22. The bottom surface of the guide groove 60*b* supports the first wire 52 in a state where the first wire 52 is pushed to the vehicle exterior side with respect to the wire short-circuit trajectory 52*x*.

As illustrated in FIG. 22, the first wire 52 is further supported by the wire holding member 63 at an intermediate position between the winding drum 51 and the guide pulley 54 in the vertical direction. The deflection of the first wire 52 in the inner and outer peripheral directions is regulated by both side surfaces of the guide groove 63*a* of the wire holding member 63.

The bottom surface of the guide groove 63*a* of the wire holding member 63 is a curved surface protruding toward the vehicle exterior side, having a curvature greater than in the vehicle interior side wall 31*a*. The bottom surface of the guide groove 63*a* is less distant from the vehicle interior side wall 31*a* of the guide rail 31 than the bottom surface of the guide groove 60*b* of the wire guide member 60 (refer to FIG. 22), so as to push the first wire 52 held by the bottom surface of the guide groove 60*b* further toward the vehicle exterior side.

The first wire 52 whose trajectory has been changed from the wire short-circuit trajectory 52*x* by the wire guide member 60 and the wire holding member 63 is routed in the vertical direction while maintaining an appropriate distance from the vehicle interior side surface of the vehicle interior side wall 31*a* of the guide rail 31 curved in a recess (maintaining the position that fits in the third section S3).

Inside the door panel 10*a* in which the guide rail 31 is exposed without being covered with the inner sash 30, the first wire 52 extends in an exposed state in a vertical direction while maintaining a predetermined distance with the vehicle interior side wall 31*a* of the guide rail 31.

In the general cross section of the upright pillar sash 12 above the belt line reinforcement 16, the first wire 52 passes through the third section S3 surrounded by the frame part 30*a* of the inner sash 30 and by the vehicle interior side wall 31*a* of the guide rail 31 (refer to FIG. 9). The wire holding member 63, housed in the third section S3 at the general cross section, reliably guides the first wire 52 (refer to FIG. 14). In the door corner part 10*d* where the connecting member 35 is provided instead of the frame part 30*a* of the inner sash 30, the first wire 52 continues to pass through the third section S3 surrounded by the second frame part 35*b* and by the vehicle interior side wall 31*a* (refer to FIG. 17).

Then, the first wire 52 that has reached near the upper end of the guide rail 31 is looped around a wire guide groove on the outer periphery of the guide pulley 54. As described above, the guide pulley 54 is provided at a position straddling the second section S2 and the third section S3 via the through hole 31*i* of the guide rail 31. Therefore, the first wire 52 that extends upward on the third section S3 side and that has been guided to the guide pulley 54 reverses the extending direction along the wire guide groove of the guide pulley 54 so as to go downward in the second section S2. In other words, one end and the other end of the winding region of the first wire 52 with respect to the wire guide groove of the guide pulley 54 (a winding start point Q1 and a winding start point Q2 illustrated in FIGS. 16 and 23) are arranged in the second section S2 and the third section S3 respectively in a substantially symmetrical positional relationship with respect to the pulley pin 62*a*.

The first wire 52 extending downward from the winding start point Q2 of the guide pulley 54 is inserted into the wire insertion hole 41*h* of the wire end support 41*f* in the second section S2, so as to be connected to the shoe base 41 via the wire end 55 (refer to FIG. 21). The wire insertion hole 41*h* of the wire end support 41*f* is a hole having a closed cross-sectional shape without a slit that opens to the side. Therefore, it is preferable, at the time of assembly, to first perform insertion of the first wire 52 into the wire insertion hole 41*h* (insertion of the end opposite to the wire end 55) and then perform winding of the first wire 52 onto the guide pulley 54 and the winding drum 51 and connection.

When the first wire 52 and the second wire 53 are routed as described above, the compression spring 56 and the compression spring 58 press the wire end 55 and the wire end 57 in mutual approaching directions, producing a predetermined tension applied to the wire 52 and 53, respectively. Thereby, the slider 45 connected to the wires 52 and 53 is stabilized, leading to high accuracy holding and elevating/lowering of the window glass W whose position is controlled via the slider 45.

As illustrated in FIG. 21, the shoe base 41 houses 56 and 57 and compression springs 56 and 58 between the wire end support 41*f* and the wire end support 41*g*. Only the opposite end portions of the two wire end supports 41*f* and 41*g* (the surfaces with which the end surfaces of the wire end 55 and the wire end 57 come in contact) constitute the housing portion, with no side walls surrounding the side surfaces of the wire end 55 or wire end 57. This makes it possible to establish a wire connection structure with a very compact and simple configuration.

As illustrated in FIG. 21, each of the wire end supports 41*f* and 41*g* has a length in the vertical direction greater than the width of the end surface with which the wire ends 55 and 57 come in contact. That is, the support length for each of the wires 52 and 53 by the wire insertion holes 41*h* and 41*h* has been increased. By maintaining the linearity of each of the wires 52 and 53 by the wire insertion holes 41*h* and 41*h* having a long support length, it is possible to obtain an effect of suppressing the lateral deflection of the wire ends 55 and 57 located immediately adjacent to the wires.

In a state where the wire end supports 41*f* and 41*g* are inserted into the second section S2 of the guide rail 31, the inner surfaces (the vehicle interior side wall 31*a*, the outer peripheral side wall 31*c*, the cover wall 31*e*, and the partition wall 31*f*) of the second section S2 surrounds the sides of the wire ends 55 and 57 to suppress deflection. As illustrated in FIG. 17, there is a clearance of a predetermined size between the inner surface of the second section S2 and the wire end 55 (or the wire end 57), and thus the positions of the wire ends 55 and 57 are not strictly determined. Still, it is possible to prevent excessive displacement of the wire ends 55 and 57 such as deviation from the extended upper positions of the wire end supports 41*f* and 41*g* by the presence of the inner surface of the second section S2.

As described above, the wire connection structure in the shoe base 41 can be realized with a minimum configuration (driving force transmitting portion) that receives the traction force by the contact of the end surfaces of the wire ends 55 and 57 in the extending direction of the wires 52 and 53. In particular, the window regulator 40 of the present embodiment houses most of the elevating/lowering mechanism excluding the motor unit 50 in the internal space of the vertically elongated upright pillar sash 12. For this reason, it is extremely effective in terms of space efficiency to complete the wire connection structure in the elongated space between the opposing surfaces of the wire end supports 41*f* and 41*g* that are vertically separated from each other. Specifically, the cross-sectional area of the second section S2 that houses the wire end supports 41*f* and 41*g* can be downsized. This makes it possible to perform parallel arrangement of the first section S1 into which the shoes 43 and 44 are inserted and the second section S2 through which the wires 52 and 53 are inserted without increasing the width of the frame part 30*a* in the inner and outer peripheral directions. In addition, since the second section S2 is also compact in the vehicle interior and exterior directions, it is also possible to perform parallel arrangement of the second section S2 and the third section S3 through which the wires 52 and 53 are inserted within a dimension with a limited depth ranging from the window glass W to the vehicle interior side wall 30*d* of the frame part 30*a* (vehicle interior side wall 35*e* of the second frame part 35*b*).

When assembling the window regulator 40, it is preferable from the viewpoint of workability that the work is performed in a state where the wires 52 and 53 are loosened and the final tension is applied to the wires 52 and 53 as late as possible. In the manufacture of the window regulator 40 of the present embodiment, the wires 52 and 53 are tensioned by attaching the wire holding member 63 after general parts assembling and wire arrangement are performed. As described above, the wire holding member 63 supports the first wire 52 at a position on the vehicle exterior side (inside the recess) of the wire short-circuit trajectory 52*x* connecting the winding drum 51 and the guide pulley 54 at the shortest distance, on the recessed side (vehicle interior side) of the curved guide rail 31. That is, the tension of the first wire 52 is increased by changing the wiring trajectory of the first wire 52 toward the vehicle exterior side and increasing the actual trajectory of the first wire 52 to be longer than the wire short-circuit trajectory 52*x*.

On the recessed side (on the vehicle interior side) of the guide rail 31, the wire guide member 60 also supports the first wire 52 in addition to the wire holding member 63. For this reason, even when the wire holding member 63 is not attached, a certain level of tension is applied to each of the wires 52 and 53 at a stage where the wire guide member 60 has been attached. Excessively loose states of the wires 52 and 53 would lead to dislocation of the wires from the guide pulley 54 or the like, causing deterioration in the assemblability. However, with the presence of the wire guide member 60, it is possible to proceed with the work in a state where the wires 52 and 53 are appropriately stabilized. In addition, it is only necessary to press a small amount of the first wire 52 preliminarily supported by the wire guide member 60 in assembling the wire holding member 63 in the final stage, leading to excellent assembling property of the wire holding member 63.

Figure 14:
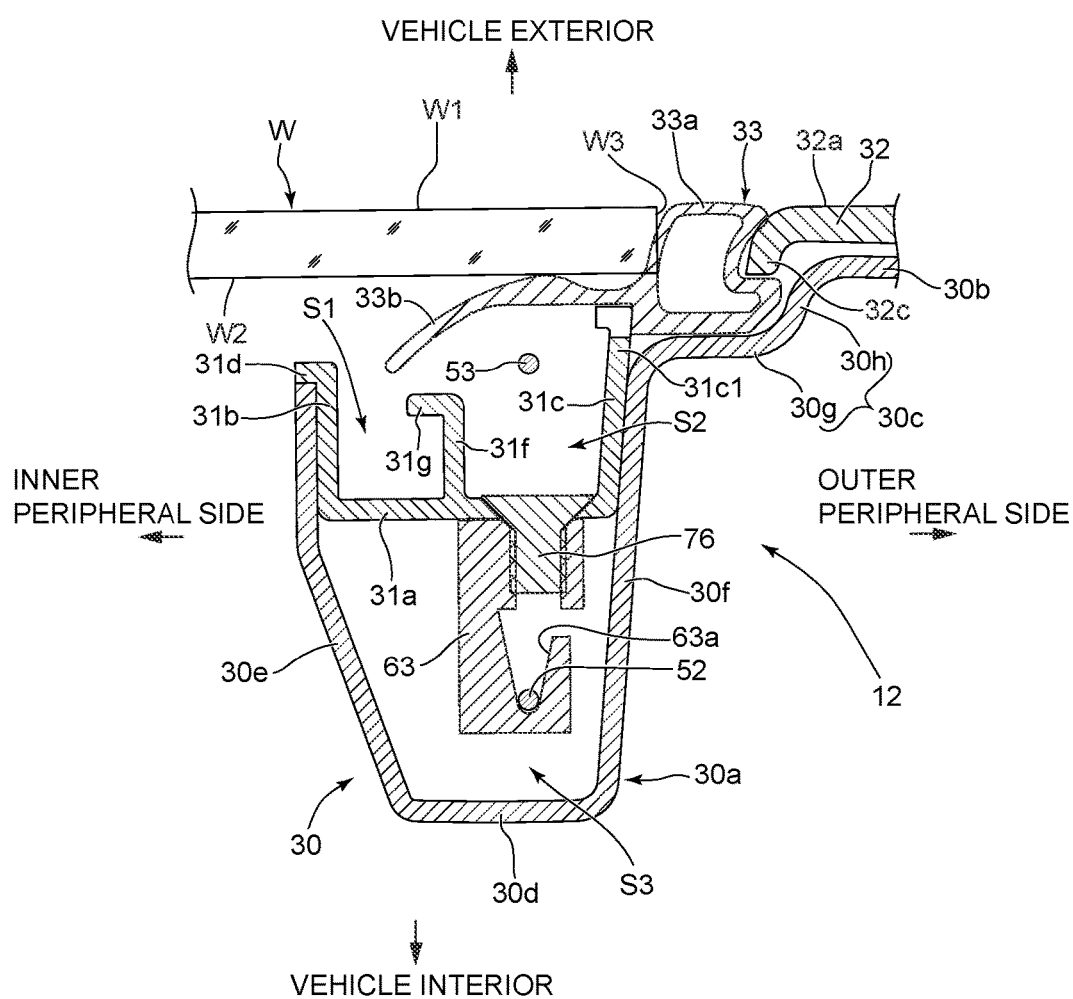
FIG. 14 is a cross-sectional view of the upright pillar sash at a position along line XIV-XIV in FIG. 22.
Figure 19:
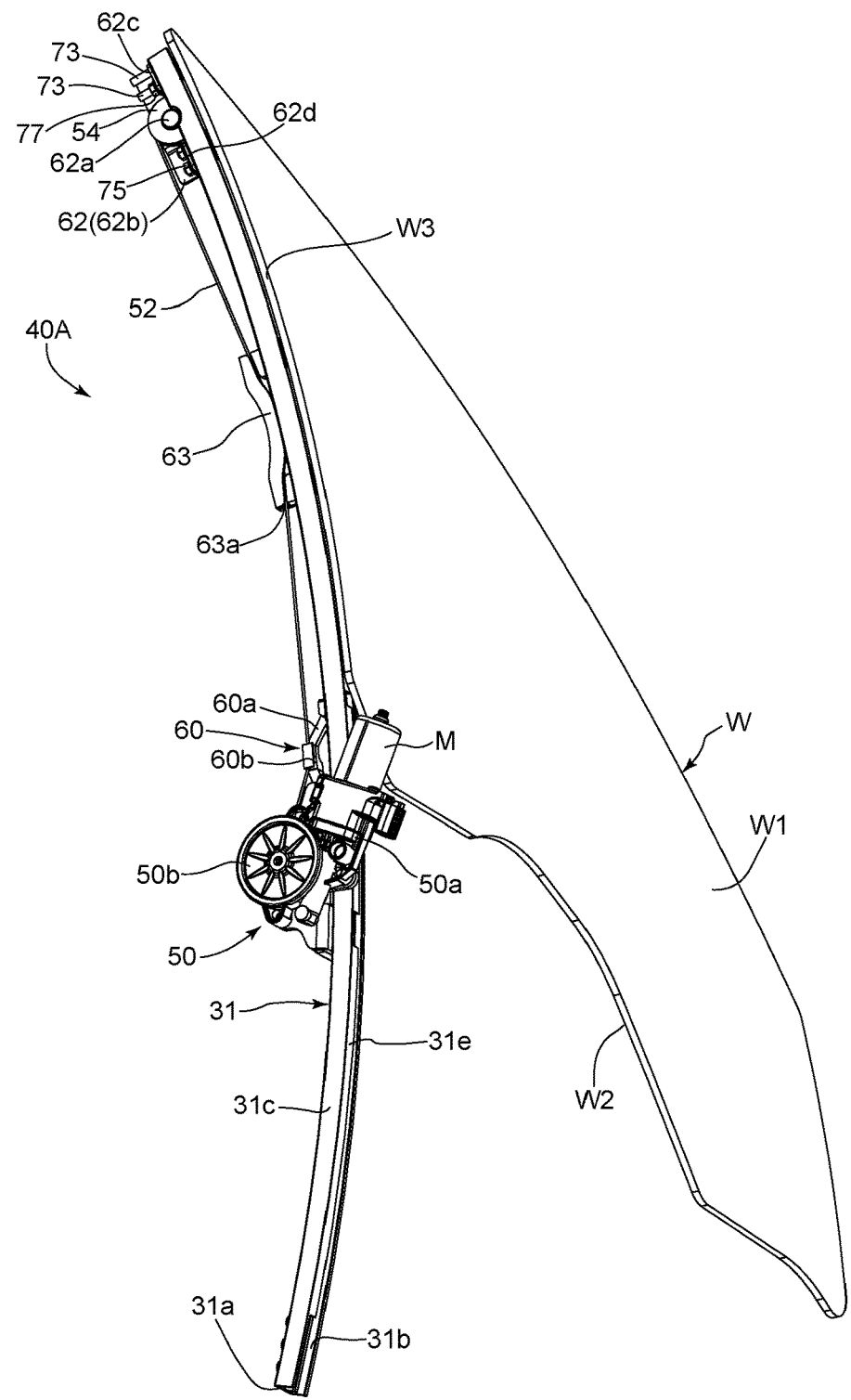
FIG. 19 is a perspective view of a window regulator assembly.

The wire holding member 63 is housed in the third section S3 in a state where the upright pillar sash 12 is completed (refer to FIG. 14). Therefore, the assembly of the components of the window regulator 40 including the wire holding member 63 is to be completed before assembling the guide rail 31 with the inner sash 30 and the connecting member 35. FIG. 19 illustrates a regulator assembly 40A in this state. The regulator assembly 40A has already been completed as a functional part for moving (elevating/lowering) the window glass W along the guide rail 31. Therefore, it is possible to perform operation check, inspection, shipment (sales), maintenance, or the like in the state of the regulator assembly 40A.

Note that the connecting member 35 is not attached in the regulator assembly 40A illustrated in FIG. 19. Therefore, the upper bolt 73 (refer to FIGS. 18 and 23) of the pair of bolts 73 for fastening the support seat 62c of the pulley bracket 62 is not secured to the screw hole 35p of the connecting member 35. However, the lower bolt 73 is screwed into the nut 77 and thus, the support seat 62c is stably secured to the guide rail 31.

Figure 24:
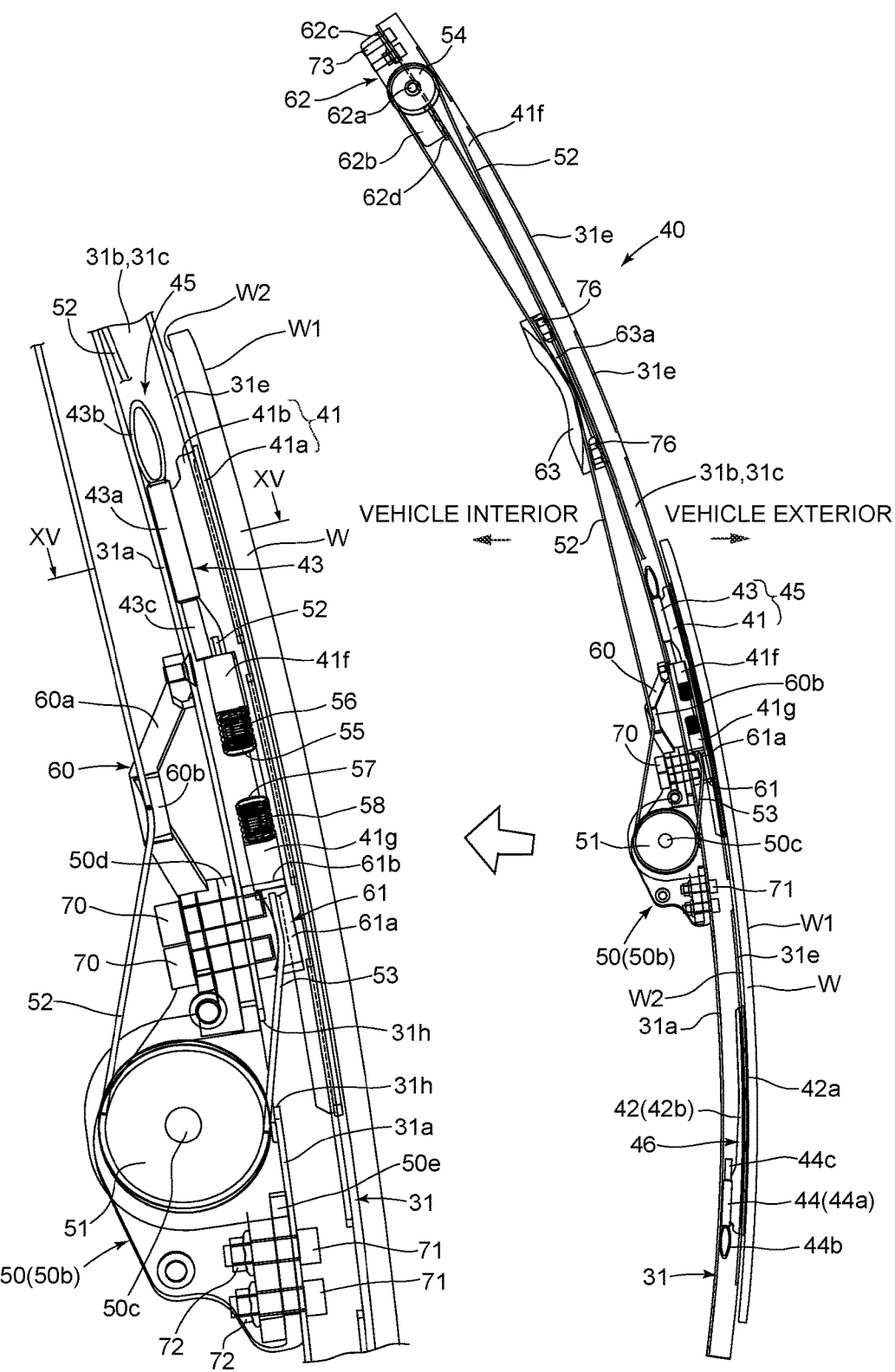
FIG. 24 is a partially see-through rear view of the window regulator in a fully open state of window glass.

FIGS. 20, 23, and 24 illustrate a state where the window glass W is elevated and lowered by the window regulator 40 having the above configuration. The solid line in FIG. 20 illustrates the fully closed position (top dead center) where the window glass W rises most, while the two-dot chain line in FIG. 20 illustrates the fully open position (bottom dead center) where the window glass W descends most. FIG. 23 illustrates a state of the window regulator 40 when the window glass W is fully open, while FIG. 24 illustrates a state of the window regulator 40 when the window glass W is fully open.

As illustrated in FIG. 23, the shoe 43 of the upper slider 45 reaches near the upper end of the guide rail 31 when the window glass W is in the fully closed position. Although the guide pulley 54 is provided near the upper end of the guide rail 31, the first section S1 in which the shoe 43 is inserted and the second section S2 in which the guide pulley 54 is disposed are separately arranged in parallel in the inner and outer peripheral directions, and thus, the shoe 43 and the guide pulley 54 will not interfere with each other.

At the fully closed position of the window glass W, as illustrated in FIG. 23, the upper wire end support 41f provided on the slider 45 is located immediately below the guide pulley 54 (winding start point Q1). In the slider 45, the wire end support 41f is provided so as to be shifted downward with respect to the shoe 43 (shoe support 41c) (refer to FIG. 21). Therefore, it is possible to position the wire end support 41f directly below the guide pulley 54 in a state where the shoe 43 has reached a position in parallel with the guide pulley 54 as described above. That is, individual elements of the drive system can be housed with high space efficiency in the vicinity of the upper end of the guide rail 31 without impairing the smooth routing of the first wire 52 around the guide pulley 54.

Furthermore, the upper part of the upper slider 45 is located near the upper end of the upright pillar sash 12 (door corner part 10d), while the lower part of the lower slider 46 is located near the belt line reinforcement 16 (refer to FIG. 1), so as to support the window glass W over substantially the entire area of the upright pillar sash 12 in the vertical direction. This makes it possible to stably support the window glass W with extremely high accuracy, leading to improvement of the fall resistance of the window glass W in the vehicle front-rear directions and the vehicle interior and exterior directions.

As illustrated in FIG. 24, at the fully open position of the window glass W, the lower end surface of the lower wire end support 41g of the shoe base 41 constituting the slider 45 comes in contact with the stopper surface 61b of the wire guide member 61 so as to regulate further lowering of the window glass W. That is, the wire guide member 61 also functions as a mechanical stopper that determines the downward moving end of the window regulator 40.

Even in the fully open position, the window glass W is supported in a wide range in the vertical direction within the door panel 10a with respect to the guide rail 31, leading to achievement of high support accuracy and stability of the window glass W similar to the case of the fully closed position described above.

As described above, in the door 10 of the present embodiment, of the window regulator 40, the components of the elevating/lowering mechanism for transmitting the driving force of the motor M, which is the drive source, to the window glass W are incorporated in the upright pillar sash 12. This configuration improves the space efficiency and layout flexibility around the door panel 10a as compared with the existing configuration in which the window regulator is arranged in the internal space of the door panel 10a below the window opening 10c. For example, the degree of freedom in door trim shape setting on the door inner surface side will be enhanced. In addition, the inner surface of the door can be made closer to the vehicle exterior side to improve the ease of stride when getting on and off the vehicle. Furthermore, increasing the internal space of the door panel 10a leads to acquisition of a space for arranging functional components other than the window regulator or improvement of the assemblability of components into the door panel 10a.

Figure 26:
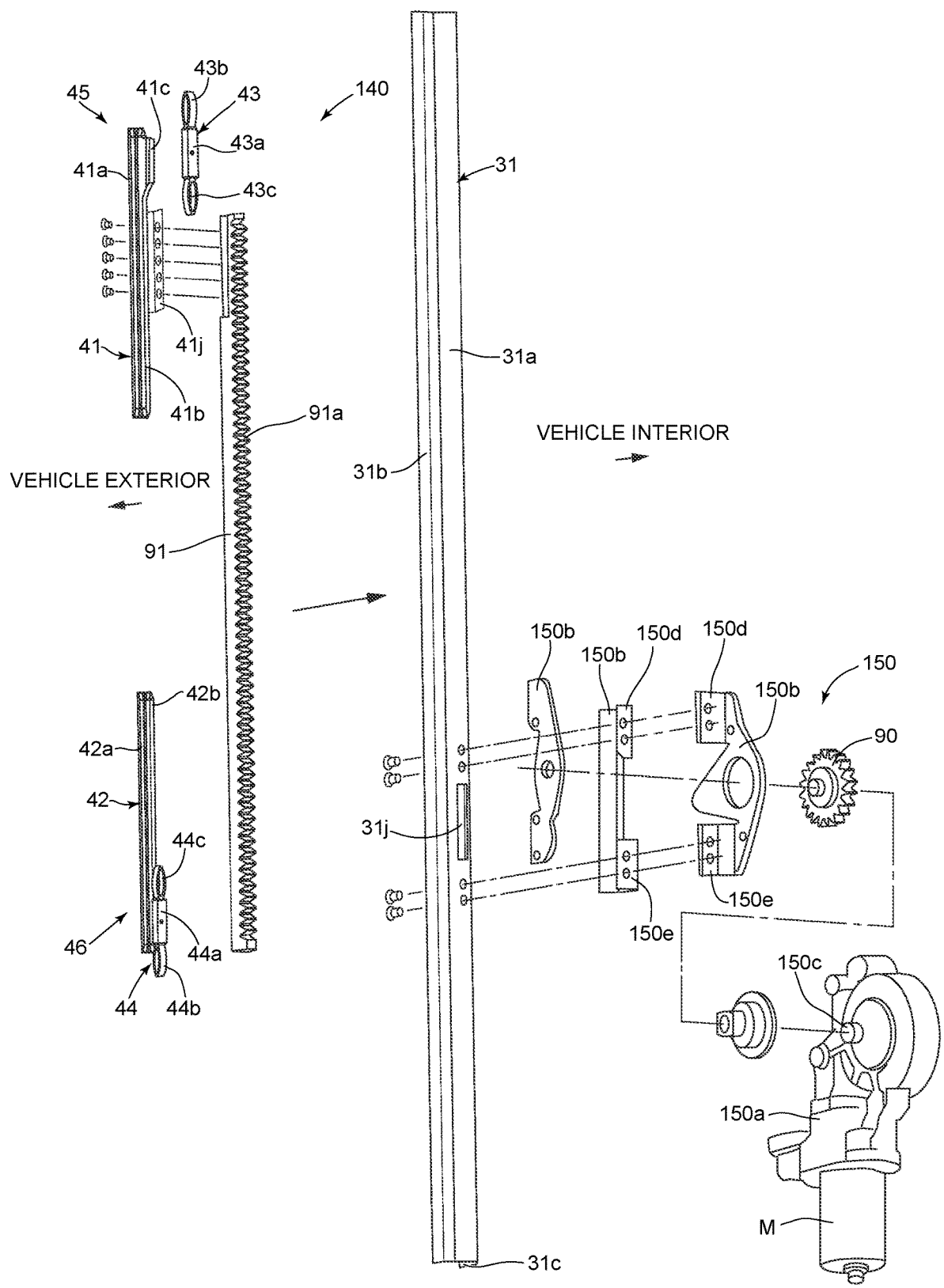
FIG. 26 is an exploded perspective view of a window regulator according to a second embodiment.
Figure 27:
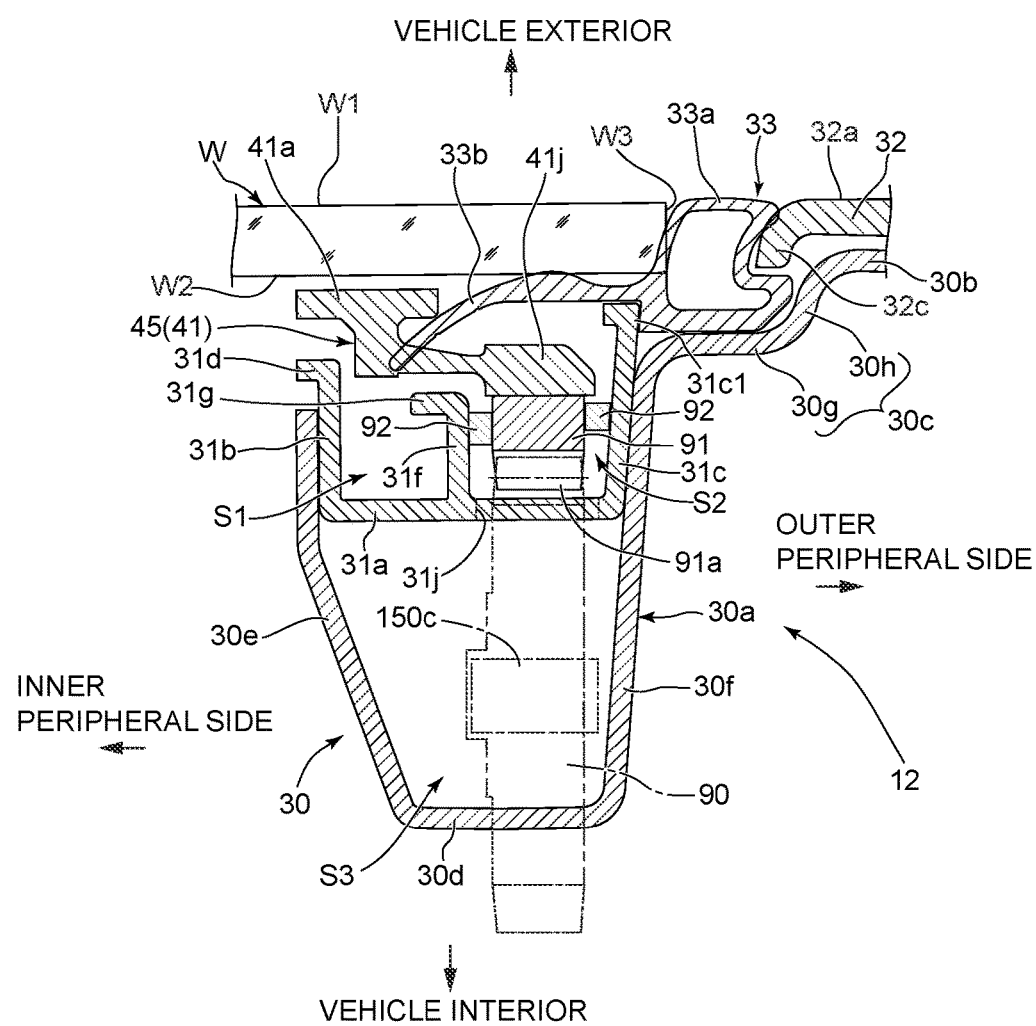
FIG. 27 is a cross-sectional view of the window regulator according to the second embodiment.

FIGS. 26 and 27 illustrate a window regulator 140 according to a second embodiment. While the window regulator 40 of the previous embodiment includes a wire type transmission mechanism, the window regulator 140 includes a rack and pinion type transmission mechanism. Other configurations are similar to the previous embodiment, and the common parts are denoted by the same reference numerals as in the previous embodiment, and description thereof is omitted.

As illustrated in FIG. 26, a motor unit 150 constituting the window regulator 140 is attached to the guide rail 31 at substantially the same position as the motor unit 50 of the previous embodiment (that is, inside the door panel 10a). The motor unit 150 includes a drive unit 150a having a motor M, and a pinion support member 150b that rotatably supports a pinion 90. The pinion 90 is connected to a drive shaft 150c, and rotational driving force is transmitted from the drive unit 150a via the drive shaft 150c. The pinion support member 150b is fastened and secured by bringing upper and lower brackets 150d and 150e into contact with the vehicle interior side wall 31a of the guide rail 31 from the vehicle interior side. The pinion 90 supported in this manner is driven to rotate about the drive shaft 150c extending in the inner and outer peripheral directions.

The vehicle interior side wall 31a of the guide rail 31 is provided with a through hole 31j penetrating vehicle interior and exterior directions, formed between positions where the upper and lower brackets 150d and 150e of the pinion support member 150b are to be secured. The through hole 31j is formed at a position where the second section S2 and the third section S3 (refer to FIG. 27) in the upright pillar sash 12 communicate with each other. The pinion 90 partially enters the second section S2 through the through hole 31j. FIG. 27 illustrates the general cross-sectional position of the upright pillar sash 12 above the position of the pinion 90, in which the pinion 90 is virtually represented by a one-dot chain line.

A rack 91 is arranged in the second section S2 in the upright pillar sash 12 (guide rail 31). The rack 91 is a long member extending in the longitudinal direction of the guide rail 31, including teeth 91a facing the vehicle interior side formed continuously in the longitudinal direction. The second section S2 includes a rack guide 92 for enabling stable movement of the rack 91 in the vertical direction (refer to FIG. 27).

The shoe base 41 of the slider 45 is provided with a rack connection part 41j protruding from the connection part 41b to the outer peripheral side, near the center in the longitudinal direction (below the shoe support 41c). The rack connection part 41j extends into the second section S2 and is secured to a vehicle exterior side surface of the rack 91 (a surface on which the teeth 91a are not formed). The part secured to the rack connection part 41j is a part near the upper end of the rack 91.

The rack 91 disposed in the second section S2 extends to the position where the through hole 31j is formed, and the pinion 90 that enters the second section S2 via the through hole 31j meshes with the teeth 91a of the rack 91. When the pinion 90 rotates in the normal or reverse direction by the driving force of the motor M, the meshing rack 91 moves in the vertical direction. The movement of the rack 91 is transmitted to the slider 45 so as to raise or lower the window glass W. The rack 91 has a length that meshes with the pinion 90 in the entire movable range from the fully closed position to the fully open position of the window glass W (refer to FIG. 20).

Similar to the window regulator 40 of the previous embodiment, the window regulator 140 incorporates, into the upright pillar sash 12, components of an elevating/lowering mechanism for transmitting the driving force of the motor M being a drive source to the window glass W. In particular, the transmitting portion for transmitting the driving force to the slider 45 includes merely the pinion 90 and the rack 91, leading to the small number of components, which is advantageous in terms of simplicity of the configuration, facilitated production, or the like.

As described above, the window regulator 40 or 140 of the door 10 of the above embodiment includes the two sliders 45 and 46 that support the rear edge portion of the window glass W while separated from each other in the elevating/lowering directions (vertical direction), and has the shoes 43 and 44 of the individual sliders 45 and 46 supported so as to move in the elevating/lowering directions with respect to the first section S1 of the guide rail 31 provided in the upright pillar sash 12.

Since the shoes 43 and 44 of the sliders 45 and 46 are movably supported by the guide rails 31 arranged along the upright pillar sash 12, a wide space is ensured in the central portion in the front-rear directions in the door panel 10a, making it possible to enhance the freedom of design of the internal space of the door panel 10a. Furthermore, since the window regulators 40 and 140 support only the rear edge side of the window glass W, leading to acquisition at a lower cost compared to a case of including a plurality of elevating/lowering mechanisms.

The support portion via the shoe 43 and the support portion via the shoe 44 work to mutually regulate the inclination of the window glass W in the door 10 in the vehicle front-rear directions (inner and outer peripheral directions with respect to the upright pillar sash 12) and the vehicle interior and exterior directions. That is, since the window glass W is supported via the plurality of shoes 43 and 44 which are separated from each other in the elevating/lowering directions, the posture stability of the window glass W is excellent. In particular, since the window regulator 40 or 140 supports the rear edge of the window glass W, supporting only one position in the elevating/lowering directions by the slider shoe would cause a moment centered on the position supported by the shoe, which might cause collapse of the window glass W in the vehicle front-rear directions. Fortunately, however, as in the above-described embodiment, the window glass W is supported at a plurality of positions in the elevating/lowering directions (the shoes 43 and 44 of the sliders 45 and 46) and thereafter the position of each of the shoes 43 and the shoes 44 is regulated by the guide rail 31 (the first section S1) in the vehicle front-rear directions, making it possible to reliably suppress the inclination in the front-rear directions.

In the above-described embodiment, each of the shoe 43 of the slider 45 and the shoe 44 of the slider 46 is regulated in moving in both directions of the vehicle front and the vehicle rear with respect to the guide rail 31 (the first section S1). However, the functions may be shared such that the shoe 43 is regulated in moving only in one of the vehicle front/vehicle rear directions while the shoe 44 is regulated in moving only in the other of the vehicle front/vehicle rear directions.

Furthermore, as illustrated in FIG. 19, sliders 45 and 46 are arranged at the longer rear edge side out of the front and rear edges of the window glass W, so as to be maximally separated from each other in the elevating/lowering directions. In addition, ranges E1 and E2 in which the glass supports 41a and 42a of the individual sliders 45 and 46 are secured to the window glass W are also long in the elevating/lowering directions. This makes it possible to achieve very stable support while having a configuration of supporting one edge of the window glass W.

Since the sliders 45 and 46 elongated in the elevating/lowering directions are arranged along the upright pillar sash 12 which is also long in the elevating/lowering directions of the window glass W, the sliders 45 and 46 are arranged in a space-saving manner. In addition, since the shoes 43 and 44 of the sliders 45 and 46 move along the internal space (inside the frame part 30a) of the upright pillar sash 12 designed to have a hollow shape, it is possible to achieve a configuration with high space efficiency without enlarging the upright pillar sash 12 in particular.

The shoes 43 and 44 of the sliders 45 and 46 have sliding bases 43a and 44a having a solid structure long in the elevating/lowering directions arranged in the first section S1 of the guide rail 31. Furthermore, the first elastic contact parts 43b and 44b and the second elastic contact parts 43c and 44c respectively protruding from the sliding bases 43a and 44a suppress the deflection of the shoes 43 and 44 in the vehicle interior and exterior directions and the inner and outer peripheral directions (vehicle front-rear directions). Accordingly, the sliding stability of the sliders 45 and 46 with respect to the guide rail 31 is also excellent.

The driving force from the motor M is transmitted to the upper slider 45, among the plurality of sliders 45 and 46. At the time of closing the window glass W, the window glass W is pulled upward via the upper slider 45. Compared to a configuration in which the lower edge of the window glass is supported by the slider and the window glass is closed while being pushed up by the slider, the configuration in which the window glass W is pulled up via the upper slider 45 is more suitable for stabilizing the sliding in the window glass W. That is, in a case where the plurality of sliders 45 and 46 (more specifically, shoe bases 41 and 42 secured to the window glass W) is provided as in the above embodiment, the uppermost slider 45 (shoe base 41) in the elevating/lowering directions is to be preferably selected as a target to receive the transmitted driving force.

The guide rail 31 includes the second section S2 at a position adjacent to the first section S1 in the inner and outer peripheral directions. The upper slider 45 positions the shoe 43 in the first section S1, allowing the wire end support 41*f* and 41*g*, and the rack connection part 41*j*, to extend toward the second section S2 side. In the second section S2, the driving force for elevating and lowering the window glass W is transmitted to the slider 45 via the first wire 52 and the rack 91. That is, the slider 45 has a configuration in which the sliding part (shoe 43) guided in the elevating/lowering directions by the guide rail 31 and the transmission receiving part (wire end support units 41*f* and 41*g*, and rack connection part 41*j*) connected with the transmission members (first wire 52, rack 91) that transmit a driving force to the slider 45, are arranged at different positions in the inner and outer peripheral directions (vehicle front-rear directions). With this configuration, the slider 45 can be arranged in the upright pillar sash 12 with high space efficiency.

Note that the sliding part (shoe 44) guided in the elevating/lowering directions by the guide rail 31 is located in the first section S1 also in the lower slider 46 to which the transmission member is not connected. Accordingly, it is possible to achieve an arrangement with high space efficiency without interfering with a transmission member passing through the second section S2.

Although the above embodiment has the two sliders 45 and 46 provided at different positions in the elevating/lowering directions, it is also possible, as a modification, to select a configuration including three or more sliders. For example, setting the range to secure each of the sliders in the elevating/lowering directions to be shorter than the ranges E1 and E2 illustrated in FIG. 20 would enable the window glass W of the above embodiment to be supported by three or more sliders.

Figure 28:
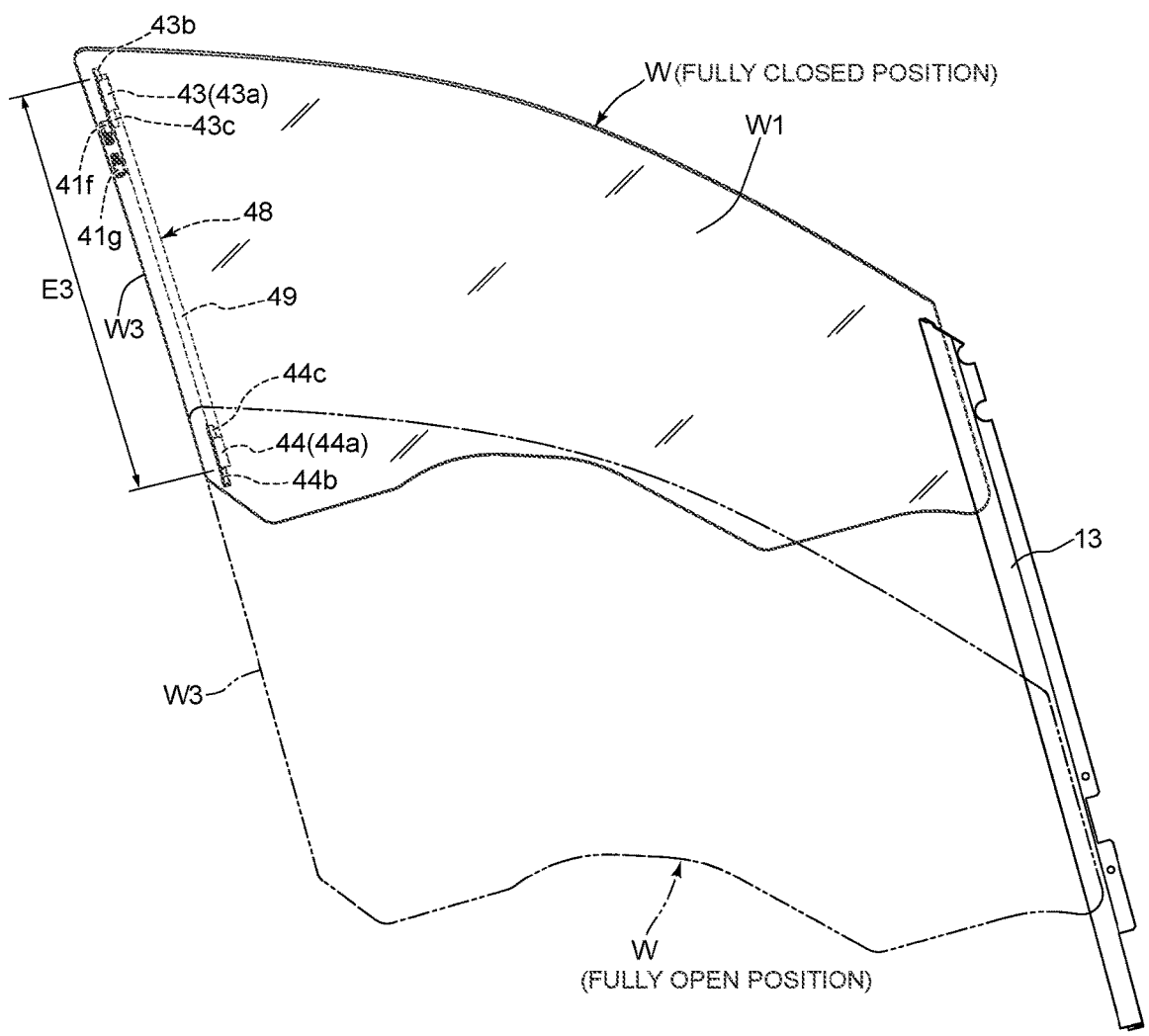
FIG. 28 is a side view illustrating a slider of a modification having a different support region for the window glass.

FIG. 28 illustrates a further modification of the slider. A slider 48 illustrated in FIG. 28 has a configuration including one shoe base 49 that is long in the vertical direction, in which two shoes 43 and 44 are connected to the shoe base 49. Configurations and arrangement of the shoes 43 and 44 are similar to the embodiment described above. Although not illustrated in detail, the cross-sectional shape of the shoe base 49 is substantially the same as in the shoe base 41 or the shoe base 42 of the previous embodiment. That is, the shoe base 49 includes: a plate-like glass support secured to the vehicle interior side surface W2 of the window glass W; and a shoe support protruding from the glass support to the vehicle interior side to be connected with the shoes 43 and 44.

A range E3 (FIG. 28) in the vertical direction in which the shoe base 49 is provided substantially corresponds to the range from the upper end of the range E1 of the shoe base 41 to the lower end of the range E2 of the shoe base 42 illustrated in FIG. 20. That is, the shoe base 49 is secured to the window glass W in a substantially entire vertical direction range on the rear edge side of the window glass W along the upright pillar sash 12.

As can be seen from the slider 48 of the above modification, it is possible to select a configuration having the different number of sliding parts (shoe 43 and 44) guided movably in the elevating/lowering directions of the window glass W with respect to the guide rail 31 and different number of glass support (shoe base 49) secured to the window glass W. That is, the present invention holds as long as there are provided, as components of the slider for supporting and guiding the window glass in the elevating/lowering directions, at least one glass support, and a plurality of (two or more) sliding parts having different positions in the elevating and lowering directions.

Although the shoe base 49 in FIG. 28 is secured to the vehicle interior side surface W2 of the window glass W over the entire range E3 in the vertical direction, it is also possible to non-continuously set positions at which one shoe base (glass support) is secured to the window glass W. For example, it is possible to use a shoe base having an integral structure in which the connection parts 41*b* and 42*b* of the shoe base 41 and the shoe base 42 of the above embodiment are extended and connected with each other. In this case, the shoe base having the integrated structure is secured to the window glass W in the regions of the glass supports 41*a* and 42*a* (ranges E1 and E2 illustrated in FIG. 20), while being located separated from the window glass W toward the vehicle interior side in the intermediate regions (the connection parts 41*b* and 42*b* extended to be interconnected).

In the above embodiment, all the components of the window regulators 40 or 140 are assembled to the guide rail 31 incorporated in the upright pillar sash 12 and the connecting member 35 constituting the door corner part 10*d*. In contrast, a part other than the part (in the above embodiment, the guide rail 31 and the sliders 45, 46, and 48) related to the elevating/lowering support of the window glass W can be arranged in another position of the door 10. For example, a motor that is a drive source in the elevating/lowering directions, a wire mechanism or a rack and pinion mechanism that transmits a driving force to the window glass W can also be assembled to the door panel 10*a*.

In the above embodiment, the upright pillar sash 12 is longer than the front sash 13 in the elevating/lowering directions, and thus, it is preferable to support the sliders 45, 46, 48 on the upright pillar sash 12 side. However, in the case of a vehicle door having a sufficient length on the front sash side, it is also possible to support a plurality of sliding parts constituting a slider by changing the position in the elevating/lowering directions with respect to the front sash. Alternatively, in the case of a vehicle door having a division bar that separates a window opening that is opened and closed by the window glass elevated or lowered from a fixed window frame that is closed by a fixed window, it is possible to support a plurality of sliding parts with different positions in the elevating/lowering directions with respect to the division bar. All of these front sashes and division bars correspond to the sash member of the present invention. Therefore, the glass elevating/lowering device of the present invention can be widely applied as long as the glass support (shoe base) of the slider is secured along one of the front edge or the rear edge of the window glass to be elevated and lowered.

In summary, the glass elevating/lowering device of the present invention defines a member including the glass support (shoe bases 41, 42, or 49) secured to the window glass (W) and including sliding parts (shoes 43 and 44) movably guided, in the glass elevating/lowering directions, along the guide rail (31) provided on the sash member (upright pillar sash 12), as sliders (45, 46, or 48). The number of sliders and glass supports may be singular or plural. Regarding the sliding part, regardless of whether the slider (glass support) is singular or plural, it is required to provide a plurality of (two or more) sliding parts at different positions in the elevating/lowering directions, and further required to include two sliding parts having a relationship in which position regulations are performed by the guide rail in at least one direction and at least the other direction in the vehicle front-rear directions. The object to which the glass support of the slider is to be secured may be a region along any of the front edge or the rear edge of the window glass.

In the present invention, the shape or the like of the slider supporting the window glass are not limited to those of the sliders 45, 46, and 48 of the above embodiment. For example, in the above-described embodiment, the first elastic contact parts 43b and 44b and the second elastic contact parts 43c and 44c provided on the shoes 43 and 44 that slide with respect to the guide rail 31 are both elongated ring-shaped bodies. Alternatively, the elastic contact parts provided on the shoes 43 and 44 may be changed to a cantilever shape or the like. The elastic contact part is biased so as to always come in contact with the inner wall surface of the guide rail 31 to suppress backlash of the shoes 43 and 44. Therefore, the elastic contact part having a cantilever shape arranged only in the biasing direction would be able to obtain necessary functions.

Moreover, unlike the shoes 43 and 44 of the above embodiment, it is also allowable to include only one of the first elastic contact parts 43b-44b for suppressing deflection in the vehicle interior and exterior directions, or the second elastic contact parts 43c-44c for suppressing deflection in the inner and outer peripheral directions.

The door 10 of the above embodiment is a type of door (sash door) in which the frame-shaped door sash 10b formed of a member different from the door panel 10a is provided above the door panel 10a. However, the present invention is applicable to other doors. For example, the present invention is also applicable to a type of door in which a door panel and a door sash are integrally formed (an inner full door in which an inner panel and a door sash are integrally formed, or a panel door first integrally forming each of an inner panel and an outer panel with each of an inner side and an outer side of a door sash and then combining each of portions). That is, the present invention is applicable to any vehicle door that raises and lowers the window glass in the window opening regardless of whether the door sash forming the window opening is integral with or separate from the door panel.

In the above embodiment, the window regulator 40 (140) is constituted by the guide rail 31, the window glass W with the sliders 45 and 46 (48), and the motor unit 50 (150). The guide rail 31 is a guide member attached to the upright pillar sash 12. Sliders 45, 46 (48) provided on the window glass W include: the shoes 43 and 44 being guided members (sliding parts) for receiving the guide of the guide rail 31; and shoe bases 41 and 42 (49) being driven members. The motor unit 50 (150) is a driving means of applying a driving force to the driven members of the window glass W. By allocating each of functions of the window regulator to each of these elements, it is possible to select various delivery modes with more choices in the orders and methods concerning the assembling of the window regulator.

For example, the above embodiment has presented a mode in which the guide rail 31, the window glass W with the sliders 45 and 46 (48), and the motor unit 50 are combined in advance to form the regulator assembly 40A (FIG. 19), and then assembling to the inner sash 30 being a frame structure constituting the upright pillar sash 12 is performed. Assembling the regulator assembly 40A in advance would facilitates operational checks related to the drive of the window glass W. Alternatively, however, it is also possible to secure the guide rail to the door sash (upright pillar sash 12) first and then assemble other components of the window regulator.

Figure 29:
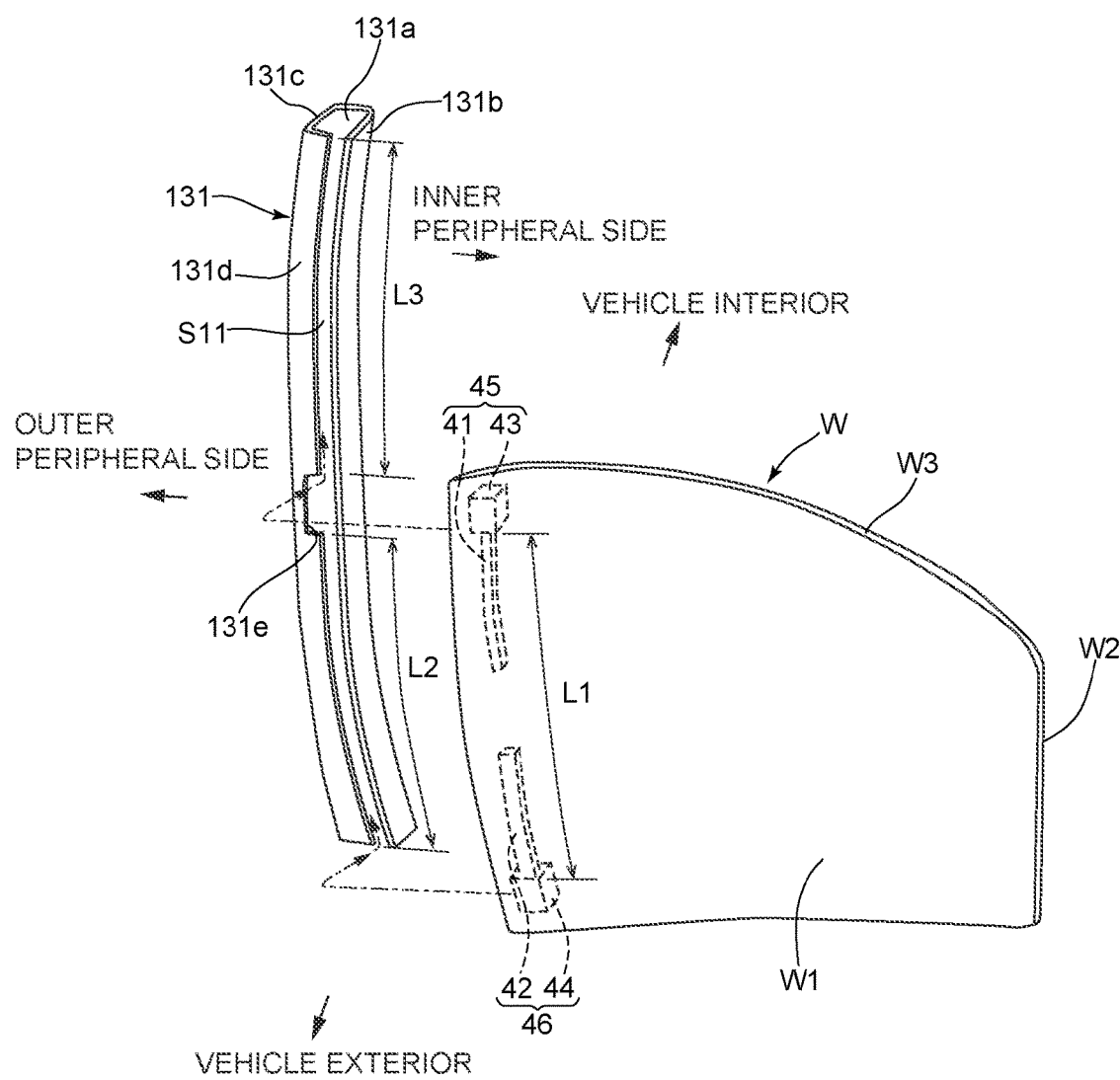
FIG. 29 is a view illustrating a modification of assembling the window glass with a slider to a guide rail.
Figure 30:
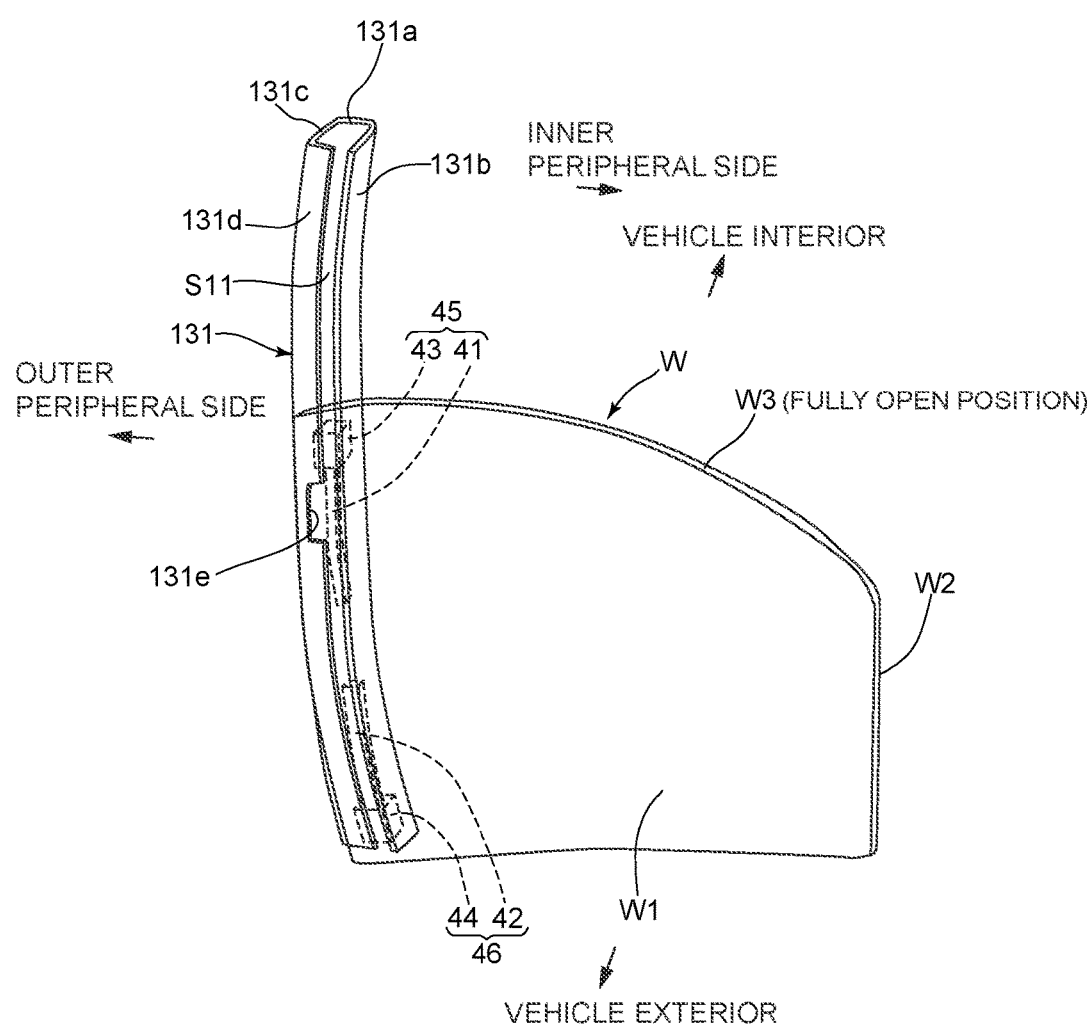
FIG. 30 is a view illustrating a modification of assembling the window glass with a slider to the guide rail.

FIGS. 29 and 30 illustrate a modification suitable for later assembling a window glass with two shoes to a guide rail preliminarily secured to a door sash. A guide rail 131 illustrated in FIGS. 29 and 30 presents only a part that guides the shoes 43 and 44, out of the guide rail 31 of the above embodiment. That is, the guide rail 131 includes an internal section S11 surrounded by a vehicle interior side wall 131a, an inner peripheral side wall 131b, an outer peripheral side wall 131c, and a cover wall 131d, having a gap (an opening that partially exposes the internal section S11) provided in the inner and outer peripheral directions between the cover wall 131d and the inner peripheral side wall 131b. The configuration on the window glass W side is similar to that of the above embodiment, in which the shoes 43 and 44 are attached to the vehicle interior side surface W2 of the window glass W via the shoe bases 41 and 42. When the window glass W is elevated or lowered, a part of the shoe bases 41 and 42 passes through the gap between the cover wall 131d and the inner peripheral side wall 131b.

The guide rail 131 has a notch (passage part) 131e in the middle in the longitudinal direction (the opening/closing directions of the window glass W). The notch 131e is formed by cutting an edge on the inner peripheral side of the cover wall 131d. The shoes 43 and 44 are not allowed to pass through the gap between the cover wall 131d and the inner peripheral side wall 131b in the vehicle interior and exterior directions. The shoes 43 and 44 are allowed to pass only at a formation position of the notch 131e in the vehicle interior and exterior directions (directions intersecting the opening/closing directions of the window glass W).

When the distance from the lower end of the upper shoe 43 to the upper end of the lower shoe 44 is L1, and the length from the lower end of the notch 131e to the lower end of the guide rail 131 is L2, then L1>L2 is established. Furthermore, when the length from the upper end of the notch 131e to the upper end of the guide rail 131 is L3, both the length L2 and the length L3 are greater than the movement amount (shoe stroke) of the shoes 43 and 44 corresponding to a movable range from the fully closed position to the fully open position of the window glass W.

In assembling the window glass W to the guide rail 131, the upper shoe 43 is aligned with the notch 131e. Since L1>L2, when the upper shoe 43 is aligned with the notch 131e, the lower shoe 44 is located below the lower end of the guide rail 131. When the guide rail 131 and the window glass W are brought to be close to each other in the vehicle interior and exterior directions, the shoe 43 passes through the notch 131e and enters the inside of the guide rail 131 (internal section S11). The shoe 44 moves below the guide rail 131 onto the extension of the internal section S11.

Subsequently, the guide rail 131 and the window glass W are relatively moved in the vertical direction, and the positions of the shoes 43 and 44 are shifted upward with respect to the guide rail 131. This allows the shoe 43 to separate from the notch 131e, so as to be in a state of regulating detachment of the shoe 43 to the vehicle exterior side by the cover wall 131d. The shoe 44 enters the internal section S11 from the opening at the lower end of the guide rail 131, so as to be in a state of regulating detachment of the shoe 44 to the vehicle exterior side by the cover wall 131d.

FIG. 30 illustrates a positional relationship with the guide rail 131 when the window glass W is at the fully open position (bottom dead center). The shoe 43 is located slightly above the notch 131e, while the shoe 44 is located slightly above the lower end of the guide rail 131. With this configuration, the shoe 43 and the shoe 44 are housed in the internal section S11 in a state of being regulated in movement in both the vehicle interior and exterior directions and the inner and outer peripheral directions.

When the window glass W moves from the fully open position to the fully closed position (top dead center), the shoes 43 and 44 move upward with respect to the guide rail 131. Each of the length L2 and the length L3 of the guide rail 131 is greater than the movement amount of each of the shoes 43 and 44 from the fully closed position to the fully open position of the window glass W. Therefore, when the window glass W reaches the fully closed position, the shoe 43 is located below the upper end of the guide rail 131 while the shoe 44 is located below the notch 131e, maintaining the state where each of the shoes 43 and 44 is supported in the guide rail 131.

In a configuration in which the guide rail 131 does not include the notch 131e, the upper shoe 43 would be inserted from the lower end of the guide rail 131, or the lower shoe 44 would be inserted from the upper end of the guide rail 131. This would require a large space in the longitudinal direction of the guide rail 131. In particular, when the guide rail 131 is attached to the upright pillar sash 12 (refer to FIG. 1) first, the upper end of the guide rail 131 would be closed by the door corner part 10d (refer to FIG. 1), restricting the insertion of the shoes 43 and 44 from the upper end side. In addition, the lower end of the guide rail 131 extends below the upright pillar sash 12 (similar to the relationship between the guide rail 31 and the upright pillar sash 12 in FIG. 1), and therefore, there would be difficulty in acquiring an escape space for the window glass W in order to position the shoe 43 below the lower end of the guide rail 131. In particular, in a case where a member constituting the door frame exists below the guide rail 131, the space for inserting the shoes 43 and 44 from the lower end side of the guide rail 131 would be extremely limited. In this manner, in assembling the window glass W with the shoes 43 and 44 to the guide rail 131 in a state where the guide rail 131 is incorporated in the upright pillar sash 12, restrictions on the assembly would be increased.

Fortunately, however, by providing the guide rail 131 with the notch 131e, it is possible to assemble the two shoes 43 and 44 to the guide rail 131 in the vehicle interior and exterior directions, with a small amount of movement at the time of assembly. Therefore, the window glass W with the shoes 43 and 44 can be easily assembled even in a small work space without above restrictions. This will facilitate production of a door frame assembly formed with the door sash 10b including the upper sash 11 and the upright pillar sash 12 (FIG. 1), the window glass W, components of the window regulator including the guide rail 131, and various brackets secured to the door sash 10b (the mirror bracket 14 and the lock bracket 15), or the like.

As illustrated in the modifications of FIGS. 29 and 30, the window regulator to which the present invention is applied can appropriately modify individual components in accordance with assembly conditions or the like.

The above embodiment uses the two shoes 43 and 44 having the same dimensions, and thus, both the shoes 43 and 44 can pass through the notch 131e. Alternatively, the dimensions of the two shoes (length in the opening/closing directions of the window glass W in particular) may differ from each other. In this case, the notch 131e provided in the guide rail 131 only needs to have a size and a shape that allow passage of at least one shoe (the shoe 43 in FIGS. 29 and 30).

Figure 31:
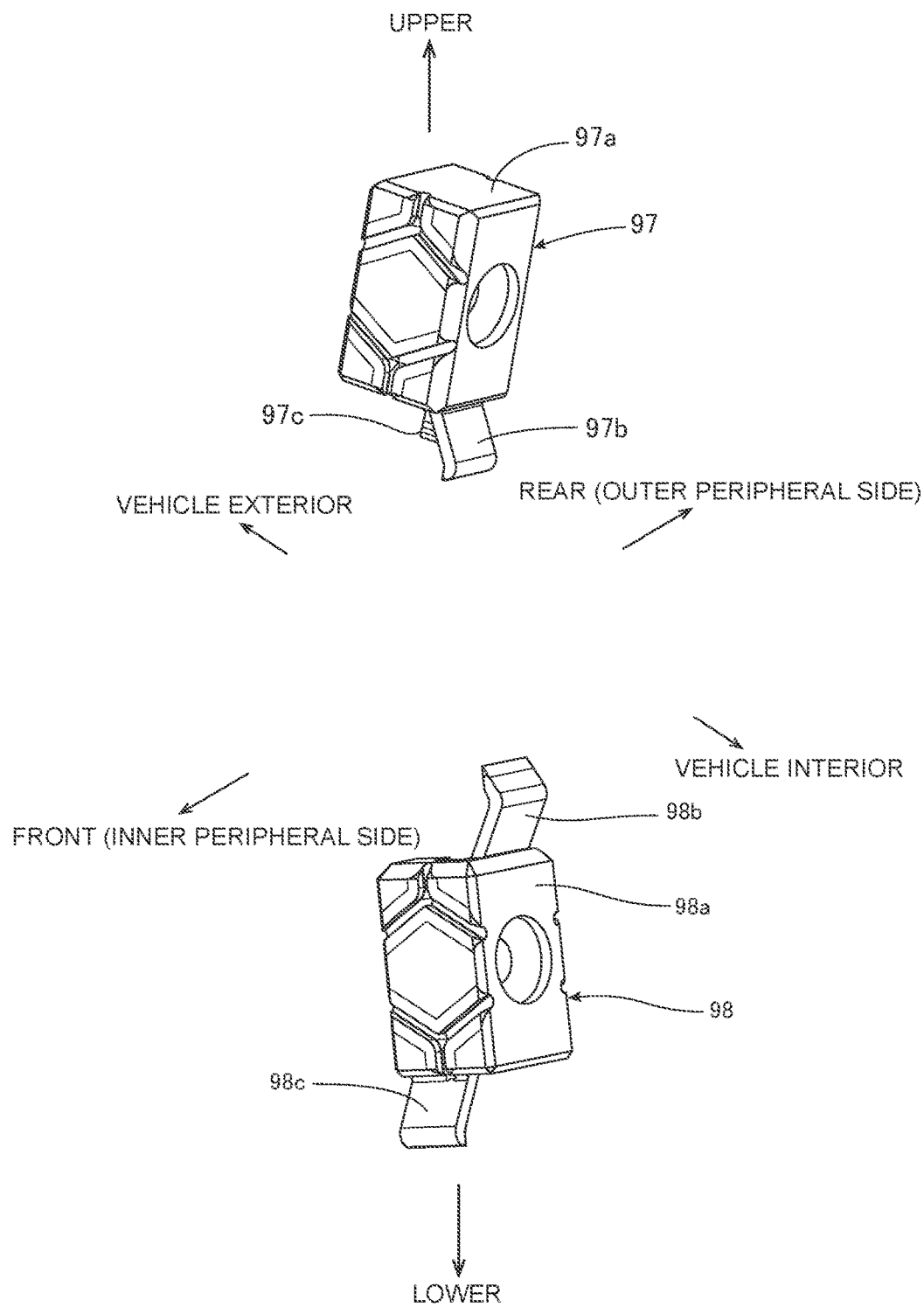
FIG. 31 is an exploded perspective view illustrating a modification of a shoe of the slider attached to the window glass.

FIG. 31 illustrates a modification of the shoe of the slider attached to the window glass W. Shoes 97 and 98 illustrated in FIG. 31 correspond to the shoes 43 and 44 of the above embodiment. The shoe 97 is disposed near the upper end (upper side) of the rear edge of the window glass W, while the shoe 98 is disposed near the lower end (lower side) of the rear edge of the window glass W.

The shoes 97 and 98 respectively have sliding bases 97a and 98a each having a rectangular cross-sectional shape that can be housed in the first section S1 of the guide rail 31 (refer to FIGS. 9 and 15). Cantilevered first elastic contact parts 97b and 98b and cantilevered second elastic contact parts 97c and 98c protrude from the sliding bases 97a and 98a, respectively.

The first elastic contact parts 97b and 98b protrude to the vehicle interior side with respect to the sliding bases 97a and 98a, respectively, and are in contact with the vehicle interior side wall 31a of the guide rail 31 (refer to FIGS. 9 and 15). The first elastic contact parts 97b and 98b in contact with the vehicle interior side wall 31a are pressed toward the vehicle exterior side and are elastically deformed, and respectively press the sliding bases 97a and 98a toward the vehicle exterior side by the force to recover from the elastic deformation. The sliding bases 97a and 98a pressed to the vehicle exterior side are pressed against the holding wall 31g (refer to FIGS. 9 and 15) that partially covers the vehicle exterior side in the first section S1, so as to be held in a stable state in the vehicle interior and exterior directions.

The second elastic contact part 97c protrudes to the outer peripheral side with respect to the sliding base 97a, so as to be in contact with the partition wall 31f of the guide rail 31. The second elastic contact part 97c in contact with the partition wall 31f is elastically deformed by being pressed toward the inner peripheral side, and presses the sliding base 97a toward the inner peripheral side by a force to recover from the elastic deformation. The sliding base 97a pressed to the inner peripheral side is pressed against the inner peripheral side wall 31b, so as to be held in a stable state in the inner and outer peripheral directions.

The second elastic contact part 98c protrudes to the inner peripheral side with respect to the sliding base 98a, so as to be in contact with the inner peripheral side wall 31b of the guide rail 31. The second elastic contact part 98c in contact with the inner peripheral side wall 31b is elastically deformed by being pressed toward the outer peripheral side, and presses the sliding base 98a toward the outer peripheral side by a force to recover from the elastic deformation. The sliding base 98a pressed to the outer peripheral side is pressed against the partition wall 31f, so as to be held in a stable state in the inner and outer peripheral directions.

In this manner, in the shoe 97 located on the upper end side of the rear edge portion of the window glass W, the second elastic contact part 97c protruding to the outer peripheral side presses the sliding base 97a toward the inner peripheral side (that is, forward), while the backlash on the outer peripheral side (that is, the rear side) is absorbable. Meanwhile, in the shoe 98 located on the lower end side of the rear edge portion of the window glass W, the second elastic contact part 98c protruding to the inner peripheral side presses the sliding base 98a toward the outer peripheral side (that is, rearward), while the backlash on the inner peripheral side (that is, forward) is absorbable. The function sharing between the shoe 97 and the shoe 98 has the following advantages.

The window glass W has a shape in which the rear edge is longer than the front edge in the vertical direction, and the height of the upper edge gradually decreases from the rear edge toward the front edge (refer to FIG. 1). Therefore, the window glass W supported by the shoes 97 and 98 along the rear edge constantly undergoes a load in a forward falling direction (clockwise when viewed from the vehicle exterior side as illustrated in FIG. 1). The load in the forward falling direction acts on the upper shoe 97 as a force to move the shoe to the inner peripheral side, while it acts on the lower shoe 98 as a force to move the shoe to the outer peripheral side. Here, the shoes 97 and 98 have the side surfaces of the sliding bases 97a and 98a having high strength and large area come into contact with the guide rail 31 (the inner surface of the first section S1) in the load acting direction, making it possible to obtain excellent load resistance.

Moreover, when severe vibration is applied to the vehicle body due to rough road driving or the like, a load that causes the window glass W to tilt in a direction opposite to the above-described forward falling direction (counterclockwise as viewed from the vehicle exterior side as illustrated in FIG. 1) works. The load in the reverse direction acts on the upper end shoe 97 as a force to move the shoe to the outer peripheral side, while it acts on the lower end shoe 98 as a force to move the shoe to the inner peripheral side. Here, the shoes 97 and 98 can efficiently suppress the vibration on the guide rail 31 in the load acting direction while absorbing the load respectively by the elastic deformation of the second elastic contact parts 97c and 98c.

Furthermore, although individual embodiments of the present invention have been described, it is allowable, as another embodiment of the present invention, to combine the above-described embodiments and modifications in whole or in part.

The embodiments of the present invention are not limited to the above embodiments and modifications, and may be changed, replaced, or modified in various manners without departing from the spirit of the technical idea of the present invention. Furthermore, the technical idea of the present invention may be implemented in another practical possible way by another advanced or derived technology. Therefore, the claims cover all embodiments that can be included in the scope of the technical idea of the present invention.

INDUSTRIAL APPLICABILITY

According to the present invention, it is possible to obtain a glass elevating/lowering device of the vehicle door capable of improving the stability of a window glass with a low-cost and space-saving structure, so as to be particularly useful for the vehicle door that requires a high degree of freedom in an internal structure and appearance. Furthermore, according to the present invention, it is possible to obtain a door frame assembly, a vehicle door opening/closing member driving device, and a vehicle door opening/closing member driving device assembling method capable of assembling components with a high degree of freedom with high workability, so as to be particularly useful for the vehicle door that includes functional components as opening/closing member driving devices arranged along the upright pillar sash.

REFERENCE SIGNS LIST

10 Door
10a Door panel
10b Door sash
10c Window opening
10d Door corner part
11 Upper sash
12 Upright pillar sash (sash member)
13 Front sash
20 Sash body
20a Frame part
21 Sash molding
22 Glass run storage
23 Glass run
24 weather-strip holder
30 Inner sash (frame structure)
30a Frame part
30b Design part
30c Step part
30d Vehicle interior side wall
30e Inner peripheral side wall
30f Outer peripheral side wall
30g Outer peripheral extension
30h Vehicle exterior extension
30i Side contact surface
31 Guide rail
31a Vehicle interior side wall
31b Inner peripheral side wall
31c Outer peripheral side wall
31c1 Positioning part
31d Bent part
31e Cover wall
31f Partition wall
31g Holding wall
31h Through hole
31i Through hole
31j Through hole
32 Garnish
32a Vehicle exterior side surface
32b Vehicle interior side surface
32c Inner peripheral edge
32c1 Positioning part
32d Outer peripheral edge
32e Inner peripheral side surface
32f Outer peripheral side surface
32g End surface
33 Elastic cover
33a Hollow part
33b Lip part
33c Vehicle exterior side wall
33d Inner peripheral side wall
33e Outer peripheral side wall
33f Outer peripheral protruding wall
33g Vehicle interior side wall
33h Inner peripheral side base wall
33i Outer peripheral side base wall
33j Vehicle interior side surface
33k Vehicle exterior side surface
35 Connecting member
35a First frame part 35b Second frame part
35c Contact end surface
35d Insertion projection
35e Vehicle interior side wall
35f Inner peripheral side wall
35g Outer peripheral side wall
35h Bent part
35i Plate part
35j Insertion projection
35k Step part
35m Thick part
35n Escape recess
35p Screw hole
36 Inner cover
40 Window regulator
40A Regulator assembly
41 Shoe base (glass support, driven member)
41a Glass support
41b Connection part
41c Shoe support
41d Load reduction part
41e Load reduction part
41e1 Tapered surface
41e2 Tapered surface
41f Wire end support (transmission receiving part)
41g Wire end support (transmission receiving part)
41h Wire insertion hole
41i Wire insertion hole
41j Rack connection part (transmission receiving part)
42 Shoe base (glass support, driven member)
42a Glass support
42b Connection part
42c Shoe support
42e Load reduction part
43 Shoe (sliding part, guided member)
43a Sliding base
43b First elastic contact part (deflection suppression part)
43c Second elastic contact part (deflection suppression part)
44 Shoe (sliding part, guided member)
44a Sliding base
44b First elastic contact part (deflection suppression part)
44c Second elastic contact part (deflection suppression part)
45 Slider
46 Slider
48 Slider
49 Shoe base (glass support, driven member)
50 Motor unit
50a Drive unit
50b Drum housing
50c Drive shaft
51 Winding drum
52 First wire (transmission member)
52x Wire short-circuit trajectory
53 Second wire (transmission member)
54 Guide pulley
55 Wire end
56 Compression spring
57 Wire end
58 Compression spring
60 Wire guide member
60a Arm part
60b Guide groove
61 Wire guide member
61a Guide groove
61b Stopper surface
62 Pulley bracket
62a Pulley pin
62b Pulley support
62c Support seat
62d Support seat
63 Wire holding member
63a Guide groove
73 Bolt
80 Upper die
81 Lower die
90 Pinion
91 Rack (transmission member)
92 Rack guide
97 Shoe (sliding part, guided member)
97a Sliding base
97b First elastic contact part (deflection suppression part)
97c Second elastic contact part (deflection suppression part)
98 Shoe (sliding part, guided member)
98a Sliding base
98b First elastic contact part (deflection suppression part)
98c Second elastic contact part (deflection suppression part)
131 Guide rail
131e Notch (passage part)
140 Window regulator
150 Motor unit
150a Drive unit
150b Pinion support member
150c Drive shaft
L1 Parting line
M Motor
S1 First section
S2 Second section
S3 Third section
U1 Holding recess
U2 Gap
W Window glass (opening/closing member)
W1 Vehicle exterior side surface
W2 Vehicle interior side surface
W3 Edge surface

The invention claimed is:

1. A vehicle door opening/closing member driving device that moves an opening/closing member along an upright pillar sash forming a window opening and that opens and closes the window opening by the opening/closing member, the vehicle door opening/closing member driving device comprising:
    a guide rail provided at the upright pillar sash to extend in opening/closing directions of the opening/closing member;
    a first sliding part and a second sliding part that are provided on the opening/closing member at different positions in the opening/closing directions and configured to be inserted inside the guide rail and movably guided in the opening and closing directions; and
    a passage part that is provided in the middle of the guide rail in the opening and closing directions and that allows at least one of the first sliding part or the second sliding part to be inserted into and removed from the inside of the guide rail in a direction intersecting the opening and closing directions,
    wherein a distance between the first sliding part and the second sliding part in the opening and closing directions is longer than a length from the passage part to one end of the guide rail in the opening and closing directions.

2. The vehicle door opening/closing member driving device according to claim 1, further comprising:
    a transmission member that transmits a driving force of a drive source to the opening/closing member; and a first opening/closing member support and a second opening/closing member support which are separately provided in the opening/closing directions and respectively secured to the opening/closing member,
wherein the first opening/closing member support is located at an upper position in the opening/closing directions while the second opening/closing member support is located at a lower position in the opening/closing directions,
wherein the first sliding part is connected to the first opening/closing member support and the second sliding part is connected to the second opening/closing member support, and
the transmission member is connected to the first opening/closing member support.

3. The vehicle door opening/closing member driving device according to claim 2,
wherein a transmission receiving part of the glass first opening/closing member support to which the transmission member is connected, and the first sliding part and the second sliding part, are arranged at different positions in the vehicle front-rear directions.

4. The vehicle door opening/closing member driving device according to claim 1, further comprising:
a single opening/closing member support secured to the opening/closing member;
wherein the first sliding part and the second sliding part are connected to the single opening/closing member support.

5. The vehicle door opening/closing member driving device according to claim 1,
wherein the guide rail has a section surrounded by walls located in the vehicle front-rear directions and the vehicle interior and exterior directions, and the first sliding part and the second sliding part are inserted into the section,
each of the first sliding part and the second sliding part includes:
a sliding base whose outer surface is in sliding contact with each of the walls surrounding the section; and
at least one of: a deflection suppression part that is biased in the vehicle interior and exterior directions to come in contact with the wall within the section so as to suppress deflection of each of the sliding parts in the vehicle interior and exterior directions; or a deflection suppression part that is biased in the vehicle front-rear directions to come in contact with the wall within the section so as to suppress deflection of each of the sliding parts in the vehicle front-rear directions.

6. The vehicle door opening/closing member driving device according to claim 5,
wherein the first sliding part is located at an upper position in the opening/closing directions while the second sliding part is located at a lower position in the opening/closing directions,
the deflection suppression part that suppresses deflection of the first sliding part in the vehicle front-rear directions protrudes from the sliding base to the outer peripheral side of the window opening to bias the sliding base toward the inner peripheral side of the window opening, and
the deflection suppression part that suppresses deflection of the second sliding part in the vehicle front-rear directions protrudes from the sliding base to the inner peripheral side of the window opening to bias the sliding base toward the outer peripheral side of the window opening.

7. A door frame assembly equipped with the vehicle door opening/closing member driving device according to claim 1,
wherein the opening/closing member driving device including the guide rail is provided on the upright pillar sash so as to provide a door frame assembly including at least the upright pillar sash, the opening/closing member, and the opening/closing member driving device.

8. A vehicle door glass elevating/lowering device that performs elevating/lowering operation of window glass by a driving force of a drive source along a sash member along one of front and rear edges of the window glass in a door sash forming a window opening, the glass elevating/lowering device comprising:
a guide rail provided on the sash member and extending in elevating/lowering directions of the window glass;
a slider having a glass support secured to the window glass and a sliding part guided movably in the elevating/lowering directions with respect to the guide rail; and
a transmission member that transmits the driving force of the drive source,
wherein the sliding part includes: first and second sliding parts disposed at different positions in the elevating/lowering directions, the first sliding part regulated in position by the guide rail in at least one direction of the vehicle front-rear directions, and the second sliding part regulated in position by the guide rail in at least the other direction of the vehicle front-rear directions,
the guide rail has a section surrounded by walls located in the vehicle front-rear directions and the vehicle interior and exterior directions, and the first sliding part and the second sliding part are inserted into the section,
each of the first sliding part and the second sliding part includes:
a sliding base whose outer surface is in sliding contact with each of the walls surrounding the section; and
at least one of: a deflection suppression part that is biased in the vehicle interior and exterior directions to come in contact with the wall within the section so as to suppress deflection of each of the sliding parts in the vehicle interior and exterior directions; or a deflection suppression part that is biased in the vehicle front-rear directions to come in contact with the wall within the section so as to suppress deflection of each of the sliding parts in the vehicle front-rear directions.

* * * * *